United States Patent [19]
Ortiz Perez et al.

[11] Patent Number: 5,859,894
[45] Date of Patent: *Jan. 12, 1999

[54] SELF-DIAGNOSTIC SYSTEM FOR CELLULAR-TRANSCEIVER SYSTEMS WITH REMOTE-REPORTING CAPABILITIES

[75] Inventors: Luis R. Ortiz Perez, Rio Piedras; Alexis Torres Ramos, Carolina, both of Puerto Rico

[73] Assignee: Telular Corporation, Vernon Hills, Ill.

[ * ] Notice: The term of this patent shall not extend beyond the expiration date of Pat. No. 5,469,494.

[21] Appl. No.: 505,868

[22] Filed: Jul. 24, 1995

Related U.S. Application Data

[63] Continuation-in-part of Ser. No. 205,029, Mar. 2, 1994, Pat. No. 5,469,494.

[51] Int. Cl.⁶ .......................... H04M 1/211; H04M 3/08; H04M 3/22; H04M 11/00
[52] U.S. Cl. .................................. 379/27; 379/1; 379/32; 379/34; 379/58
[58] Field of Search .............................. 379/1, 22, 2, 27, 379/28, 29, 32, 34, 58, 59, 60, 63

[56] References Cited

U.S. PATENT DOCUMENTS

| | | | |
|---|---|---|---|
| 4,554,410 | 11/1985 | Furumoto | 179/2 E |
| 4,658,096 | 4/1987 | West et al. | 379/59 |
| 4,737,975 | 4/1988 | Shafer | 379/58 |
| 4,788,711 | 11/1988 | Nasco, Jr. | 379/59 |
| 4,829,554 | 5/1989 | Barnes et al. | 379/58 |
| 4,860,281 | 8/1989 | Finley et al. | 370/15 |
| 5,016,269 | 5/1991 | Rogers | 379/59 |
| 5,031,120 | 7/1991 | McKernan | 379/63 |
| 5,046,082 | 9/1991 | Zicker et al. | 379/59 |
| 5,073,919 | 12/1991 | Hagensick | 379/29 |
| 5,086,506 | 2/1992 | Hall et al. | 455/8 |
| 5,095,500 | 3/1992 | Tayloe et al. | 379/32 |
| 5,134,643 | 7/1992 | Iwata | 379/23 |
| 5,295,178 | 3/1994 | Nickel et al. | 379/58 |
| 5,469,494 | 11/1995 | Perez et al. | 379/1 |
| 5,504,800 | 4/1996 | Yehushua et al. | 379/1 |

FOREIGN PATENT DOCUMENTS

| | | |
|---|---|---|
| 02695373 | 12/1988 | European Pat. Off. . |
| 2232850 | 12/1990 | United Kingdom . |

*Primary Examiner*—Curtis Kuntz
*Assistant Examiner*—Paul Loomis
*Attorney, Agent, or Firm*—Milton S. Gerstein; Marvin N. Benn

[57] ABSTRACT

A self-diagnostic system for a checking all functions of a cellular-transceiver system having a cellular-interface unit, which interface unit couples a standard telephone set to a cellular transceiver, which interface unit converts the DTMF or pulse-type of dialing signals into digital format for transmission to the cellular transceiver, whereby the dialed number made on the land-type of telephone may be used to call a number over the cellular system. The present invention not only monitors and checks the proper functioning of the transceiver and associated power supply, and the like, but will also monitor and check the interface unit, and report the results to an off-site monitoring center by means of the cellular network.

23 Claims, 24 Drawing Sheets

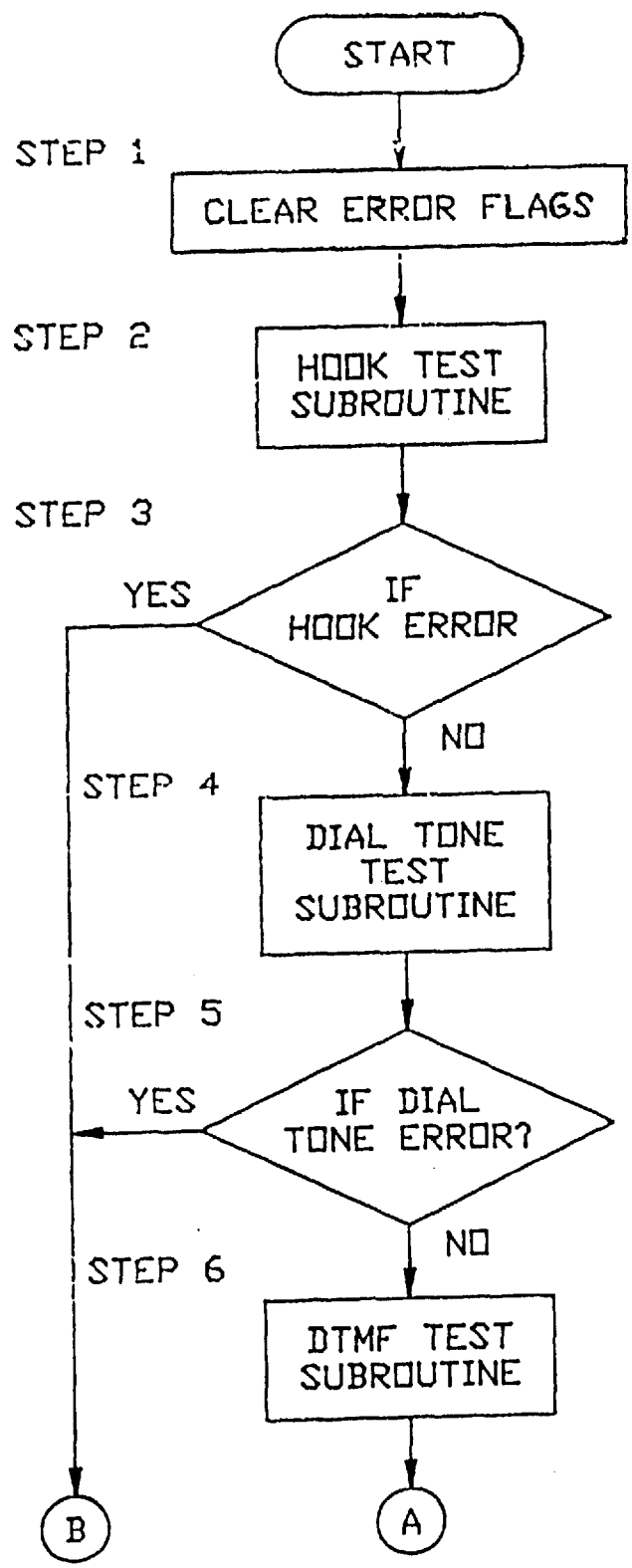

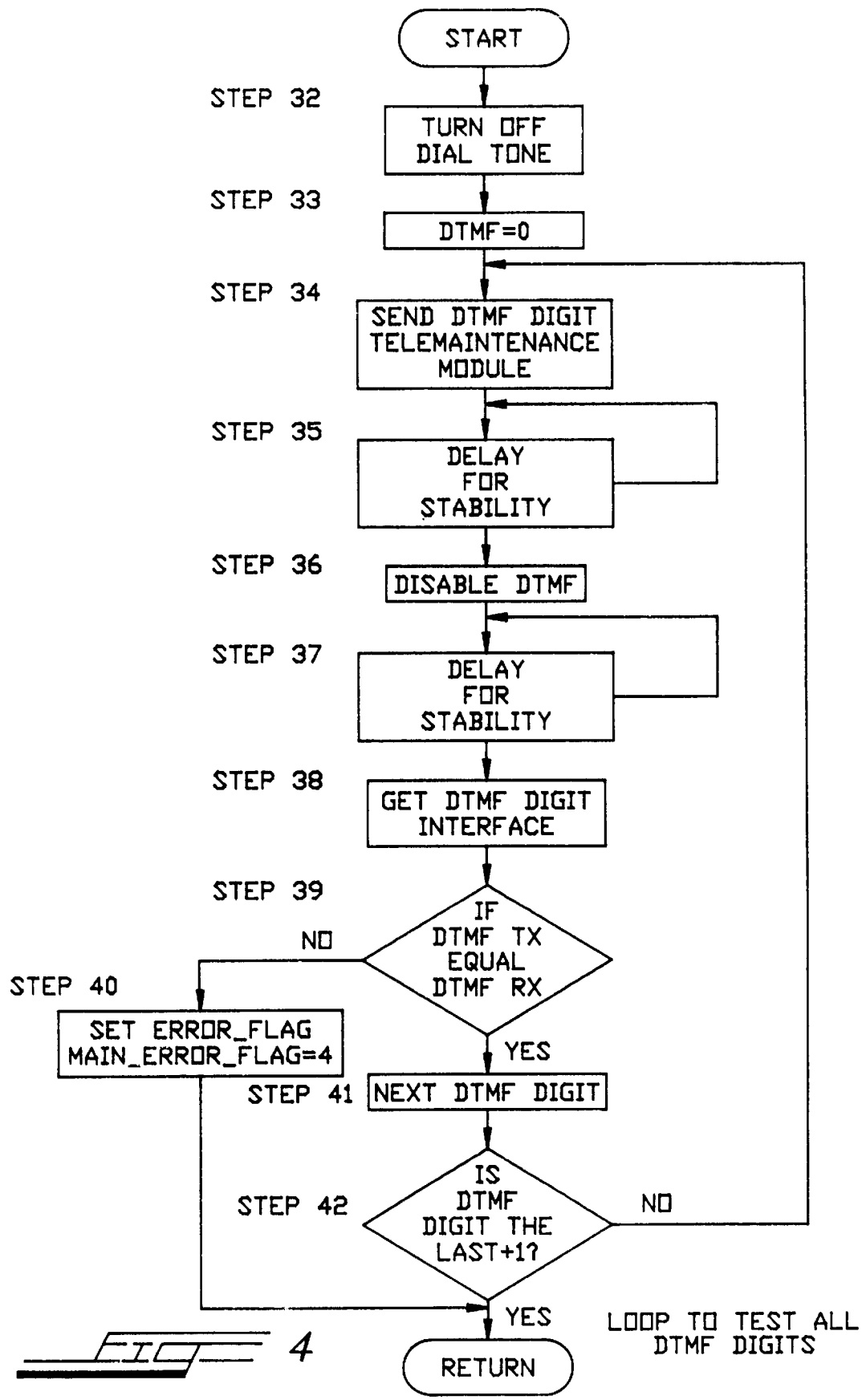

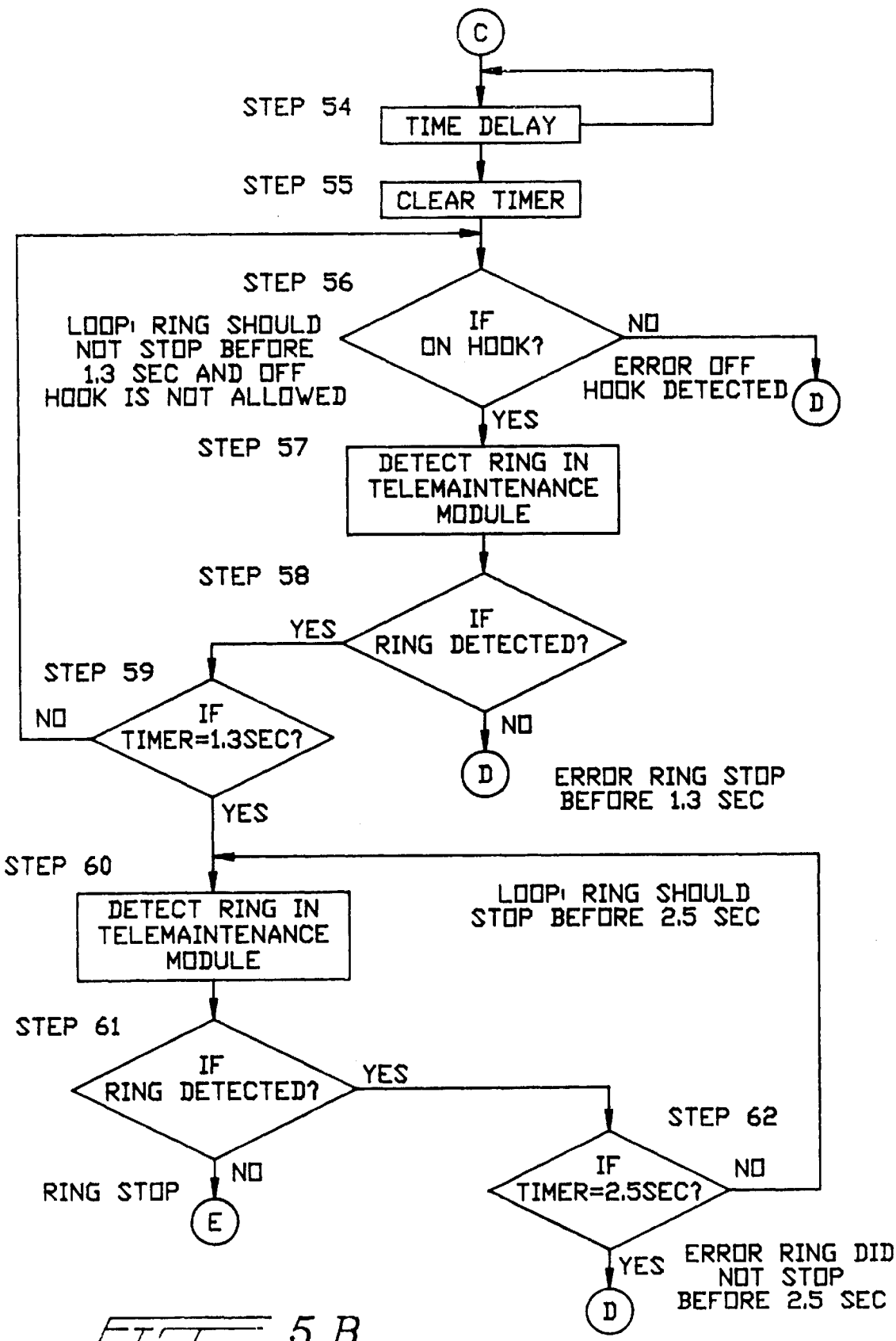

SELF-DIAGNOSTIC SYSTEM FOR CELLULAR-TRANSCEIVER SYSTEMS WITH REMOTE-REPORTING CAPABILITIES

CROSS REFERENCE TO RELATED APPLICATION

The present application is a continuation-in-part of application Ser. No. 08/205,029, filed Mar. 2, 1994, now U.S. Pat. No. 5,469,494.

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

BACKGROUND OF THE INVENTION

The present invention is directed to a self-diagnosis system for checking all functions of a cellular-transceiver system. The present invention has especial relevance to a cellular-interface system, such as that disclosed in U.S. Pat. Nos. 4,658,096 and 4,737,975, which are incorporated by reference herein. In the systems of these patents, an interface unit couples a standard telephone set, facsimile machine, modem, or other communications devices, to a cellular, or cellular-like, transceiver, which interface unit allows for normal operation of the communications device through the radio transceiver. The interface unit may also convert DTMF or pulse-type of dialing signals into digital format for transmission to the radio transceiver, whereby the dialed number made may be used to call a number over the radio system by means of the transceiver. The system of the invention tests for the proper operation of all functions of the adapter interface unit, as well other characteristics, such as the power output of the radio transceiver, which can be varied by either signals from the transceiver or from the radio network, or the frequency at which the transceiver is utilizing, which can be changed selectively by either the transceiver or the cellular network.

The diagnostic and testing system of the present invention may be used in any cellular-like system, such as a pure cellular system, or cellular-like systems, such ISDN and other personal communication systems, where a cellular-like adapter or interface unit is provided for converting the DTMF or pulse-type of dialing signals into digital format for transmission to the cellular-like transceiver associated with the cellular-like system.

It is known to provide diagnostic and testing equipment for entire cellular systems. It is also known to provide a self-contained unit that tests itself. The latter is disclosed in U.S. Pat. No. 5,016,269—Rogers, which is incorporates by reference herein, which discloses a cellular-telephone, emergency call-box. This patent discloses self-diagnostics that are performed by the call-box itself. The call-box of this patent has self-diagnostics within it, and periodically reports the status of items checked to a central station through the cellular network. Rogers discloses a cellular handset and transceiver and associated auto-diagnostic system for checking on the system and for reporting back to a central station, However, this patent does not disclose the monitoring and self-diagnostic function of a DTMF converter, such as used in the above-mentioned U.S. Pat. Nos. 4,658,096 and 4,737, 975, nor does Rogers disclose the initiation of a ring-back tone from central office to check on proper working of the system.

The types of cellular-like systems, besides the pure-type of cellular systems, in which the present invention may be used, are those that relate generally to a wireless digital personal communications systems having a plurality of intelligent base stations and intelligent portable handset terminals, each having a predetermined radio cell coverage area, and more particularly to a digital, radio cell, radiotelephone, personal communications system (or PCS) having a full ISDN interface, thereby facilitating direct interconnection and switching of PCS call traffic through the ISDN interface and the public switched telephone network, or any switched network, the personal communications system having voice/data/image (or any combination thereof) and two-way full-duplex incoming and outgoing calling capability, and being fully operational and compatible with any modulation approach selected, with the inter-cell protocol hand-off being provided through distributed logic which is implemented in software that is resident in the intelligent portable handset terminals, the intelligent base stations, and the public switched telephone network (or any switched network) equipped with a PCS service control data base.

The increasing availability of mobile and portable communications over the past decade is freeing business and residential users from the physical constraints of a totally wired telecommunications network. Particularly, cellular communications systems, together with paging and other complementary services, brought true mobility to telecommunications services for the first time. Significant technical advances in mobile and portable technologies, as well as in new technologies such as digital transmission with respect to wireless telecommunications, have substantially expanded the number and types of wireless telecommunications services using the radio spectrum that can be made available to the user. These prospective services include, but are not limited to, advanced forms of cellular telephone service, advanced digital cordless telephone service, portable facsimile services, wireless centrex, wireless private branch exchange services, and wireless local area network services, and may be used through the existing public switched network or through alternative local wired networks (such as cable television systems). As such, digital personal communications systems can exist independently of, and in conjunction with, local wired networks, filling gaps that are existing in current communications systems, and also in creating new markets, many of which are yet to be defined. The advent of PCS will have a great impact on the future development and configuration of all telecommunications networks by significantly improving their flexibility and functionality. Accordingly, providers of PCS will have the ability to reach and serve existing and new markets nationally in an economic and responsive manner.

Personal communications requirements in the United States are rapidly changing as the demand for instantaneous communications increases due to increased mobility of the user. One of the advantages of PCS is that it will use a single communications device to reach anyone, anytime, anywhere. PCS will facilitate increased mobility and flexibility of the user, since this approach solves the underlying problem of being in constant communications with user. PCS wireless will enable users not to miss important calls, as well as reduce the time and expense in returning calls. PCS combines the functionality of radio and the Public Switched Telephone Network (PSTN) technologies and infrastructure, and will accommodate full-duplex capabilities (two-way incoming and outgoing calling) and hand-off between radio cells (allowing users to freely move from one radio cell to another without interrupting the user's call). It is important to remember that there has been a steady increasing demand for new PCS services and technologies for numerous, sometimes incompatible, applications, namely, wireless private branch exchanges, smaller lighter portable cellular phones, portable fax machines, multi-channel cordless telephones, and additional services which are targeting the facilitation of contacting a particular individual user (rather than contacting a particular station). Current radio equipment and related services presently offered (i.e., cordless telephones, radio paging, and cellular radio) cannot fully meet the demands for these new types of PCS services. For example, cordless telephones are used in and around the home or office, operate on only a very few channels (10 or so) that are congested, and are limited to use in the immediate vicinity of their associated base station. Radio paging services are only one-way and have limited capabilities. Cellular and specialized mobile radio services cannot meet the full range of expected demand for PCS. Over time, PCS will have standardized equipment with common modules in hardware resulting in improved reliability in the associated equipment which will also be less vulnerable to transient interference from external sources, have automatic call registration, automatic call forwarding, voice mail, faxing capability, easy roaming features, remote data transfer, increased privacy protection/caller ID/class services, increased battery life, and common protocols. In order to best fulfill this marketplace mandate, a digital PCS is a necessity. Wireless PCS may eventually eliminate the need to have a building hard-wired for communications. Generally speaking, PCS will facilitate communications equipment with additional features. A digital PCS will facilitate improvements in technical communications equipment, systems and design.

The present invention, therefore, may be used in those ISDN or other PCS systems where there is provided a cellular-type adapter or interface board that allows for the use of a standard, land-type telephone instrument in this system, or other communications device, by converting the DTMF or pulse signals thereof into digital format that may be sent to a PCS transceiver unit, or by providing other functions that may be specific to the system. For example, in dedicated alarm systems where only outgoing calls are made by the radio transceiver, the interface unit need not provide ring generation, busy signal generation, and the like. Alternatively, in those systems where only incoming calls are required, the interface unit need not convert dialed DTMF or pulse signals into digital format. Such a PCS-cellular adapter also provides all of the other functions required, such as the generation of dial tone, ringing, and the like, as the cellular interface board set forth in U.S. Pat. Nos. 4,658,096 and 4,737,975.

SUMMARY OF THE INVENTION

It is, therefore, the primary objective of the present invention to provide a self-diagnostic system for a checking all functions of a cellular-transceiver system having a cellular-interface unit, which interface unit couples a standard, land-like telephone set, or other communications device, to a cellular transceiver, or to a cellular-like, such as a PCS or ISDN transceiver, which interface unit converts the DTMF or pulse-type of dialing signals into digital format for transmission to the cellular, or cellular-like, transceiver, whereby the dialed number made on the land-type of telephone instrument, or its equivalent, may be used to call a number over the cellular, or cellular-like, system. The present invention not only monitors and checks the proper functioning of the cellular, or cellular-like, transceiver and associated power supply, and the like, but will also monitor and check the cellular, or cellular-like, interface unit, and report the results to an off-site monitoring center by means of the cellular, or cellular-like, network.

The testing apparatus of the invention is capable of being coupled to an interface unit which couples a communications device to a radio transceiver for either calling out or receiving calls through the radio transceiver, the testing apparatus having its own diagnostics for monitoring and reporting the proper functioning of the interface unit.

The testing apparatus alternately couples the diagnostics to the interface unit, which said diagnostics simulates the functions performed by a communications device, such as a land line telephone, facsimile machine, modem, and the like, for generating in the interface unit respective, corresponding responses in the interface unit, in order to determine if the interface unit is operating correctly.

The testing apparatus will also generate an off-hook signal to the interface unit, as well as detect the presence of a dial-tone signal generated from the interface unit in response to the of the off-hook signal.

The testing apparatus will also generate a DTMF signal and send the signal to the interface unit, as well as detecting the DTMF signal output by the interface unit in response to the DTMF signal generated.

The testing apparatus also generates an on-hook signal to the interface unit, as well as an off-hook signal to the interface unit during the time that the interface unit is generating its ring-signal, in order to determine that the interface unit properly disconnects the ring-signal upon the answering of an incoming telephone call. The testing apparatus also generates an outgoing telephone call through the telephone network, when said the interface unit is coupled to a transceiver, and back to the transceiver, whereby the diagnostics causes the transceiver to make a telephone call to itself, with the diagnostics detecting the generation of a busy-signal by the transceiver in response to the telephone call.

The testing may be initiated from a remote, telemaintenance center by means of a signal to a remote-reporting section of the auto-diagnostic unit. After the testing has been completed, the results are transmitted to the remote, telemaintenance center by means of the cellular, or cellular-like, network. The remote-reporting section will attempt to transmit the test-results data a nunber of times, before ceasing. If the auto-diagnistic unit is initiated locally at the site, the test-results may still be transmitted to the remote, telemaintenance center by means of the cellular, or cellular-like, network.

BRIEF DESCRIPTION OF THE DRAWINGS

The invention will be more readily understood with reference to the accompanying drawing, wherein:

FIGS. 1A and 1B show a general flow chart for the steps involved for the self-testing according to the invention;

FIG. 4 is a flow chart showing the steps involved for the subroutine of the self-testing of DTMF tone generation according to the invention;

FIGS. 5A through 5C show a flow chart for the steps involved for the subroutine of the self-testing of ring generation according to the invention;

DETAILED DESCRIPTION OF THE INVENTION

Figure 1B:
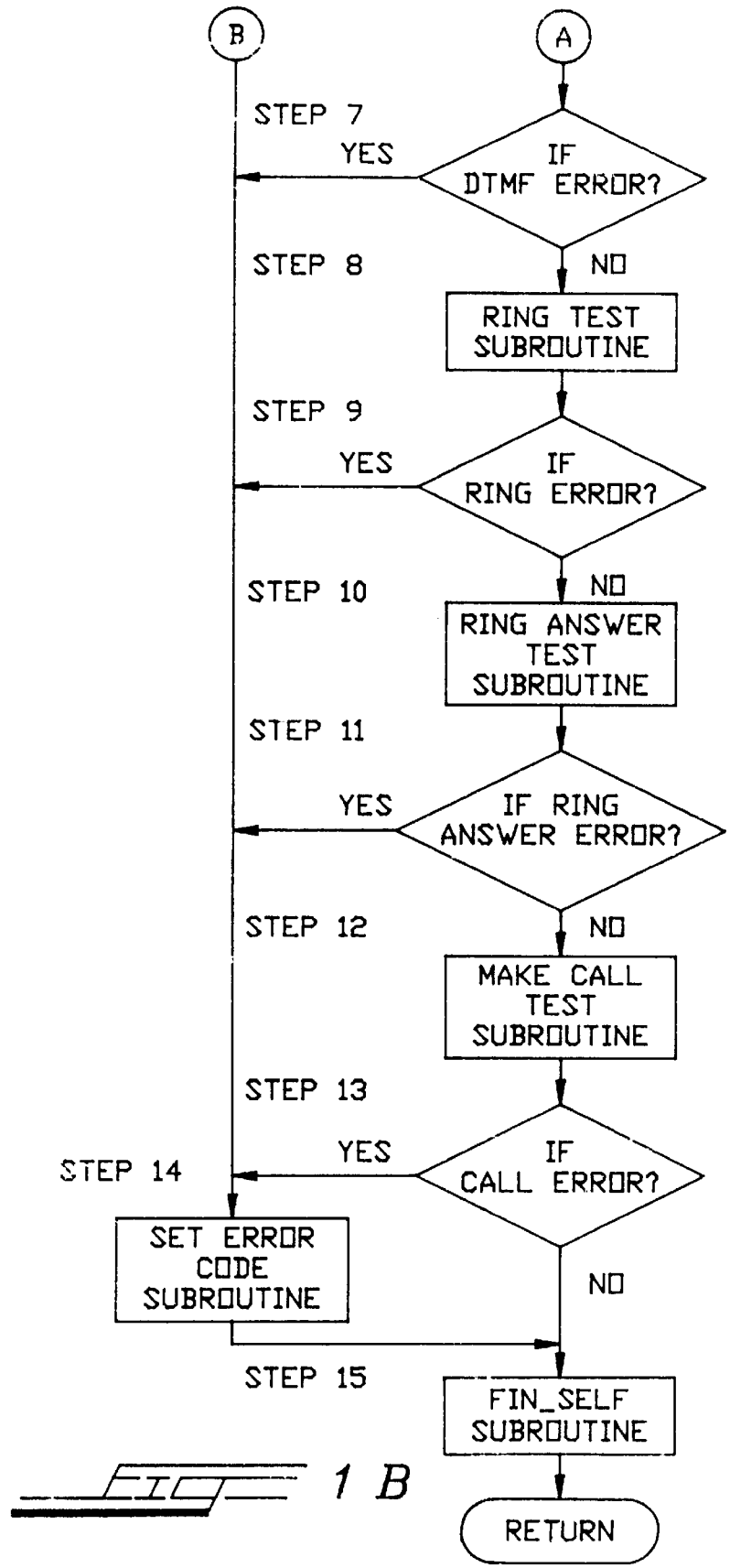

The auto-diagnostic maintenance system of the present invention is for use in cellular, or cellular-like, interface boards and systems, such as those disclosed in U.S. Pat. Nos. 4,658,096 and 4,737,975. In addition, the auto-diagnostic maintenance system of the present invention may be used with other radio-transceiver systems, such as IMTS, where there is provided a wireless link between a base station and master stations, and which transceiver is associated with an adapter interface board, such as that disclosed in U.S. Pat. Nos. 4,658,096 and 4,737,975, for example, which allows for connection and normal functioning of a communications-type instrument, such as a land-line telephone, facsimile machine, modem, and the like, to the radio transceiver. The interface unit provides a number of functions depending upon its intended use. For example, in dedicated alarm systems, where only outgoing calls are made by the radio transceiver, the interface unit need not provide ring generation, busy signal generation, and the like, to the communications device. Alternatively, in those systems where only incoming calls are required, the interface unit need not convert dialed DTMF or pulse signals into digital format. According to the invention, software is provided which communicates with the microprocessor of the cellular interface board or other radio-transceiver interface board, disclosed in U.S. Pat. Nos. 4,658,096 and 4,737,975, which software may be activated either manually or automatically for activating an auto-diagnostic interface board of the invention, which software diagnoses the proper functioning of all the software and hardware systems contained within the entire system of these above-mentioned patents. Every single item can be checked. For example, on the interface board, the DTMF converter will be checked, the four-line interface to two-wire connection will be checked, the busy-tone software will be checked, as well as all other functioning aspects of the interface. In addition, the transceiver will be checked, the battery will be checked, as well as any other aspects of the interface. The maintenance system of the invention is capable of making a call over the cellular, or cellular-like, network to a predetermined telephone number of a central station, or base station, which central station will then send back either a tone-back or will dial the current number of the interface system to get a busy signal. This will be considered a test. The invention will also send another telephone number over the cellular, or cellular-like, system to call the same or a different central station, so that it may send back a 1000 hertz precision tone, whereby the software of the present invention will compare that 1000 hertz tone to its own predetermined configuration in order to determine whether there is a line-connection and that the cellular, or cellular-like, system is operating correctly. This is a particularly useful system, since it allows the end-user to activate the phone in the event the user believes there is a problem with a phone. This test will then tell the telephone company whether or not the error is at the cellular system's central office or it is a problem with the base unit of the end-user.

According to the invention, there are two different modules. The first one is the telemaintenance circuit and the second is the teletariff circuit. The telemaintenance circuit generates a multiple test, as set forth below in detail, that includes a generation of a telephone call to a predetermined number. The circuit will report the results of the test to this particular number. In addition, the circuit can dial out to its own number in order to assure that the reception and transmission of the unit is working by receiving a busy signal. These sets of tests can be initiated by the subscriber by pressing a push button that is located on the side of the unit. When the button is pressed, the LED located near the button will continue flashing identifying the test is in progress. If at the end of the test the LED continues to stay on, that indicates there is a problem with the unit. This test generally takes no more than 40 seconds maximum. On the other hand, if the LED stops blinking and turns off, it indicates that the test was successful, and that the unit is in proper working order for the items that were checked on the test. As an option, the software and hardware provide that the test can be conducted from an outside number, provided that the transmission media allows it, (i.e., that the transceiver is in working order to receive a phone number).

The second circuit consists of the following: It utilizes the tariffing signal from the cellular, or cellular-like, system and generates the corresponding tariffing pulses for a standard table phone or pay phone. The device interprets the signal coming in from the cellular, or cellular-like, system, and does not need any local tariff. It operates in a similar manner for generating the long tones. It can be used with any cellular, or cellular-like, system that is capable of sending the tariff signals.

Telemaintenance Modules Flow Chart Description

The user may invoke the operational test sequence by pressing the autodiagnostic push button. When invoked, the interface board control is transferred to the autodiagnostic main subroutine of the telemaintenance module for performing the auto-testing.

FIGS. 1A and 1B show the DO_TEST subroutine, or the autodiagnostic main subroutine. A number of calls to various test procedures are performed. After each procedure, the error flags are checked. In the event of any failure, the test sequence is stopped. Then, the status is coded, and the result is shown to the user through four LEDs, as described below.

Referring to FIG. 1A, In STEP 1, the operational test sequence starts with the initialization of variables and flags. In STEP 2, the program calls up the Hook_Test subroutine.

In Hook_Test, the user's telephone is disconnected from the TIP & RING lines, while the Telemaintenance Module (described below in detail) is connected in its place, to the interface board, such as that disclosed in U.S. Pat. Nos. 4,658,096 and 4,737,975, in preparation for the test. STEP 3 checks for any error detected in Hook_Test. If any error was found, the test sequence stops, and the program proceeds to STEP 14 in FIG. 1B. However, if no error was detected, the program calls up the Dial_Tone Test subroutine in STEP 4. STEP 5 checks for any dial tone error. If any error was found, the test sequence stops, and the program proceeds to STEP 14 in FIG. 1B. However, if no error was detected, the program calls up the next test, the DTMF_Test subroutine in STEP 6. The program continues in FIG. 1B STEP 7, where any DTMF_Tone subroutine is checked. If any error was found, the test sequence stops and the program proceeds to STEP 14. However, if no error was detected, the program calls up the next test, the Ring_Test subroutine in STEP 8. STEP 9 checks for any ring error. If any error was found, the test sequence stops and the program proceeds to STEP 14. However, if no error was detected, the program calls up the next test, the Ring_Answer_Test subroutine in STEP 10. STEP 11 checks for any ring-answer error. If any error was found, the test sequence stops, and the program proceeds to STEP 14. However, if no error was detected, the program calls up the next test, the Make_Call_Test subroutine in STEP 12. STEP 13 checks for any calling-out error. If any error was found, the test sequence stops, and the program proceeds to STEP 14. However, if no error was detected, the program calls up the next test, the Fin_Self_Test subroutine in STEP 15. If any error was found during the execution of any subroutine, the program jumps to STEP 14. In STEP 14, the program calls up the Error_Acc subroutine. Finally, the test sequence ends after STEP 15 has cleared all variables and flags, returning the control back to the telephone set, and resuming normal operations of the Interface.

The following explanations of FIG. 2 to FIG. 9 correspond, and describe in detail, the individual test-subroutines above-mentioned.

Figure 2:
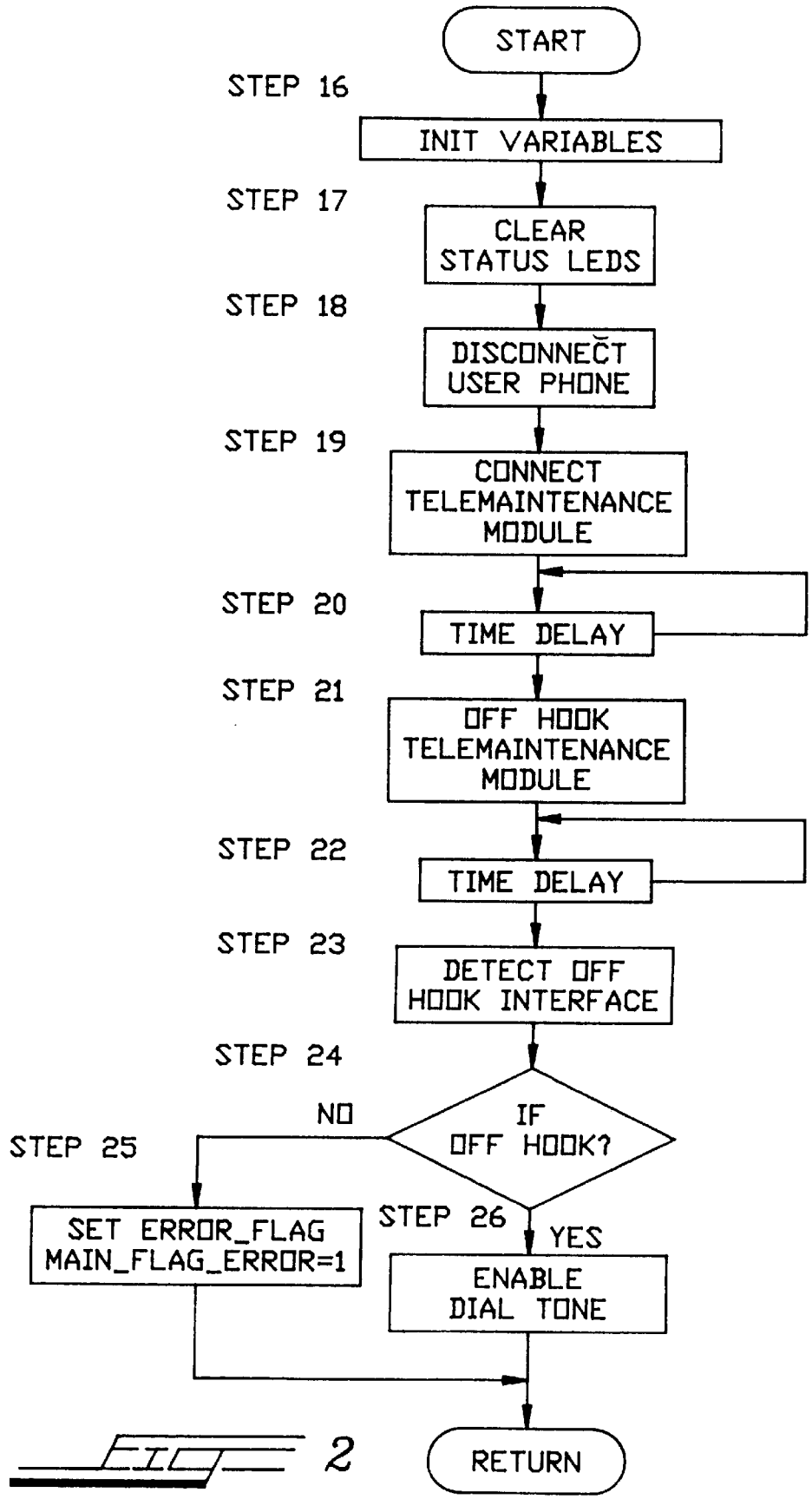
FIG. 2 is a flow chart showing the steps involved for the subroutine of the self-testing of off-hook according to the invention.

Referring to FIG. 2, the Hook_Test subroutine (Step 2 of FIG. 1A) starts with the initialization of variables and flags in STEP 16. In STEP 17, the program clears any output of the LEDs. In STEP 18, the user's telephone is disconnected from the TIP & RING lines of the interface board, while in STEP 19, the telemaintenance module of the invention is connected in place of the telephone. STEP 20 is a time delay to allow enough reaction time for such connection. In STEP 21, the telemaintenance module of the invention simulates and generates an off-hook. STEP 22 is a time delay to allow enough time for the off-hook. In STEP 23, the program checks the hook status of the interface board, which has now been coupled to the telemaintenance module. STEP 24 test for off-hook. If off-hook is not detected, the program continues to STEP 25, where the ERROR_FLAG is set and the MAIN_FLAG_ERROR is set to 1. However, if no error was detected, the program continues to STEP 26, where the dial tone is enabled for the next test shown in FIG. 3. Finally, this subroutine ends, and the program returns to the main subroutine Do_Test of FIGS. 1A and 1B.

Figure 3:
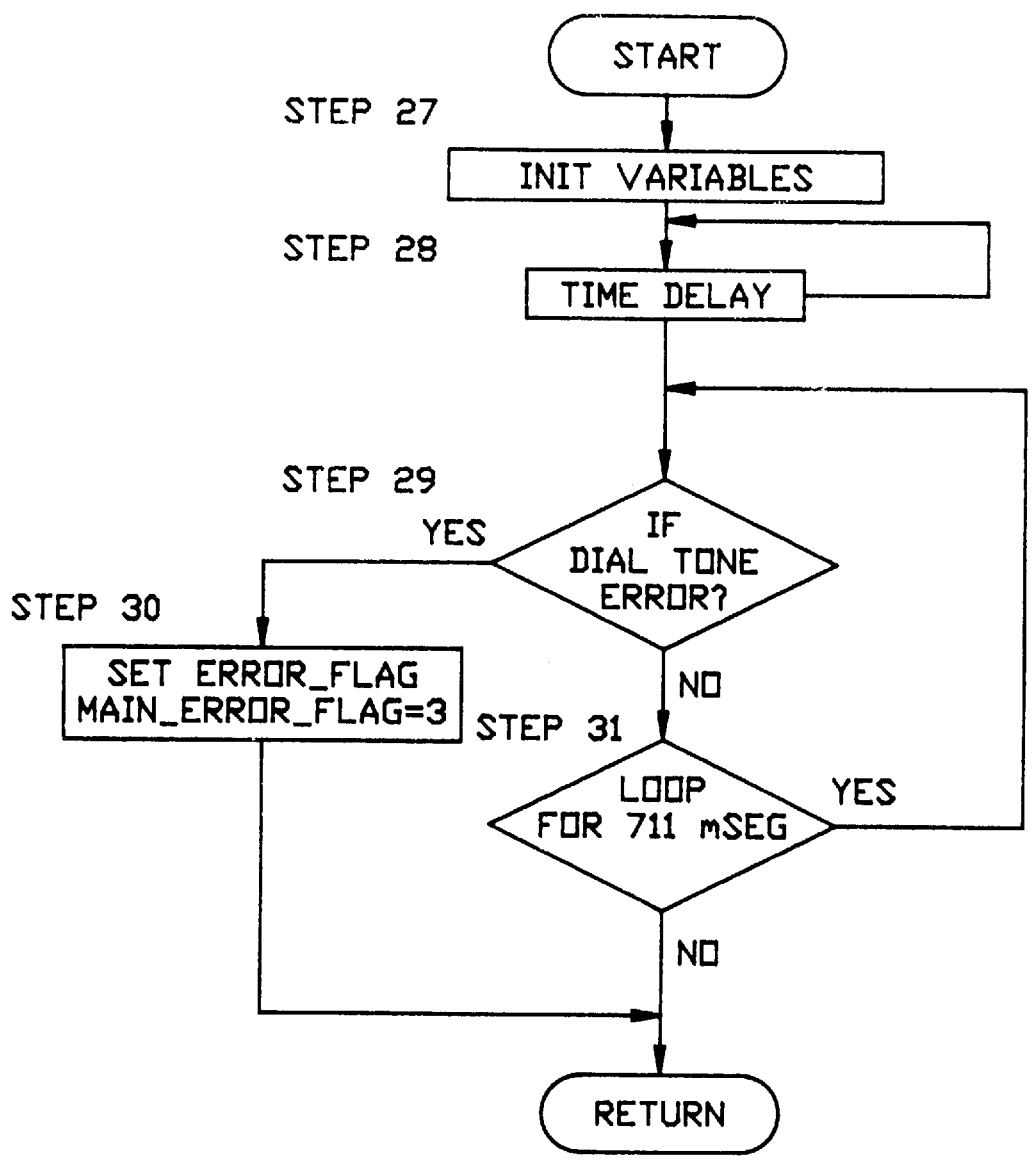
FIGS. 3 is a flow chart showing the steps involved for the subroutine of the self-testing of dial tone generation according to the invention.

Referring to FIG. 3, the Dial_Test subroutine starts with the initialization of variables and flags in STEP 27. STEP 28 is a time delay to allow enough time for a proper dial tone. STEP 29 tests the dial tone. If the dial tone fails, the program continues to STEP 30, where the ERROR_FLAG is set and the MAIN_FLAG_ERROR is set to 3. However, if no error was detected, the program continues to STEP 31, where the program loops back to STEP 29, testing the dial tone for at least 711 milliseconds. After no errors have been detected after the 711, milliseconds has expired, this subroutine ends, and the program returns to the main subroutine Do_Test of FIGS. 1A and 1B.

Referring the FIG. 4, the DTMF_Test subroutine, which tests for the proper DTMF conversion into digital data by the interface board, starts in STEP 32 by disabling the dial tone from the previous subroutine test. STEP 33 sets the first DTMF tone to 0. In STEP 34, the telemaintenance module sends the DTMF tone corresponding to this value. STEP 35 is a time delay to allow enough time for the tone to be on. STEP 36 disables the DTMF tone. STEP 37 is a time delay to allow the interface to detect the DTMF tone pulse. In STEP 38, the interface reads the tone. STEP 39 checks the received DTMF tone. If the DTMF tone sent is not equal to DTMF tone received, or no DTMF tone is received, then the program continues to STEP 40, where the ERROR_FLAG is set, and the MAIN_FLAG_ERROR is set to 4. However, if the DTMF tones are equal, the program continues to STEP 41, and the next DTMF digit is selected. In STEP 42, the program verifies that all DTMF tones have been tested; otherwise the program loops back to test the next digit. Finally, after all the DTMF tones have been tested, the subroutine ends, and the program returns to the main subroutine called Do_Test of FIGS. 1A AND 1B.

Figure 5A:
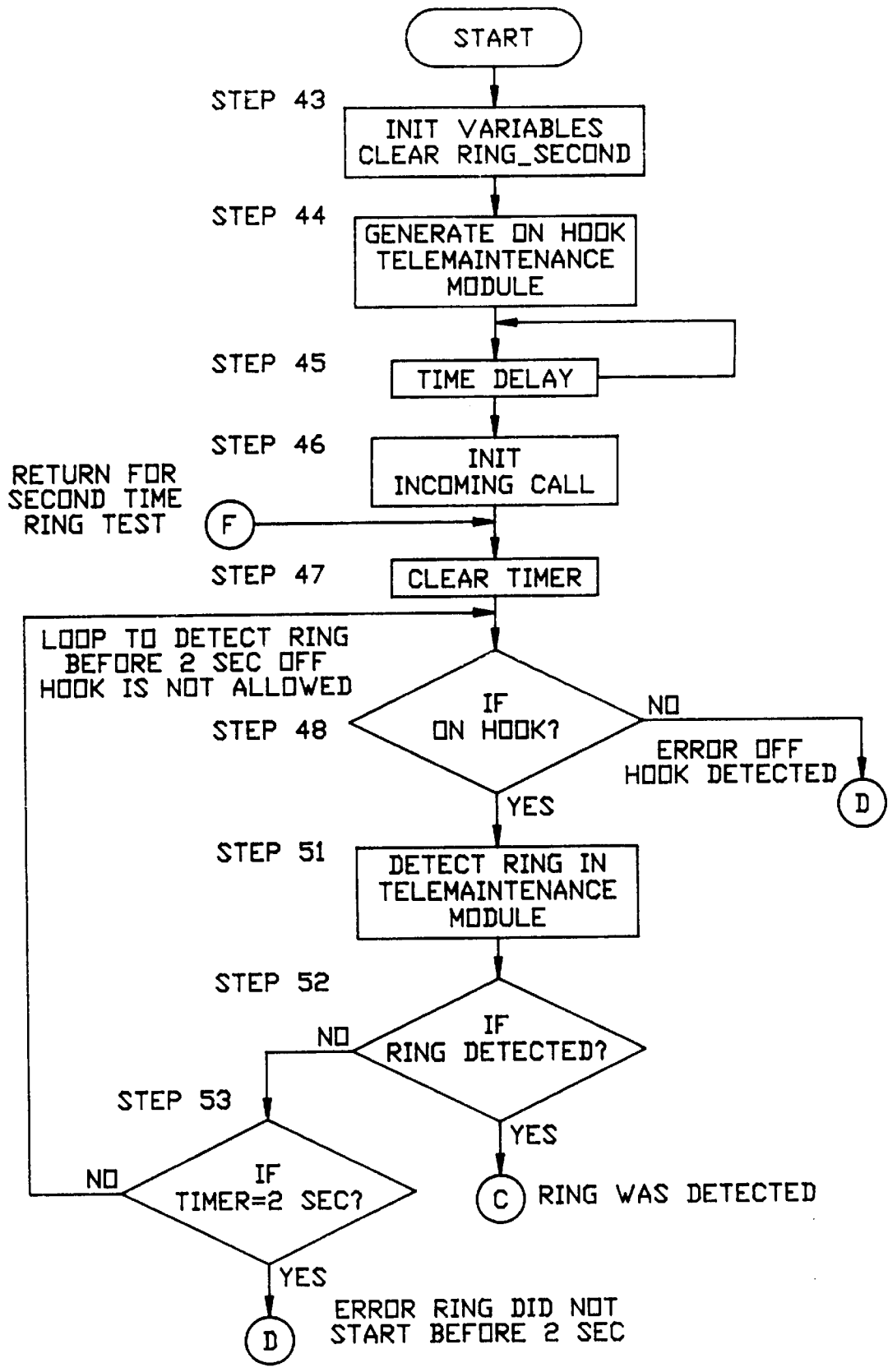

Referring to FIGS. 5A & 5B, the Ring_Test subroutine is shown. This subroutine tests the timing of the two pulses of the ring generated by the ring circuitry of the interface board. Referring to FIG. 5A, the subroutine starts with the initialization of variables and flags in STEP 43. In STEP 44, the telemaintenance module generates an on-hook. Step 45 is a time delay to allow the interface to detect the on-hook. In STEP 46, the interface is set to believe that an incoming call is in progress; therefore, the interface board will generate its ring sequence. The objective of STEPS 47 to 53 is to verify that the ring starts within the next two seconds, and that off-hook is not detected. In STEP 47, the timer is cleared. STEP 48 tests for off-hook. If off-hook is detected, then the test is stopped, and the program jumps to STEP 49 in FIG. 5C for error-indication. However, when on-hook is detected, the program continues to STEP 51, where the telemaintenance module checks for the ring to be active. STEP 52 tests if the ring has started. If the ring has started, the program continues to STEP 54 in FIG. 5B. However, if the ring had not yet started, the program checks the timer in STEP 53. If the time is less than two seconds, the program keeps looping back to STEP 48 until the ring starts. However, if the two second timer had expired, the test stops and the program jumps to STEP 49 in FIG. 5C for indicating error. Referring to FIG. 5B, STEP 54 is a time delay. The objective of STEP 55 to STEP 59 is to verify that the ring will last for at least one 1.3 seconds, and that off-hook is not detected. In STEP 55, the timer is cleared. STEP 56 tests for on-hook. If off-hook is detected, the test stops, and the program jumps to STEP 49 in FIG. 5C for indicating error. However, when on-hook is detected, the program goes to STEP 57, where the telemaintenance module checks for the Ring to be active. STEP 58 tests if the ring has stopped. If the ring has stopped, the program continues to STEP 49 in FIG. 5B. However, if the ring has not yet stopped, the program checks the timer in STEP 59. If the timer is less than 1.3 seconds, the program keeps looping back to STEP 56 until the ring stops. However, if the time has expired, the test stops, and the program jumps to STEP 49 in FIG. 5C. The objective of STEP 60 to STEP 62 is to verify that the ring will not last more than 2.5 seconds. In STEP 60, the telemaintenance module checks if the ring is active. STEP 61 tests if the ring has stopped. If stopped, the program jumps to STEP 63 in FIG. 5C. However, if the ring has not yet stopped, the program checks the timer in STEP 62. If the timer is less than 2.5 seconds then, the program keeps looping back to STEP 60 until the ring stops. However, if the time has expired, the test stops and the program jumps to STEP 49 in FIG. 5C.

Figure 5C:
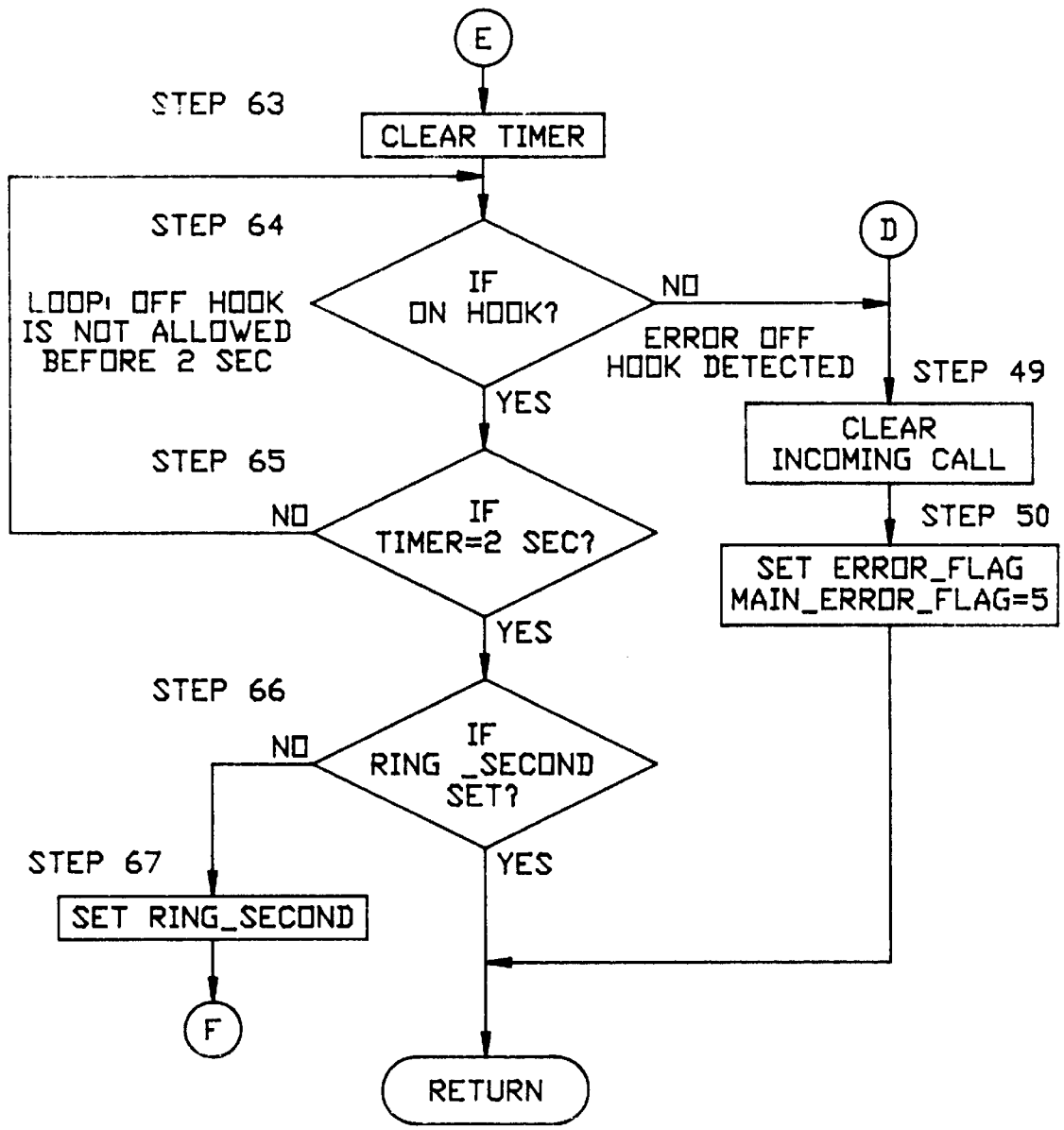

Referring to FIG. 5C, the objective of STEP 63 to STEP 65 is to verify that no off-hook is detected for a period of two seconds. In STEP 63, the timer is cleared. STEP 64 tests for on-hook. If off-hook is detected, then the test stops and the program continues in STEP 49 for indicating error. However, if off-hook is not detected, the program checks the timer in STEP 65. If the timer is less than two seconds, the program keeps looping back to STEP 64 until the ring starts. However, if the time has expired, then the program continues in STEP 66, where the program checks how many cycles this subroutine has tested the ring. If the ring has been tested for only one cycle, the program continues in STEP 67, where the flag called Ring_Second is set. Thereafter, the program loops back up to STEP 47 in order to test the ring for a second time. However, if the ring has been tested twice, the subroutine ends and the program returns to the main subroutine called Do_Test. If an error was detected during any part of the Ring_Test subroutine, the program jumps to STEP 49. STEP 49 clears the incoming call status; therefore, the ring sequence stops. Then, the program continues in STEP 50, where the ERROR_FLAG is set and the MAIN_FLAG_ERROR is set to 5. Then, the subroutine ends, and the program returns to the main subroutine called Do_Test.

Figure 6:
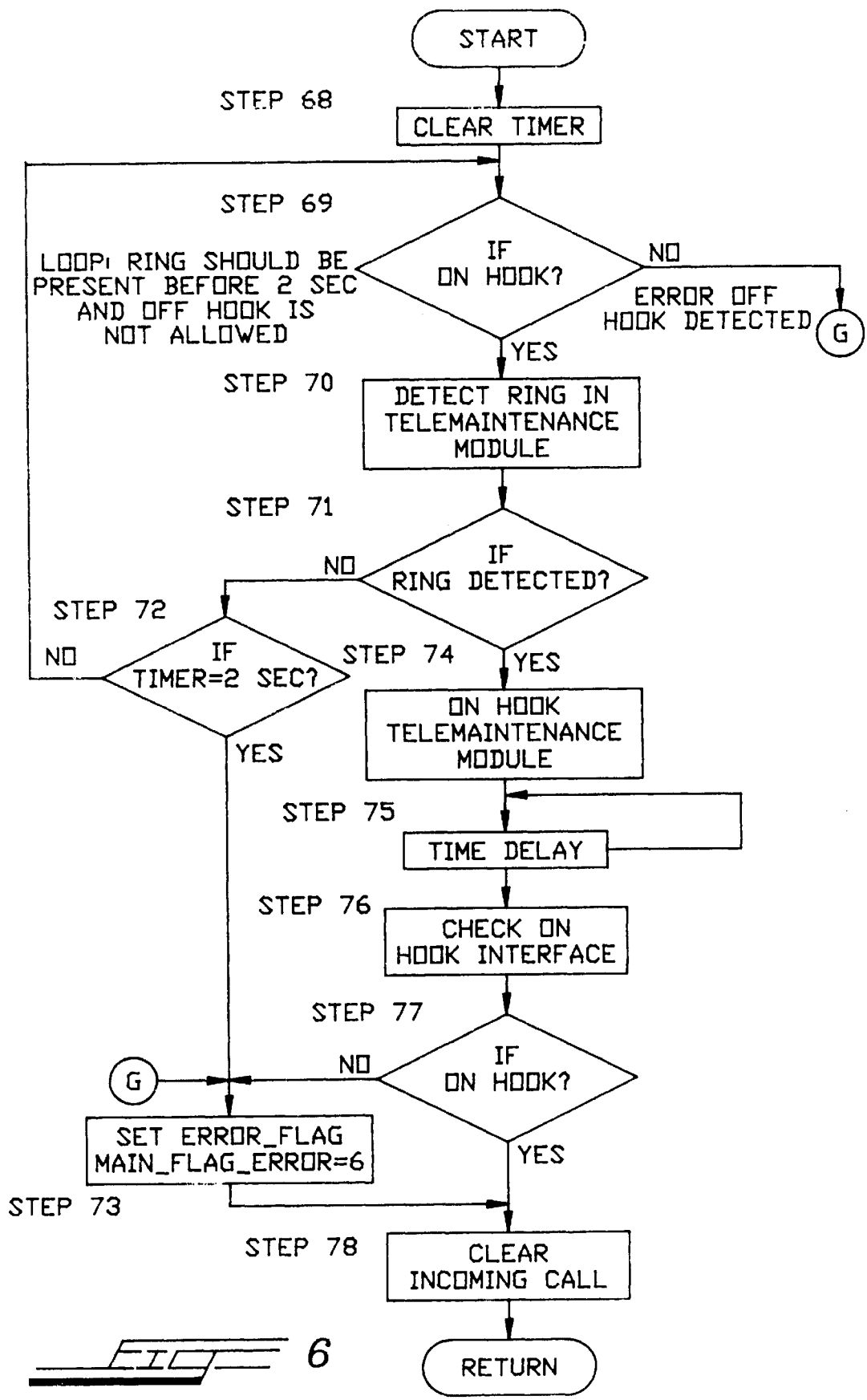
FIG. 6 is a flow chart showing the steps involved for the subroutine of the self-testing of ring-answer process according to the invention.

Referring to FIG. 6, the Ring_Answer_Test subroutine is shown. This subroutine tests the response of the interface board when an off-hook is presented to the interface board during the ring-cycle, when answering the telephone for an incoming call. The objective of STEP 68 to STEP 69 is to verify that the ring will start within the next two seconds and that off-hook is not detected. In STEP 68, the timer is cleared. STEP 69 tests for on-hook. If off-hook is detected, then the test stops and the program jumps to STEP 73. However, if on-hook is detected, the program continues with the ring active. STEP 71 tests if the ring has started. If the ring has started, the program continues to STEP 74. However, if the ring has not yet started, the program checks the timer in STEP 72. If the timer is less than two seconds, then the program loops back to STEP 69 waiting for the ring to start. However, if the two-second timer has expired, the test stops and the program jumps to STEP 73. In STEP 74, the telemaintenance module generates an off-hook. STEP 75 is a time delay that allows the interface board to detect the off-hook. In STEP 76, the interface checks the hook-status. If off-hook is not detected in STEP 77, then the test stops and the program jumps to STEP 73. However, if the interface board detects the off-hook, the program continues in STEP 78. If an error was detected during any part of the Ring_Answer_Test subroutine, then the program jumps to STEP 73, where the ERROR_FLAG is set and the MAIN_FLAG_ERROR is set to 6. Then, the program continues in STEP 78. In STEP 78, the incoming call status is cleared; therefore, the interface board will stop the ring sequence. Then, the subroutine ends, and the program returns to the main subroutine called Do_Test.

Figure 7A:
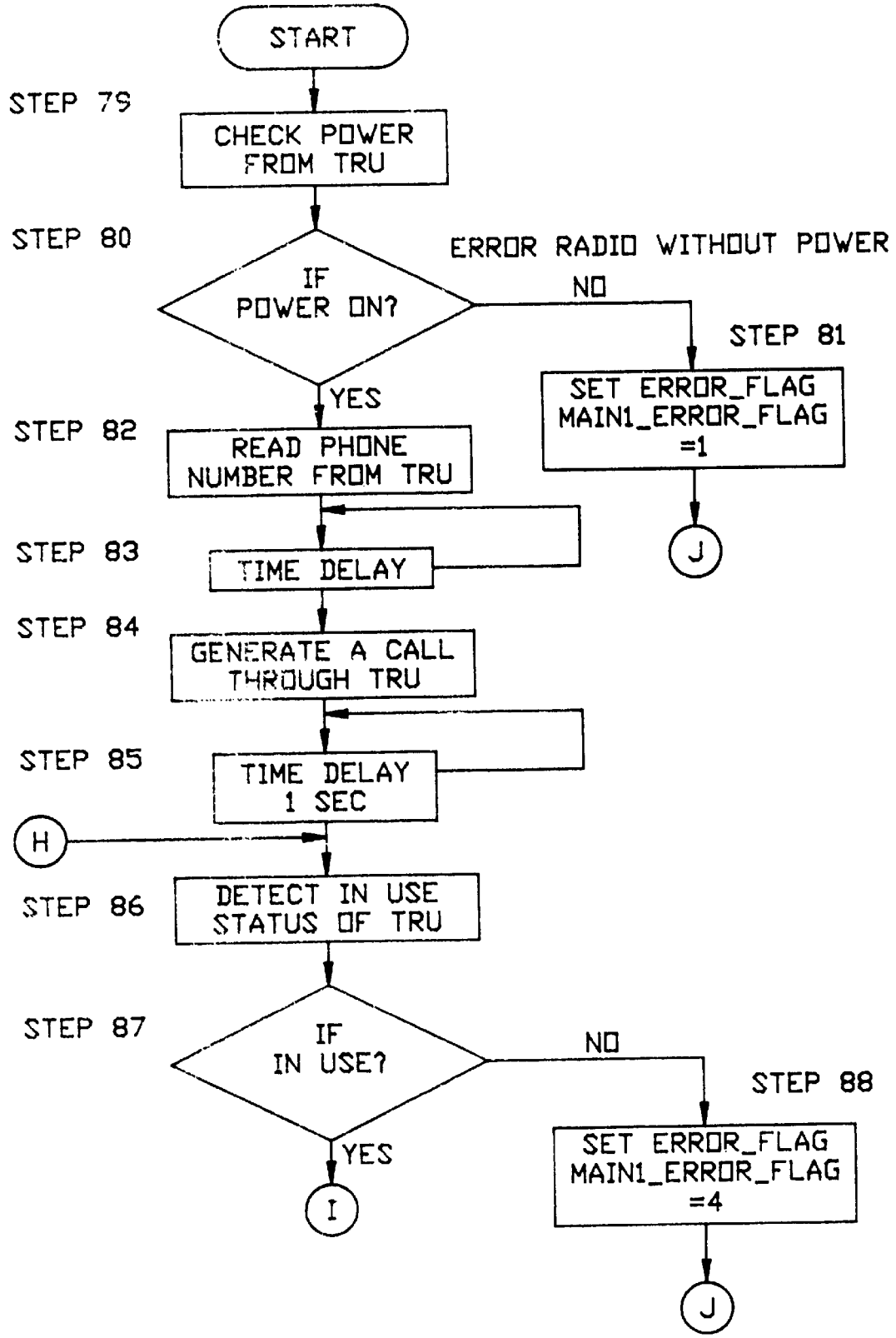
FIGS. 7A and 7B show a flow chart showing the steps involved for the subroutine of the call-test which checks for proper call-detection and answering of an incoming call according to the invention.
Figure 7B:
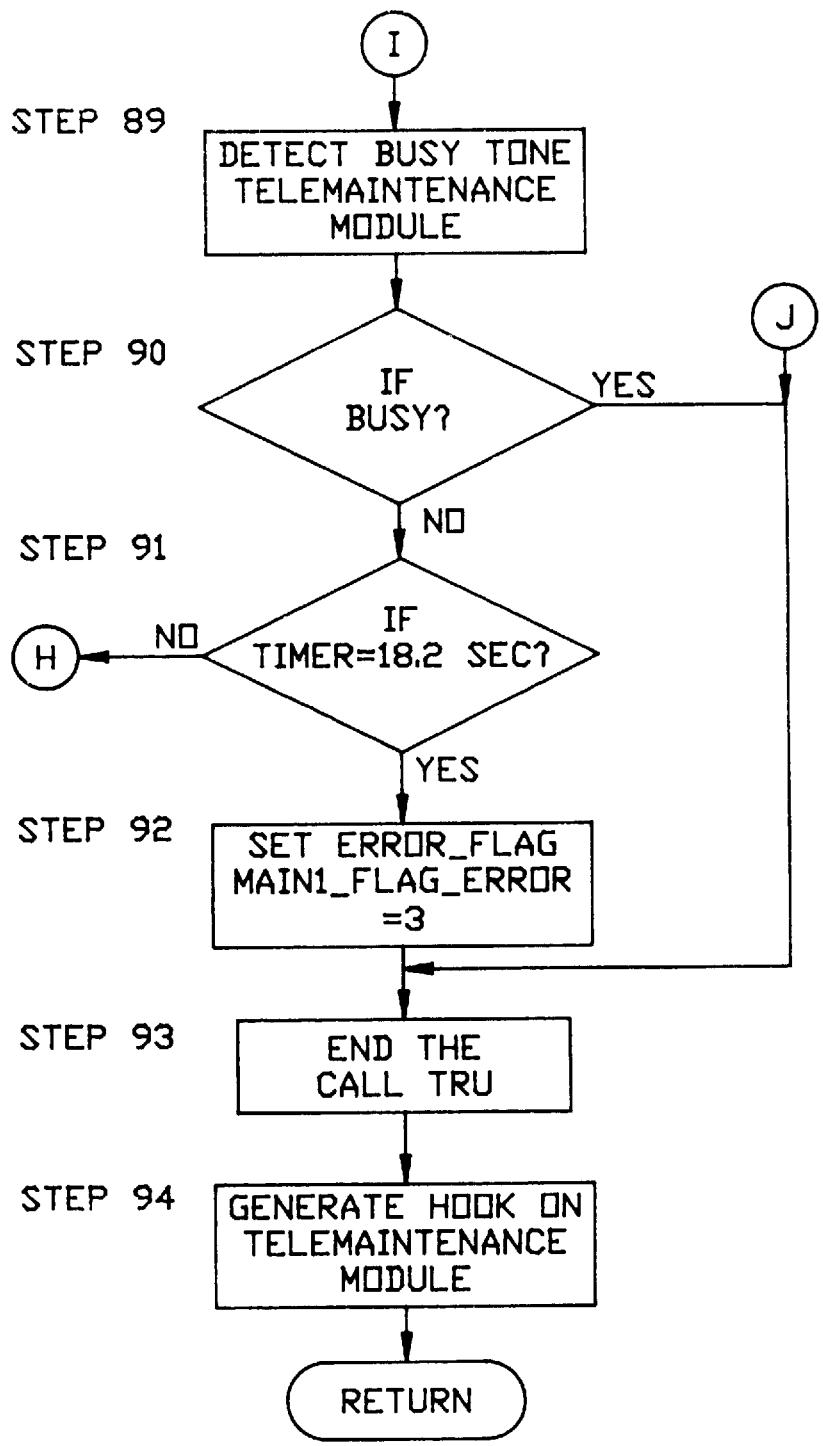

Referring to FIGS. 7A & 7B, the Call_Test subroutine is shown. This subroutine tests the cellular, or cellular-like, transceiver coupled to the interface board, by first checking the power, and, secondly, generating a call to its own telephone number. Referring to FIG. 7A, STEP 79 checks if the transceiver's power is "on". If the power is "off", the MAIN1_FLAG_ERROR is set to 1 in STEP 81, and then the program jumps to STEP 93 in FIG. 7B. However, if the power is "on", the program proceeds to STEP 82, where the interface board requests and gets the transceiver's assigned telephone number. STEP 83 is a time delay to allow reaction time for the transceiver. In STEP 84, the interface board generates a telephone call to itself. STEP 85 is a time delay to allow time for connection between the cellular, or cellular-like, network and the transceiver. In STEP 86, the interface board requests the IN USE status from the transceiver. STEP 87 checks the status of the call. If the status is not IN USE, the MAIN1_FLAG_ERROR is set to 4 in STEP 88, and then the program jumps to STEP 93 in FIG. 7B. However, if the transceiver is IN USE, the program proceeds to STEP 89 in FIG. 7B. In FIG. 7B, the telemaintenance module checks the busy-tone in STEP 89. If the busy-tone is detected in STEP 90, then the program jumps to STEP 93 for an indication that all is operating correctly. However, if the busy-tone is not detected, the program proceeds to STEP 91, where the timer is checked. If the timer is less than 18.2 seconds, then the program loops back to STEP 86. This allows more time to the cellular, or cellular-like, network to return the busy-response. However, if the time has expired, the program proceeds to STEP 92, where the MAIN1_FLAG_ERROR is set to 3. In STEP 93, the interface board sends an END of call to the transceiver. Then, the telemaintenance module presents an on-hook to the interface board in STEP 94. Finally, the sub-routine ends and the program returns to the main subroutine Do_Test.

Figure 8A:
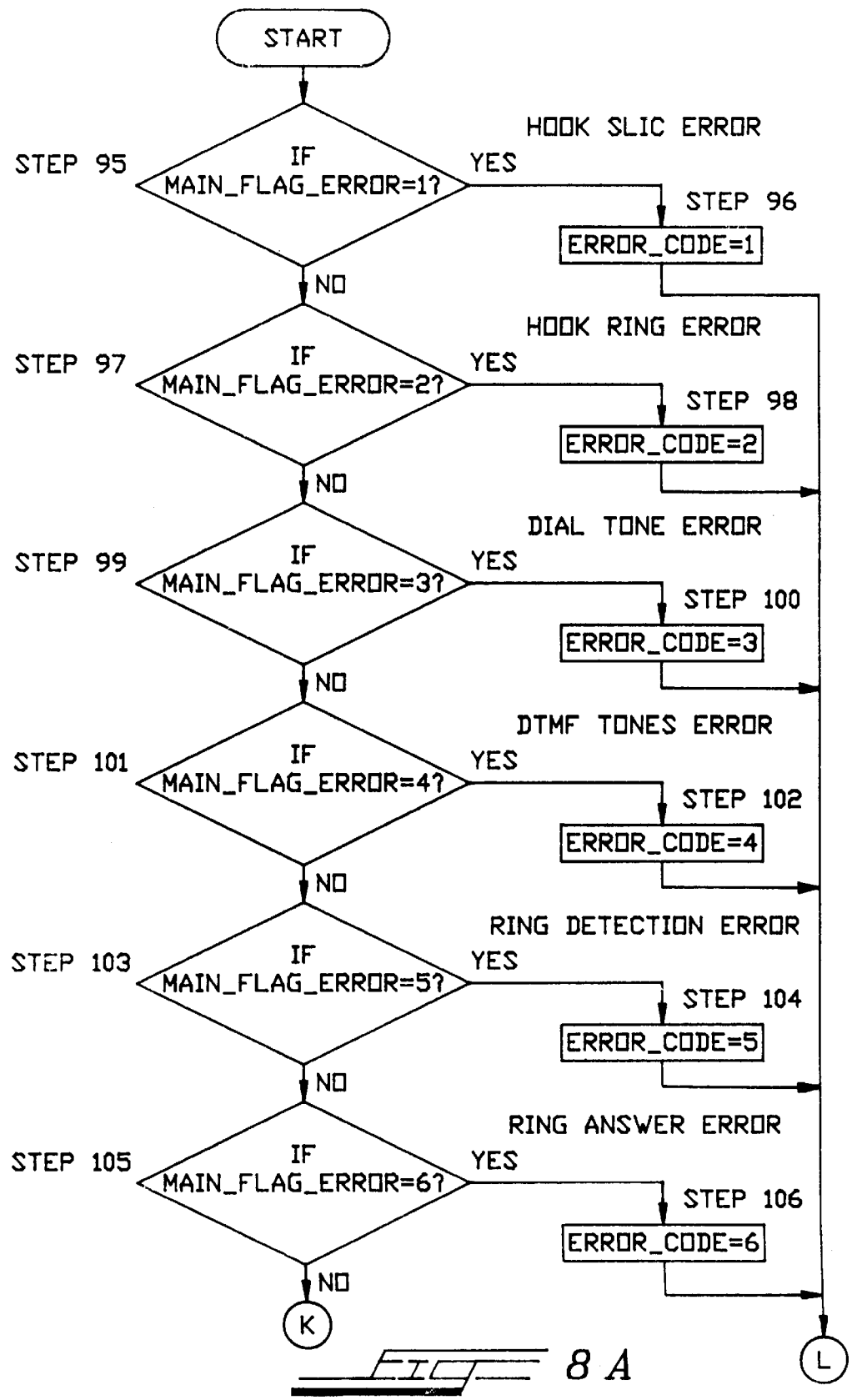
FIGS. 8A and 8B show the error-code generation according to the invention.
Figure 8B:
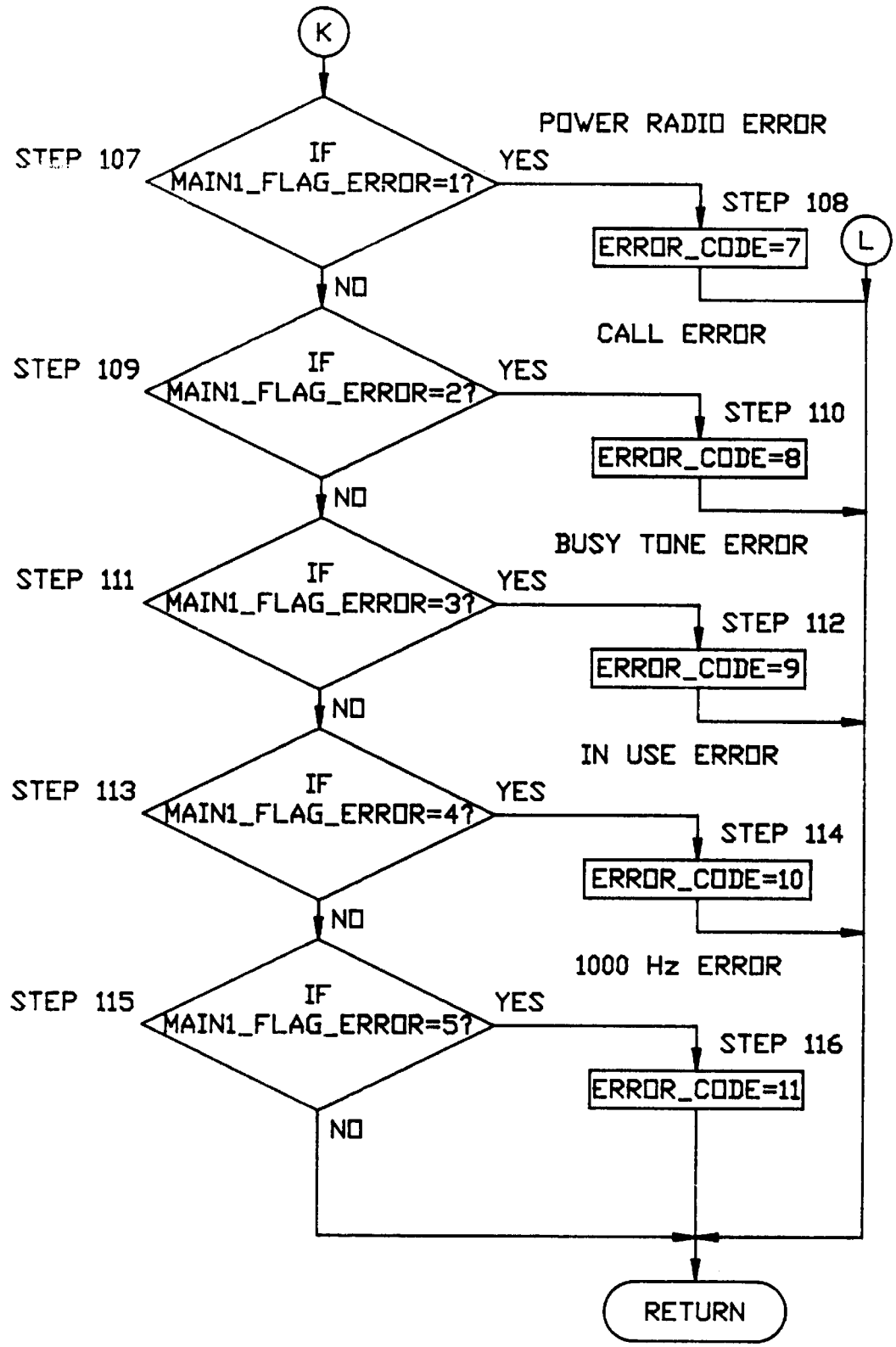

The objective of FIG. 8A and FIG. 8B is to generate at an ERROR_CODE from the previously-described error flags, in such a way that the results can be output later through LEDs. Referring to FIG. 8A, the subroutine starts checking the value of one of two error flags, the MAIN_FLAG_ERROR. STEP 95 checks if MAIN_FLAG_ERROR is equal 1 or Hook Slic Error. If true, the ERROR_CODE is set to 1 in STEP 96, and then the program returns to the main subroutine Do_Test. However, if false, the program continues in STEP 97. STEP 97 checks if MAIN_FLAG_ERROR is equal 2 or hook-ring error. If true, the ERROR_CODE is set to 2 in STEP 98, and then the program returns to the main subroutine Do_Test. However, if false, the program continues in STEP 99. STEP 99 checks if MAIN_FLAG_ERROR is equal 3 or dial-tone error. If true, the ERROR_CODE is set to 3 in STEP 100, and then the program returns to the main subroutine Do_Test. However, if false, the program continues in STEP 101. STEP 101 checks if MAIN_FLAG_ERROR is equal 4 or DTMF tone error. If true, the ERROR_CODE is set to 4 in Step 102, and then the program returns to the main subroutine Do_Test. However, if false, the program continues in STEP 103. STEP 103 checks if MAIN_FLAG_ERROR is equal 5 or ring-detection error. If true, the ERROR_CODE is set to 5 in STEP 104, and then the program returns to the main subroutine Do_Test. However, if false, the program continues in STEP 105. STEP 105 checks if MAIN_FLAG_ERROR is equal 6 or ring-answer error. If true, the ERROR_CODE is set to 6 in STEP 106, and then the program returns to the main subroutine Do_Test. However, if false, the program jumps to STEP 107 in FIG. 8B. In FIG. 8.B, the subroutine starts checking the value of the second error flag, the MAIN1_FLAG_ERROR. STEP 107 checks if MAIN1_FLAG_ERROR is equal 1 or power-radio error. If true, the ERROR_CODE is set to 7 in STEP 108, and then the program returns to the main subroutine Do_Test. However, if false, the program continues in STEP 109. STEP 109 checks if MAIN1_FLAG_ERROR is equal 2 or call error. If true, the ERROR_CODE is set to 8 in STEP 110, and then the program returns to the main subroutine Do_Test. However, if false, the program continues in STEP 111. STEP 111 checks if MAIN1_FLAG_ERROR is equal 3 or busy-tone error. If true, the ERROR_CODE is set to 9 in STEP 112, and then the program returns to the main subroutine Do_Test. However, if false, the program continues in STEP 113. STEP 113 checks if MAIN1_FLAG_ERROR is equal 4 or "In Use" error. If true, the ERROR_CODE is set to 10 in Step 114, and then the program returns to the main subroutine Do_Test. However, if false, the program continues in STEP 115. STEP 115 checks if MAIN1_FLAG_ERROR is equal 5 or 1000 Hz. error. If true, the ERROR_CODE is set to 11 to STEP 116 Do_Test. However, if false, the program returns to the main subroutine Do_Test.

Figure 9:
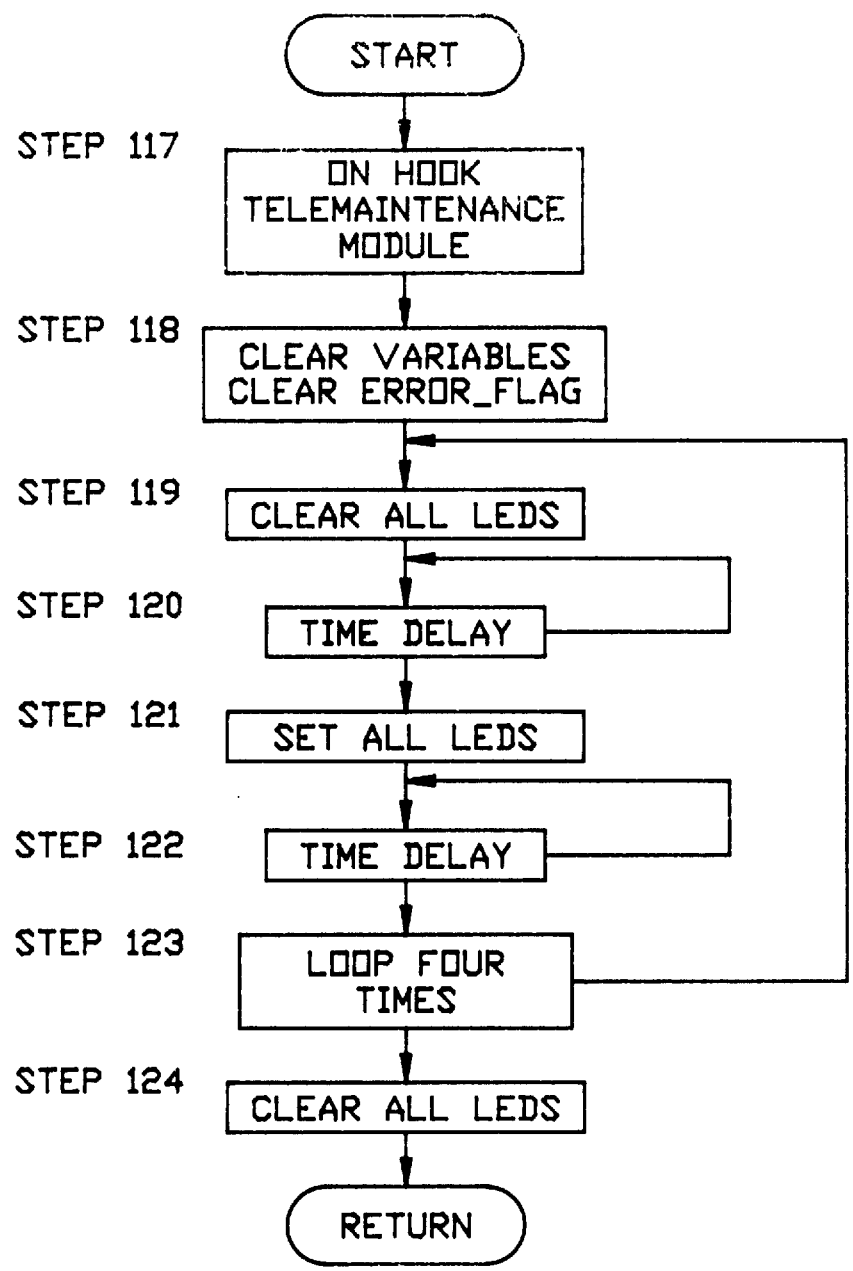
FIG. 9 is a flow chart showing the reset subroutine according to the invention.

Referring FIG. 9, FIN_SELF subroutine, the objective of this subroutine is to reset the interface board to its normal functioning, and to show the end of the test by flashing the LEDs four times. The subroutine starts with STEP 117, where the telemaintenance module generates an on-hook. In STEP 118, all variables and error flags are cleared. STEP 119 turns off all LEDs. STEP 120 is a time delay. STEP 121 turns on all LED's. STEP 122 is a time delay. STEP 123 permits to loop back to STEP 119, so that the flashing is performed four times. Finally, STEP 124 clears all LEDs, and then the program returns to the main subroutine Do_Test of FIGS. 1A & 1B.

Figure 15:
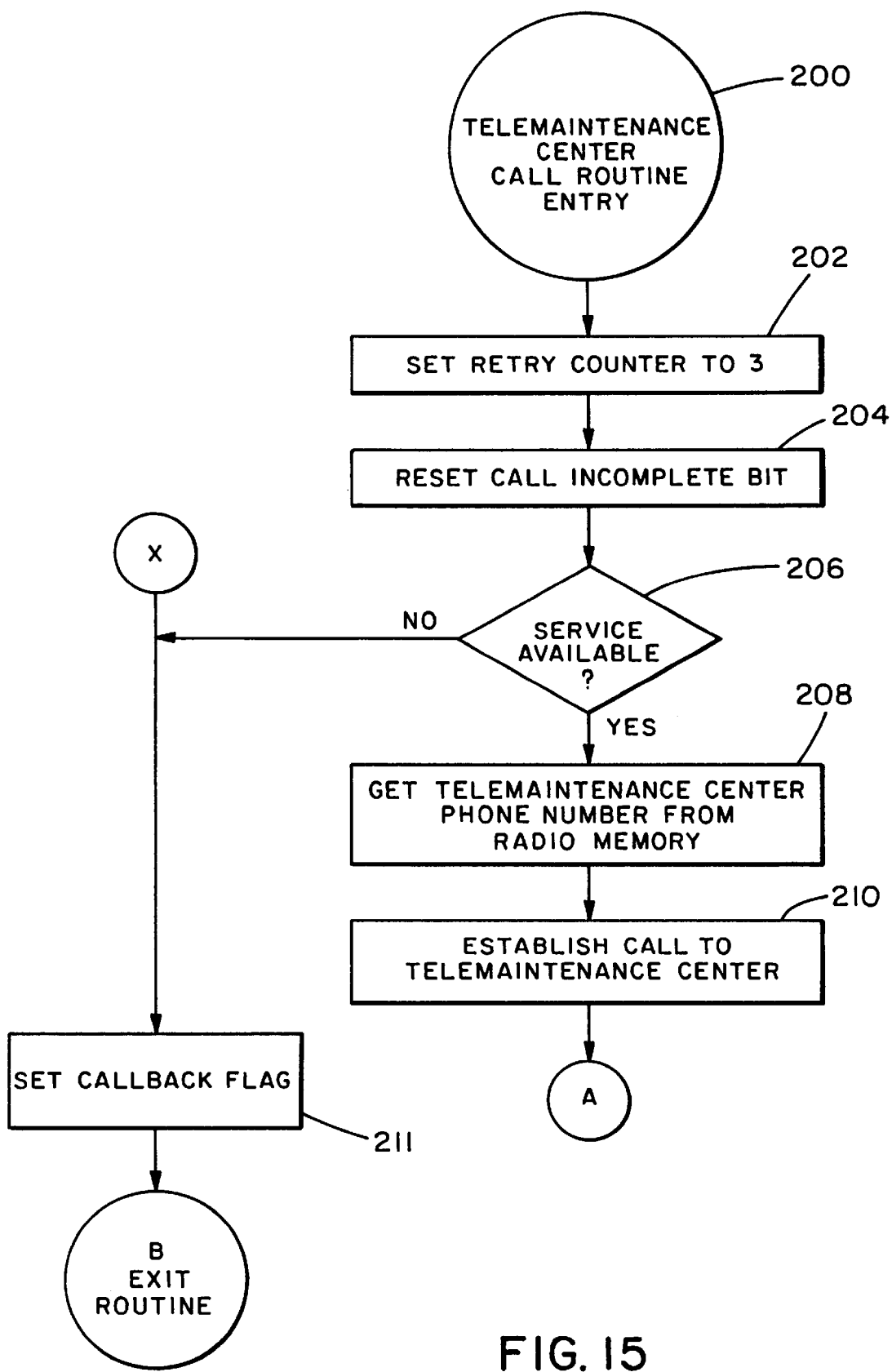
FIGS. 15–17 are flow charts showing the procedure when the test results of the cellular or cellular-like interface, with associated equuipment, are sent to a remote telemaintenance center.

The following is a description of the operation of the of the invention, with reference being had to FIG. 15, which is followed by the description of the individual circuits used for carrying out the above-described auto-test, which is followed by the software program for carrying out the operations detailed therein.

Figure 10:
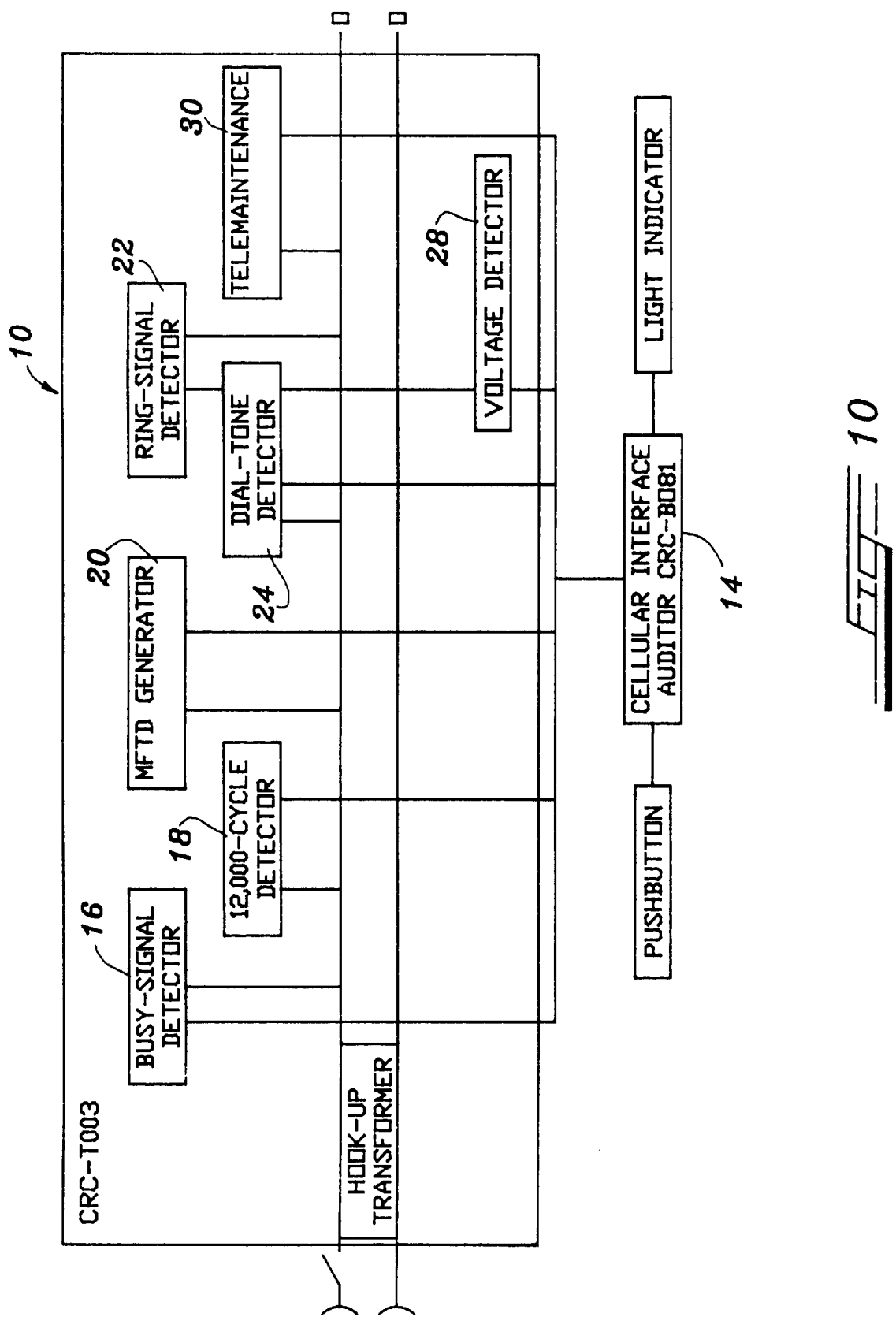
FIG. 10 is a block diagram of the system of the invention.

Referring to FIG. 10, there is shown a block diagram of the telemaintenance circuit module, which is indicated generally by reference numeral 10. The telemaintenance circuit module 10 is installed in a cellular, or cellular-like, adaptor system such as that disclosed in U.S. Pat. Nos. 4,658,096 and 4,737,975, and is designed to initiate a process of automatic testing from the facilities of the telephone subscriber by push-button activation or by automatic testing at intervals of approximately 12 hours, according to the flow charts of FIGS. 1A–9, as described above in detail. The final result of this autotest will be provided to the user by way of an orange-colored light indicator (LED) installed in the right wall of the cellular, or cellular-like, adaptor. The telemaintenance circuit module 10 has the capacity of reporting the results of the test to a remote service center. This report will be accomplished by way of an automatic call to the assigned number for the service center. This function requires that the service center be equipped with the hardware and software necessary to establish communication, and to interpret the received reports. The autodiagnostic test of the invention verifies the correct operation of the cellular, or cellular-like, adaptor, including its components, such as: principal circuits of the interface card, data cable between the radio and interface, transmission line, antenna, cellular, or cellular-like, transceiver, tollcharge circuit and supply source. The telemaintenance circuit has been configured in order to call the same number assigned to the adaptor transceiver where the test is carried out. The autodiagnostic circuit is programmed to detect a busy or line-congestion signal as an indication that a call can be made, and that the transmission circuit is operating correctly.

The telemaintenance circuit module 10 is designed to be utilized in the cellular, or cellular-like, adaptor unit in order to verify that the latter is operating correctly without necessitating sending technical personnel to the site where the equipment is installed. The telemaintenance circuit module 10 is supplied directly from the cellular, or cellular-like, interface board. The advanced telemaintenance circuit is not an autonomous circuit. Its operation depends on control signals that it receives from the auditor localized in the cellular, or cellular-like, interface board. The auditor compares the results of the tests with the parameters of the system's operating program. The autodiagnostic circuit of the telemaintenance circuit module 10 conducts the following tests: Answering errors [wrong number]—This test is conducted by two alternate methods; ring voltage—the circuit generates a call and detects the presence of ring voltage that the interface card produces; Call answer—verifies that the ring stops once it is answered; Dial tone—verifies the presence of the dial tone; MFTD Operation—assures that the interface card properly detects the receipt of the MFTD [multifrequency tone detector] tones; transceiver test; reception circuit test; transmission circuit test; toll-charge circuit test—verifies the frequency characteristic of the pulses generated at 12 KHz; transceiver power supply; performance of the power supply system. These tests have been detailed above in the description of the flow charts of FIGS. 1A to 9.

The telemaintenance circuit module 10 is connected to the conventional, cellular, or cellular-like, interface card by a 20-position plug connector. The test routine is initiated by way of a manual switch installed on the right side of the adaptor box. Upon finding an abnormality in the operation of the telephone, as, for example, not hearing the dial tone upon picking up the receiver, the subscriber proceeds to the adaptor box and presses a test pushbutton, which is properly identified. The telemaintenance circuit module 10 proceeds to disconnect the connection of the subscriber's telephone to the cellular, or cellular-like, interface board, and to accomplish a sequence of autodiagnostic tests, as described above. The telemaintenance circuit module 10 is also programmed to initiate the test routine automatically at intervals of approximately 12 hours from the moment the cellular, or cellular-like, interface board is turned on. When the test is automatically initiated, the sequence of the outgoing test call is not generated. By means of further development, the autodiagnostic test start-up function can be initiated from a remote center. This telemaintenance function carries a modification to the operating software of the interface board, and has an auxiliary development for the hardware and software of the telemaintenance center. Upon initiating the autotest routine, the orange-colored light indicator (LED) will flash to indicate to the subscriber that the test is taking place. There are pauses in the indicate flash of approximately one second between each of the tests accomplished by the circuit. The complete test will last approximately 40 seconds. Upon finishing the test, the success of the test is shown by the light indicator remaining on. In this case, the existing problem would be related to the wiring or to the telephone apparatus connected to the cellular, or cellular-like, interface board. Once the light indicator stays lit continuously, the cellular, or cellular-like, interface board returns to its normal operating condition. When a breakdown of the cellular, or cellular-like, interface board is determined from the tests, the light indicator will be extinguished indefinitely. This indicates to the user that a breakdown exists in the cellular, or cellular-like, adaptor. Once the test routine is finished, the cellular, or cellular-like, interface board returns to its normal operating condition irrespective of what breakdown was detected. The user may continue using the adaptor even with the existing limitations due to the detected breakdown.

The 4-light indicator (LEDs) in the circuit of the cellular, or cellular-like, interface board will be utilized to identify the detected breakdown. This presentation is of help to the service technician who can gain access to the inside of the box in order to ascertain the nature of a possible breakdown. The combination of "on" and "off" LED's will identify the primary detected breakdown in the test. This combination will remain lit for 60 seconds once the test ends. A list of the possible breakdown codes indicated by the LED of the cellular, or cellular-like, interface board is given below.

On concluding the autotest, a call will be initiated to the telemaintenance center if a breakdown has been detected. Once the communication is established, the detected breakdown will be reported. This telemaintenance function will allow the establishment of a database for each unit. If the test was manually initiated by way of the pushbutton, the complete result of the finished test, irrespective of whether breakdowns were detected, will be reported to the telemaintenance center.

The following is a listing of the codes as displayed by the LED array:

4.10 ERROR CODE

| Type of Error | LED 5 | LED 4 | LED 3 | LED 2 |
|---|---|---|---|---|
| No Breakdowns | OFF | OFF | OFF | OFF |
| Loop Error | OFF | OFF | OFF | ON |
| Loop Error | OFF | OFF | ON | OFF |
| Dial Tone | OFF | OFF | ON | ON |
| MFTD Detector | OFF | ON | OFF | OFF |
| Ring Detector | OFF | ON | ON | ON |
| Call Answer | OFF | ON | ON | OFF |
| Transceiver Feed | OFF | ON | ON | ON |
| Transmitter (Call) | ON | OFF | OFF | ON |
| Receiver (Busy) | ON | OFF | OFF | OFF |
| Tone Detection at 12 KHz | ON | OFF | ON | ON |
| Feed from Power Source | ON | OFF | ON | OFF |
| "NO SERVICE" | ON | ON | ON | ON |
| Transmission Circuit | ON | ON | ON | OFF |
| Undetermined | ON | ON | OFF | ON |
| Undetermined | ON | ON | OFF | OFF |

The sequence of the autotest is as follows. The first action accomplished by the telemaintenance circuit is disconnecting the installation of the subscriber. Then, a condition of "answer the subscriber's telephone" is simulated. In this condition, the correct detection of the loop closing can be checked, thus generating the dial tone. Then, the correct generation of the dial tone can be verified within a minimum frequency and level range. Next, a test of the multi-frequency tone detector of MFTD begins. This consists of the telemaintenance circuit module's autodiagnostic card generating the entire sequence of 16 MFTD tones, sending it to the conventional, cellular, or cellular-like, interface board of the cellular, or cellular-like, adapter, and verifying that these tones are correctly detected. Then, a test is carried out for verifying the correct functioning of the ring generator. The ring-current is generated, verifying its frequency and level within an established minimum range. Then, the condition of answering the telephone is simulated anew, or call answer, in order to check the function of the ring circuit, which should deactivate before the telephone is answered. The next test detects the capacity of the tollcharge circuit to generate pulses at 12 KHz within a minimum frequency and level range, for the case of cellular, or cellular-like, -adapter pay telephones. The pulses generated by the tollcharge card will be detected by a precise pulse detector in the telemaintenance circuit module 10 in a manner that is well-known. For cellular, or cellular-like, adapter systems that do not have a tollcharge module, then the connector J1.3 of the cellular, or cellular-like, interface card is configured with the bridge removed. The bridge will be installed in those units that have the tollcharge module installed.

The next tests verify the functioning of the cellular, or cellular-like, transceiver. First, supply to the transceiver is verified. This test is made by means of the detection of +12 VDC derived from the data connector of the transceiver. Secondly, the transceiver is verified that it is in a condition of providing cellular, or cellular-like, access-service, indicated by the absence of the "NO SERVICE" signal. The presence of the "NO SERVICE" signal will be recognized as a breakdown. This condition can be caused by a cover defect, and not just a breakdown of the cellular, or cellular-like, transceiver. Next, a call is generated through the cellular, or cellular-like, network, to the number owned by the subscriber. The transceiver function is checked in this manner, detecting it as receiving a busy signal from the system, since, it is calling itself. In the case of finding the network congested, this will inform the transceiver of a "PATH ENGAGED" condition. The transceiver then generates a congestion (busy) tone. This tone is interpreted as a correct transceiver function, the same as the busy signal. This test will be accomplished only when the routine is manually initiated by pushbutton. This test will not be accomplished in units that initiate the process automatically. The voltage of the supply system power is also checked. If the voltage is less than 13.5 VDC, a breakdown in the supply source is detected.

In FIG. 10, the main telemaintenance module 10 is coupled to the standard cellular, or cellular-like, adapter or interface board 14. Within the telemaintenance module, there are a number of individual circuits that are used for performing the self-diagnosing tests, as described above. These circuits are: The busy-signal detector 16 used during the test for proper reception of a call made by the telemaintenance module during the call-back self-testing described above with reference to FIG. 7A; the 12,000-cycle detector circuit 18 used for tollcharge testing, which verifies the frequency characteristic of the pulses generated at 12 KHz; the MFTD generator circuit 20, which generates the DTMF signals converted by the cellular, or cellular-like, interface card, as described above with reference to FIG. 4; the ring-signal detector circuit 22, which is used for detecting the ring-signal generated by the cellular, or cellular-like, adapter interface board during the ring-test and ring-answer subroutines, described above with reference to FIGS. 5A through 6; the dial-tone detector circuit 24, which detects for the proper generation of dial tone by the cellular, or cellular-like, adapter interface board 14, as described above with reference to FIG. 3; the voltage-detector circuit 28 for testing the power supply of the transceiver and the entire system; and the telemaintenance control unit 30, which is the control unit and which is also used for calling and reporting to the central reporting station the results of the autotest. The actual configuration of each of the above-noted circuits is shown in FIGS. 11–14, which are described below in detail.

Figure 11:
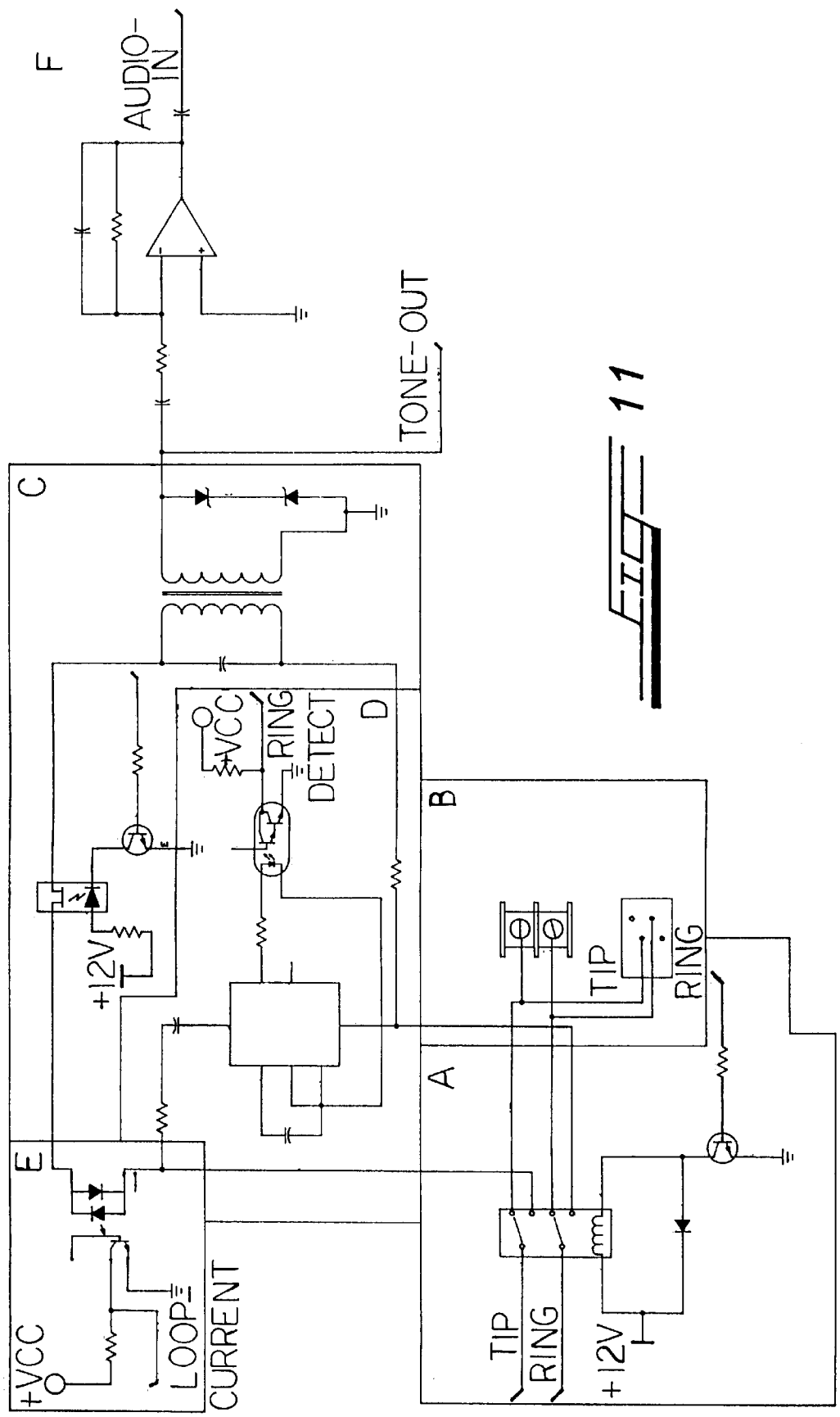
FIGS. 11–14 are schematics showing the various circuits used for testing the cellular, or cellular-like, interface and transceiver by simulating the events to be tested.

Referring now to the FIGS. 11–14, there are shown the hardware circuits for performing the simulation tests described above during the entire self-testing process. Referring to FIG. 11, there is shown the interconnection circuit of the telemaintenance circuit module 10. The part of the schematic of FIG. 1 labeled "A" shows the location where the telemaintenance circuit is hooked into the lines of TIP & RING of the conventional cellular, or cellular-like, adapter interface board. The relate labeled "RELY1" is used to disconnect the user's telephone from the cellular, or cellular-like, interface during the maintenance operation test. Instead thereof, the telemaintenance circuit is hooked up to the TIP & RING in order to perform the tests. When the "ENABLE-TEST" signal is set to HI, the transistor Q3 is forced into saturation, and then energizes RELY1, connecting the maintenance circuit to the TIP and RING. The part of the schematic of FIG. 11 labeled "B" shows the user-telephone hook-up connector, where the user's telephone can be hooked to the board in two possible ways. J1 is a two terminal connector of P1 of a normal RJ11 telephone type socket.

The section of the schematic of FIG. 11 labeled "C" is the audio interface circuit, which is used as an interface between the TIP and RING lines and the Audio. T1 is a telephone matching transformer. Its function is to maintain similar AC and DC current characteristics of a telephone while allowing audio signals to be received and transmitted. Zener diodes D1 & D2 are used to cut up any signal with voltages higher than ±4.5V. Also included is an opto-isolator SSR1 that, in conjunction with transistor Q4, offers a mechanism to close the TIP & RING circuit. When the "Conn-Loop" signal is set to HI, the transistor Q4 is forced into saturation, which then energizes SSR1, closing the circuit and performing an off-hook.

The section of the schematic of FIG. 11 labeled "D" is the ring-detection circuit, which contains two main parts: U2, which is a ring-detector integrated circuit, and U9 with opto-isolator that provides a proper Cmos signal level output. A current is provide between pin 4 and pin 7 of U2 as an output signal when a ring-voltage is present at the TIP & RING lines. This current is then transformed by the opto-isolator U9, which then provides an active Low signal to the I/O.

The section of the schematic of FIG. 11 labeled "E" shows the loop-current detector, which contains an opto-isolator used to detected loop current. When the test is enabled (the "Enable-Test" signal is HI in part A) and an off-hook is performed, (the "Conn-Loop" signal is HI in part C), the TIP & RING lines go into close-circuit providing an off-hook current. This current is then transformed by U17 into an active Low signal to the I/O.

The section of the schematic of FIG. 11 labeled "F" is the input-output audio circuitry composed of ¼ of U1, an operational amplifier IC. The main function of this circuitry is to isolate and pre-amplify the incoming audio signals. The output of this circuit is called "Audio-In". Also, in this section the DTMF output generated by the telemaintenance circuit of the invention is sent to the TIP & RING lines. This DTMF signal is labeled as "Tone-Out".

Figure 12:
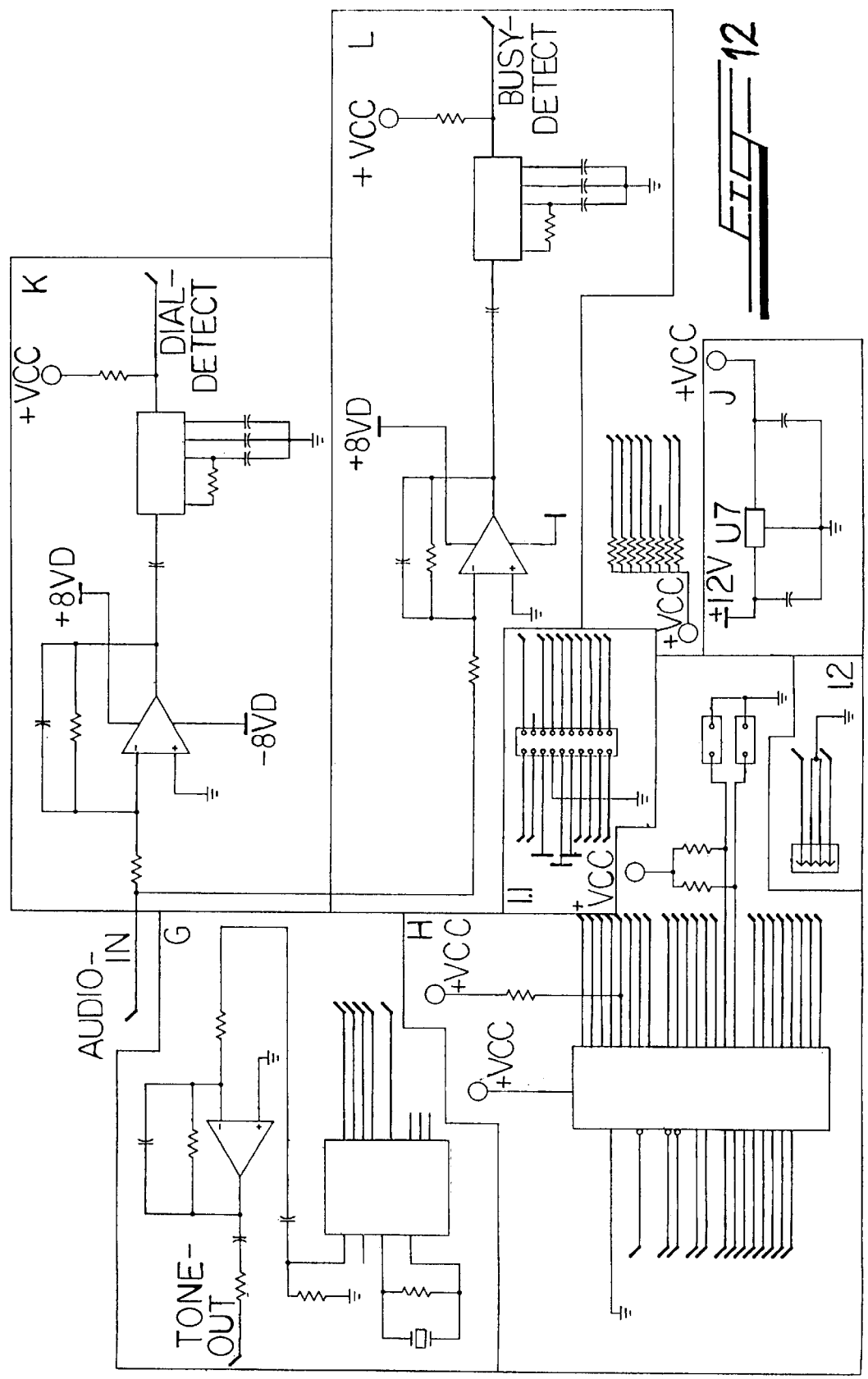

Referring now to FIG. 12, the part of the schematic of FIG. 12 labeled "G" is the DTMF tone generator, which is composed of U4, a DTMF tone generator, and ¼ of U1 used as an output amplifier. To generate a DTMF tone, first a four bit code is presented to the input pins labeled "DTMF0-OUT", "DTMF1-OUT", "DTMF2-OUT" and "DTMF4-OUT" in U4. Then, while keeping the four bit code, the enable signal labeled "DTMF-OUT" is changed from Low to HI level, thus allowing the tone to be generated. The audio is output at "TONE-OUT" after the audio had been amplified by U1:C. To stop the tone, the "DTMF-OUT" signal is returned to low level.

The section of the schematic of FIG. 12 labeled "H" is the input/output port, the I/O Port IC labeled U8. This integrated circuit is used by the microcontroller of the cellular, or cellular-like, interface board to read the input data and to control all of the output of the telemaintenance module. Ports A and C are input ports, while port B is an output port. Jumper J4 is the selector for the automatic periodic test with possible selections of 12 or 24 hours. J5 is used as an enable for the call to the "automatic answer".

The sections of the schematic of FIG. 12 labeled "I.1" and "I.2" are the power, data and control connectors, and contain J2, a 2 by 10 male header connector used to bring power, as well to send and receive data to the I/O Port. It also includes a 4 pin header connector for the external LED used to show the status of the test, and an external push button used to manually activate the test. The section of the schematic of FIG. 12 labeled "J" is the power regulator, and has U7, a 5 Volt fix-positive regulator that supplies the voltage necessary for the digital circuits.

The telemaintenance module 10 contains six single tone detectors used for testing the receiving audio path, frequency and timing cadence of ROH, Dial, Busy and Congestion tones. Each of the tone detectors is composed of an operational amplifier and a single tone detector IC. The input of the Opamp is connected to line "AUDIO-IN". The frequency of detection is set by a resistor located between pin 5 and 6 and a capacitor located between pin 6 and ground. When a valid tone matches the programmed tone by the RC, the tone detector output pin is forced from HI to Low.

Section "K" of FIG. 12 shows the dial-tone detector circuit. When a valid dial tone is present at the input of U3, the "DIAL-DETECT" line is forced to go Low. Section "L" shows the busy-tone detector circuit. When a valid busy tone is present at the input of U6, the "BUSY-DETECT" line is forced to go Low.

Figure 13:
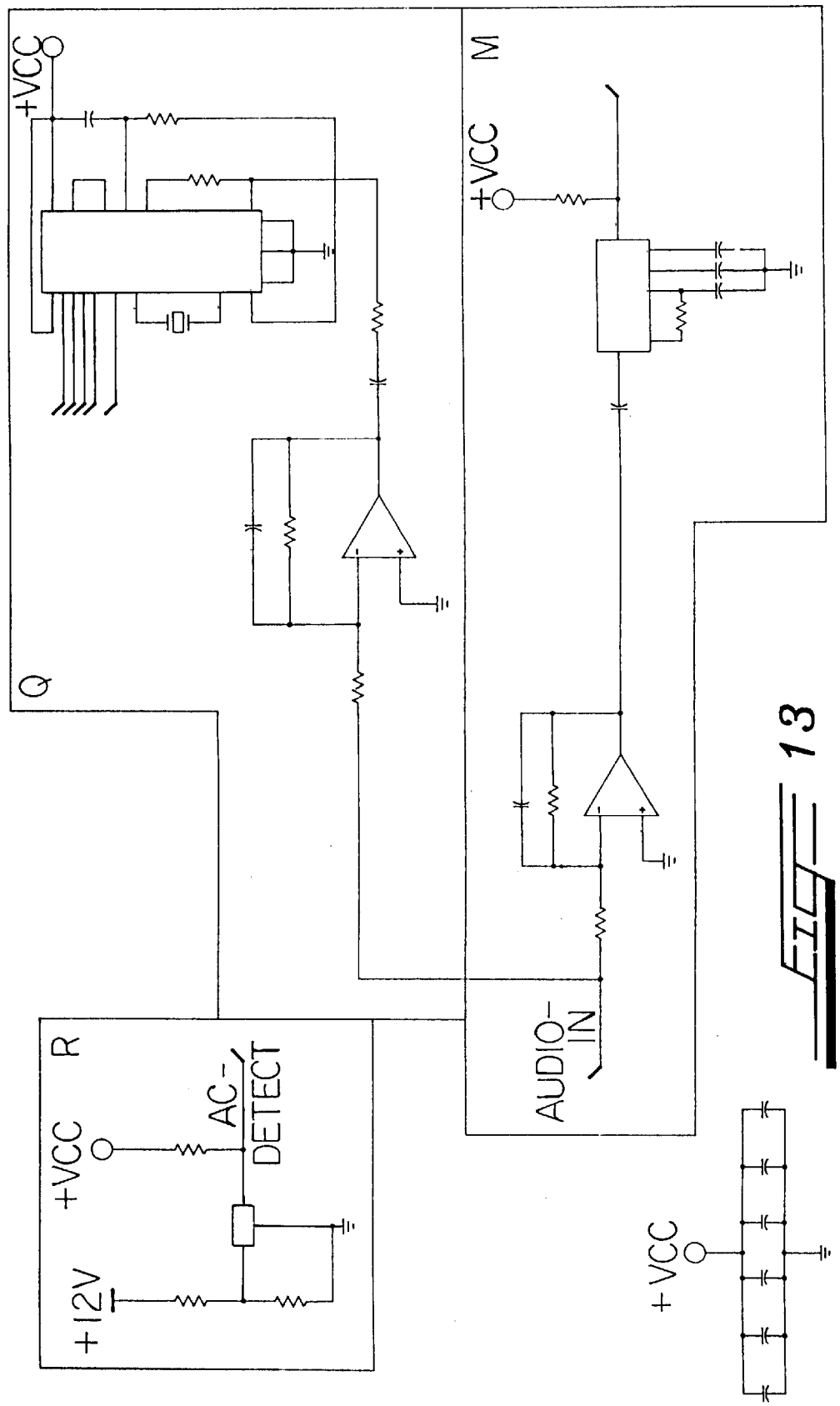

Section "M" of FIG. 13 shows a 400 Hz. tone-detector circuit. When a valid 400 Hz. tone is present at the input of U14, the "400-DETECT" line is forced to go Low.

Figure 14:
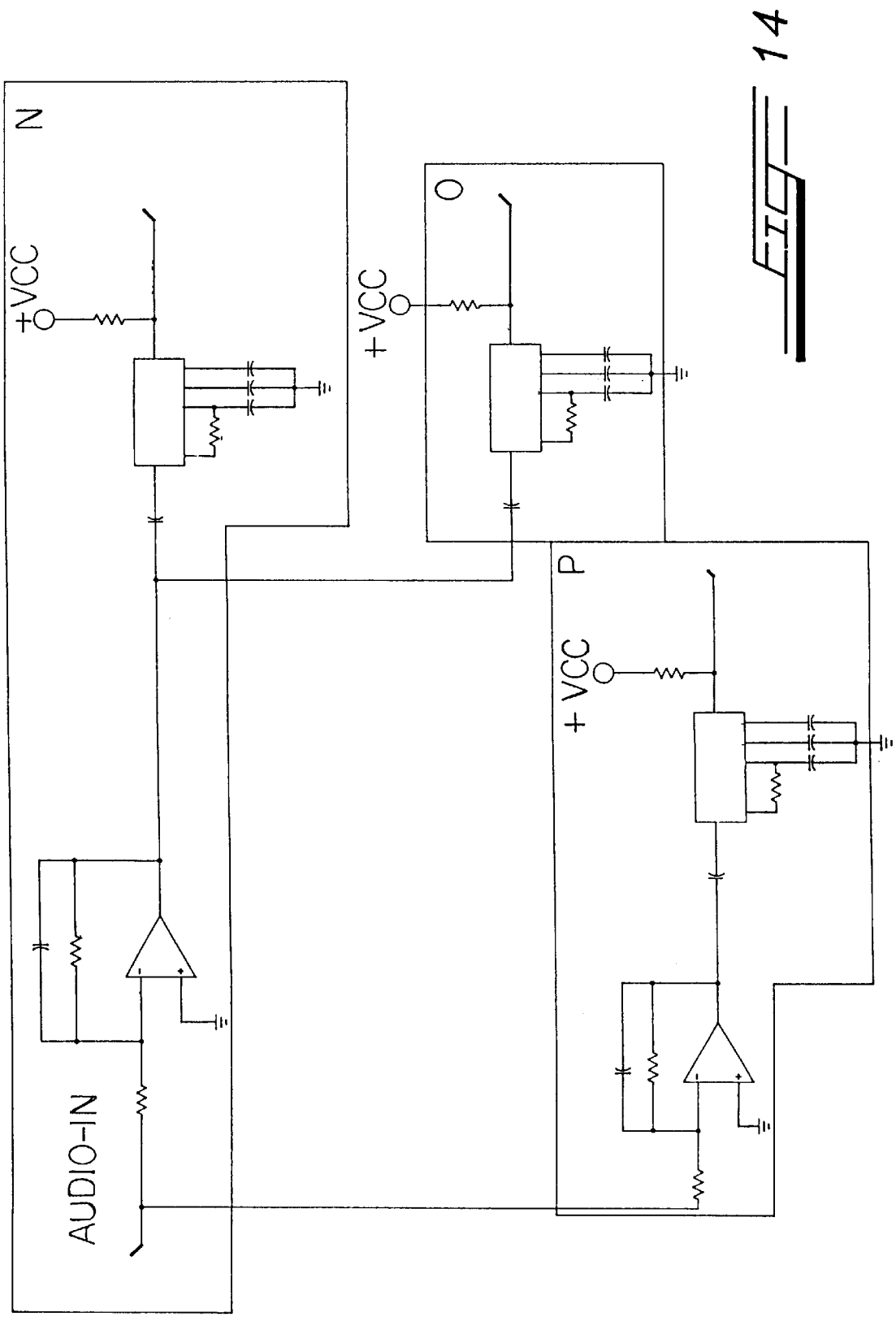

Section "IN" of FIG. 14 shows a 800 Hz. tone-detector circuit. When a valid 800 Hz. tone is present at the input of U13, the "800-DETECT" line is forced Low. Section "O" shows a 1020 Hz. tone-detector circuit. When a valid 1020 Hz. tone is present at the input of U16, the "1020-DETECT" line is forced Low. Section "P" shows a 12 KHz. tone-detector circuit. When a valid 12 KHz. tone is present at the input of U12, the "12 KHz-DETECT" line is forced Low.

Section "Q" of FIG. 13 shows a DTMF tone decoder, which is composed of U11, a DTMF tone detector and ¼ of U1 used as an input pre-amplifier. When a valid DTMF tone is present at the input pin (IN-), the control line "DTMF-STROBE" is forced Low, while the IC is decoding. After the tone has been decoded, a four bit code is output to pins labeled "DTMF0-IN", "DTMF1-IN", "DTMF2-IN" and "DTMF4-IN" in U11. The control line "DTMF-STROBE" is then returned to HI again. Section R is an AC monitor, having U10, a 4.5V under-voltage detector. Resistors R17 and R33 form a voltage divider that will make U10 sense voltage under 13 volts instead of 4.5 volts. The circuit works on the assumption that when the supply voltage comes from the power supply, a 14V is present at the entrance of the telemaintenance module. On the event of an AC power failure, the voltage drops to the battery back-up level, which is not greater than 13 volts. The circuit will detect the drop, and U10 will drive line labeled "AC-DETECT" to Low.

Figure 16:
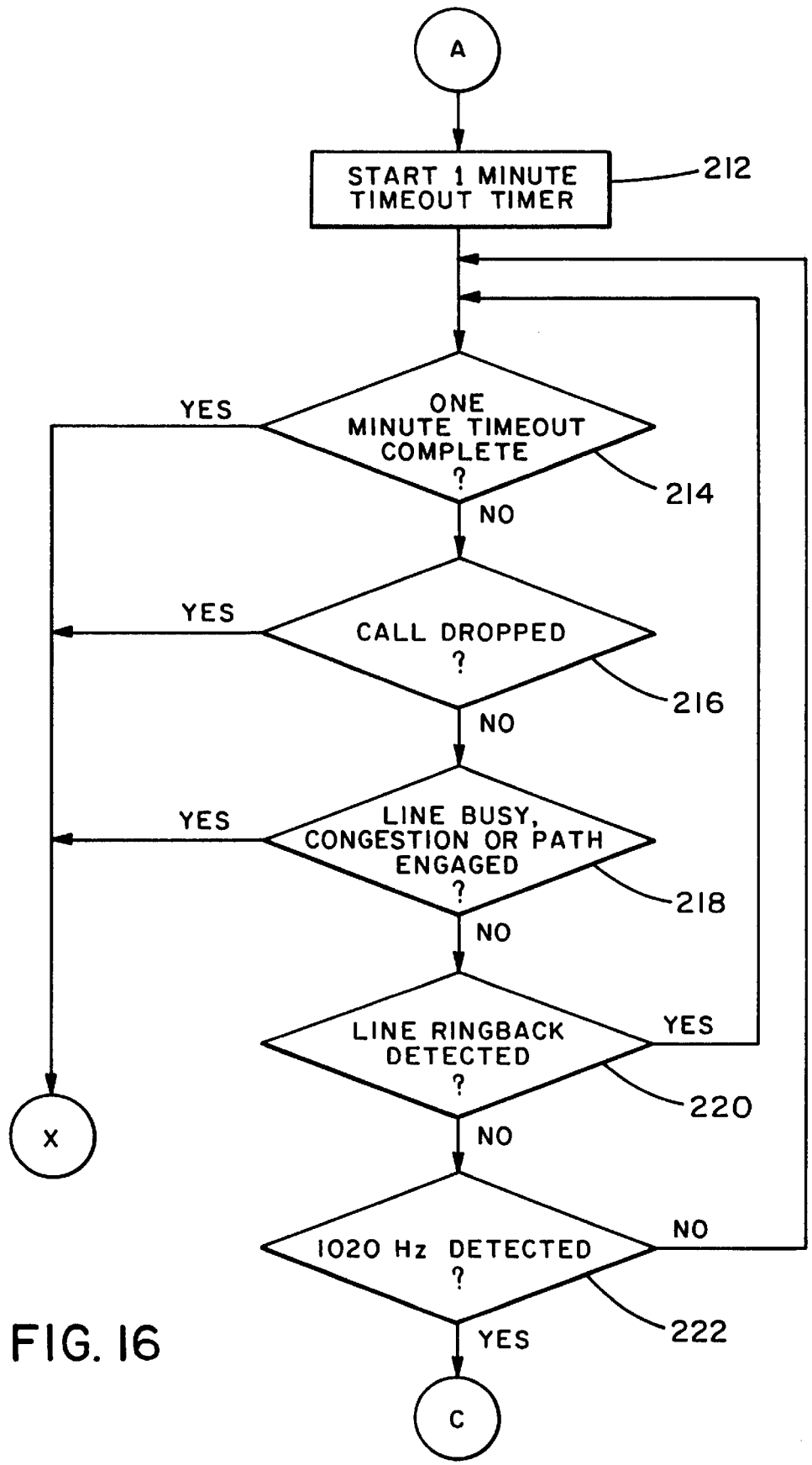
Figure 17:
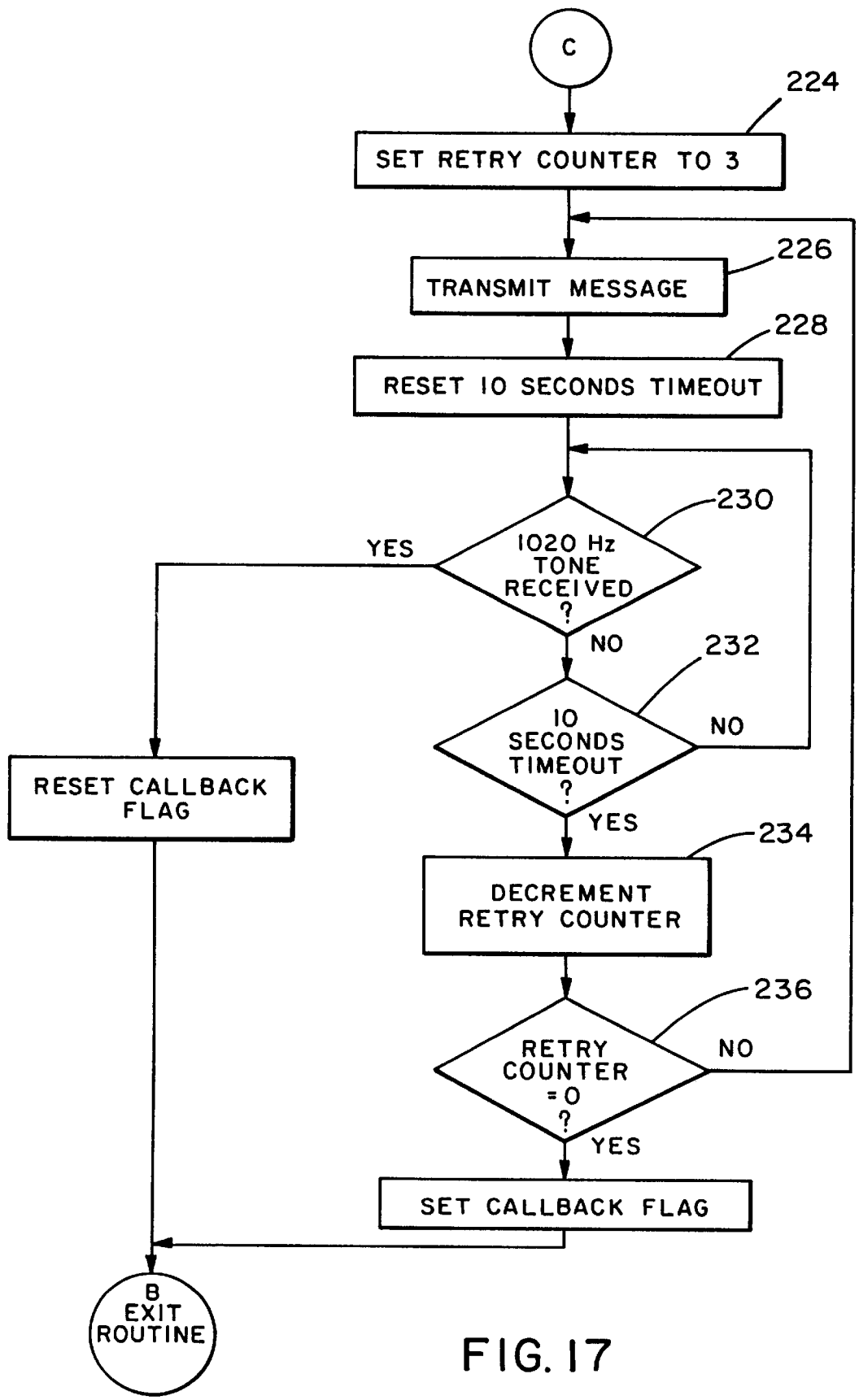
Figure 18:
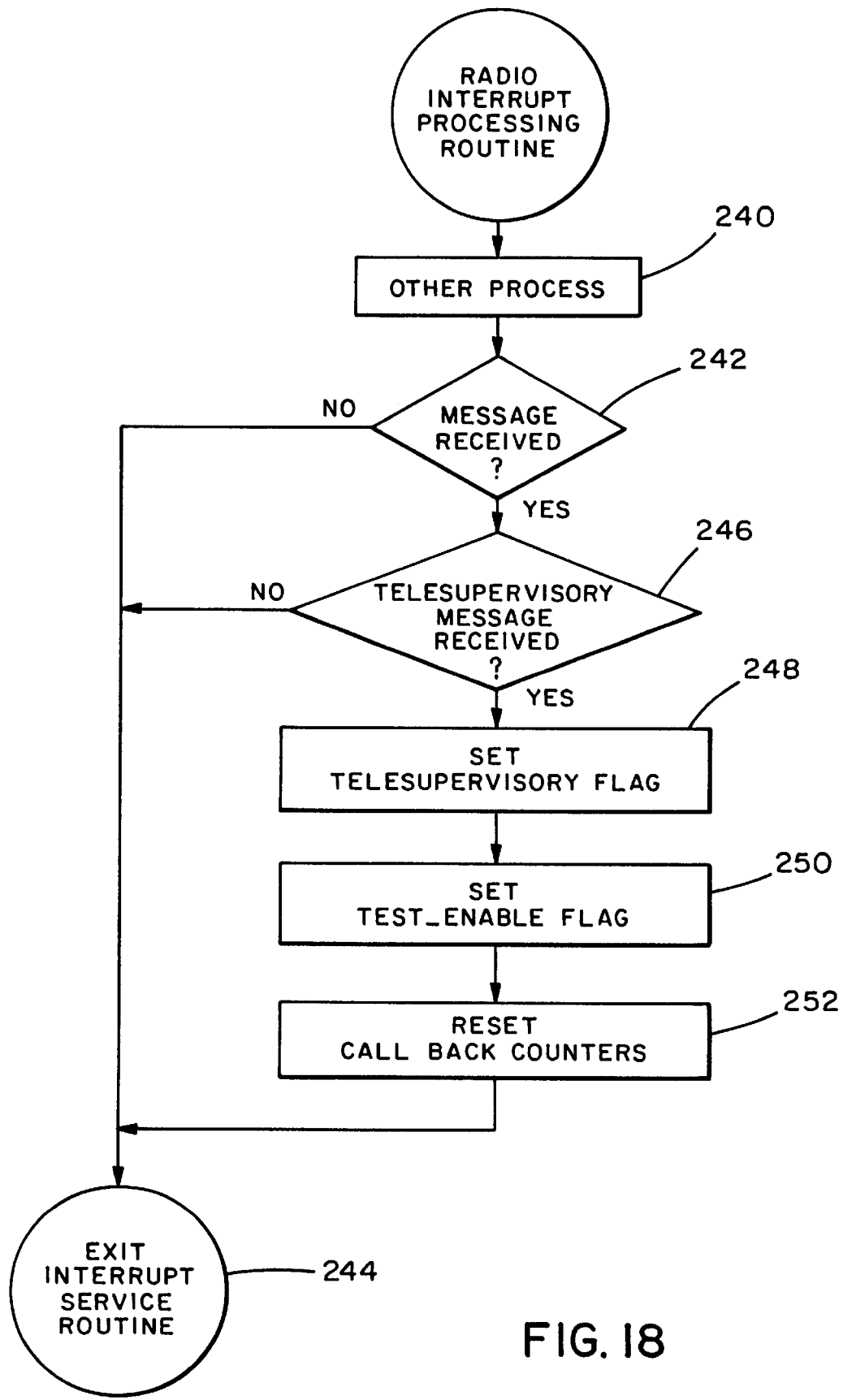
FIG. 18 is a flow chart showing the procedure when the testing of the of the cellular or cellular-like interface, with associated equuipment, is initiated by the remote telemaintenance center.
Figure 19:
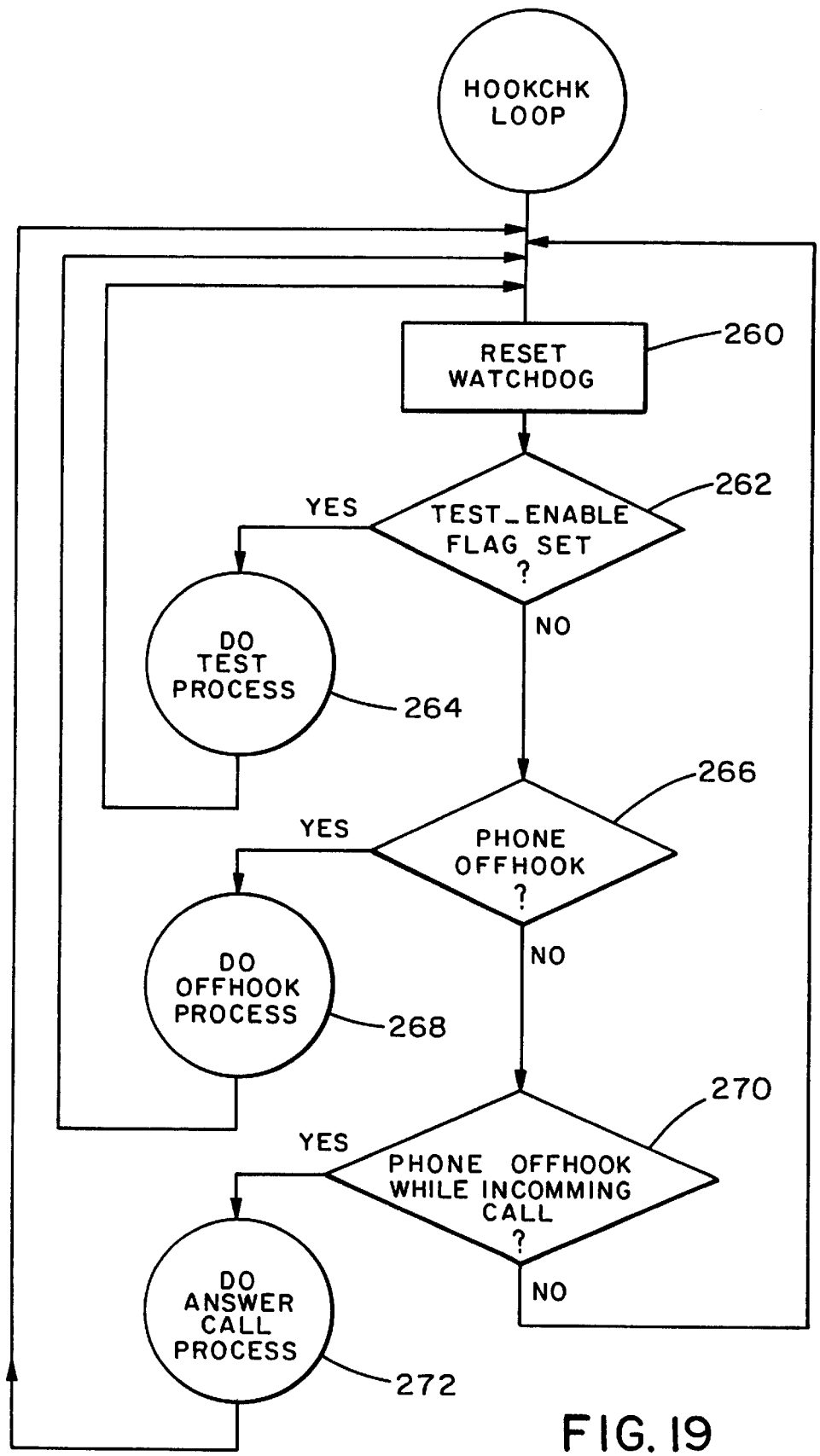
FIG. 19 is a flow chart showing the main-loop status verification routine.

Referring to FIGS. 16–20, there are shown in FIGS. 16–18 the flow charts for use in reporting the results of the self-diagnostic tests to the remote, central telemaintenance center, while there is shown in FIG. 19 a flow chart for initiating the self-diagnostic testing by the remote, central telemaintenance center.

Referring to FIG. 16, starting at the top (block 200) this is the entry point of the telemaintenance center calling routine. In STEP 1 (block 202), the transmission retry count variable is set to 3. This count determines the number of times a transmission is sent to the Telemaintenance Center before aborting the call. In STEP 2 (block 204), the call calls incomplete bit is reset. This clears any previous pending call, assuming a previous call was in progress and did not complete, setting a call-back flag. In STEP 3 (decision block 206), before calling the telemaintenance center, the system's service flag is checked. If there is a NO-SERVICE condition, the call aborts, setting the call_back flag. In STEP 4 (block 208), the telemaintenance center telephone number is recalled from the transceiver memory. In STEP 5 (block 210), the program instructs the radio to establish the call. Referring to FIG. 17, in STEP 8 (block 212), a counter/timer is set at the maximum time (timeout) the program will wait before dropping the call when a transmission/reception error occurs from the telemaintenance center. In STEP 10 (block 216), the NO-SERVICE and INUSE flags are tested to see if the call has been dropped. If the call has been dropped, the program transfers execution to STEP 6 (block 211) of FIG. 16. In Step 11 (block 218), and after receiving some signal on the receive audio channel, the signal received is checked for specific cadences like BUSY, and then the call is aborted, transferring execution to STEP 7, for the EXIT ROUTINE (see FIG. 16). In STEP 12 (block 220), and after receiving some signal on the receive audio channel, the signal received is checked for the cadence of the signal RINGBACK. If the RINGBACK signal is detected, the program transfers execution back to STEP 9 (block 214) to check to see if the one-minute timeout has been completed before entering the EXIT ROUTINE. In STEP 13 (block 222), the signal is checked for the presence of a 1020 Hz tone. If the tone is present for at least 100 ms, the program transfers execution to STEP 14 in FIG. 18 for the start of the message-sending routine. In STEP 14 (block 224, FIG. 18), a transmission retry count down variable is set to 3. This counter determines the maximum number of retransmissions to the telemaintenance center. In STEP 15 (block 226), the program transmits the message to the telemaintenance center. In STEP 16 (block 228), a 10 second timeout counter is set to zero. This counter determines that the program will wait 10 seconds for the acknowledgement-tone (1020 Hz) from the Telemaintenance Center. If this tone is not received within 10 seconds (STEP 16, block 232), the program continues with STEP 19. In STEP 19 (block 234), the transmission retry counter (Initially set at 3) is decremented. In STEP 20 (block 236), this counter is compared against zero. If the value of the counter is zero, the call-back flag is set, and then the program transfers execution to STEP 7 for carrying out the EXIT ROUTINE. In STEP 17 (decision block 230), if after transmitting the message a 1020 Hz tone is received from the telemaintenance center, meaning a message-received acknowledgement, the call_back flag is reset, ending the call successfully.

Referring to FIG. 19, the flow chart for the operation of the system of the invention by the initiation of the self-diagnostic testing by the remote telemaintenance center is shown. The objective of STEP 23 (block 240) is to denote that the Radio Interrupt Processing Routine does other tasks than the task described hereinbelow. These tasks are associated with the basic interface functions. In STEP 24 (decision block 242) a message-completion bit is checked. If a message is not received, the program transfers execution to STEP 29 (block 244), where the interrupt servicing routine is carried out. In STEP 25 (block 246), the incoming data byte of the radio is compared against the remote telesupervisory test activation code, sent by the telemaintenance center across the system. If the telesupervisory test activation code is received from the telemaintenance center, the program executes STEP 26 (block 248), where a flag is set on the call_back variable to indicate that the test has been initiated by the telemaintenance center. In STEP 27 (block 250), the test_enable flag is set to enable the test process. In STEP 28 (block 252), the variables associated with the test results are pre-defined to an initial state before the self-diagnostic test starts.

Referring to FIG. 20, there is shown the HOOKCHK routine for the verificaton of the status flags. The objective of STEP 30 (block 260) is to RESET the watch_dog timer to prevent CPU- reset. In STEP 31 (decision block 262), the test_enable flag is tested. If the test_enable flag is set to 1, meaning that the test has been enabled (which is set by a manual, timer-automatic or telesupervisory), the program branches to the DO-TEST process STEP 34 (block 264). After executing the DO-TEST process, the program returns to the HOOKCHK loop. In STEP 32 (decision block 266), the OFF-HOOK flag is tested. If the OFFHOOK flag is set to 1, meaning that the telephone has been OFF-Hooked, the program branches to the OFFHOOK process (STEP 35, block 268). After exiting the OFF-HOOK process, the programs return to the HOOKCHK loop. In STEP 33 (decision block 270), the FANSWER flag is tested. If the FANSWER flag is set, meaning that an incoming call has been received and that the telephone has been OFFHOOK, the program branches to the RING_ANSWER process (STEP 36, block 272). After exiting the RING_ANSWER process, the programs return to the HOOKCHK loop.

The following is a listing of the source code for performing self-diagnostics of the invention, followed by the source code for performing the reporting of the self-diagnostic test-results to the remote, central telemaintenance center, and for the initiation of the self-diagnostic testing by the remote, central telemaintenance center.

```
$nopi nosb db noge nomo nopr ep
$nolist
$include(reg252.pdf)
$list
;*****************************************************************
;                                                                 *
; Maxjack by Alexis V. Torres for Telular International, Inc.     *
; (C) Copyright Telular International, Inc. 1993 - 1995           *
; Telephone/cellular interface:                                   *
; Main program with the maintenance board                         *
;                                                                 *
;   11-29-92   maint.asm                                          *
;                                                                 *
;*****************************************************************

; These are the universal landline phone key codes.

zero            equ     0ah             ; [0] key code
star            equ     0bh             ; [*] key code
pound           equ     0ch             ; [#] key code ; Buffer area pointers for the HS display and the TRU messages.

dspbuf_start    equ     80h             ; Start of 16 byte LCD display buffer
dspbuf_end      equ     90h             ; End of LCD display buffer
msgbuf_start    equ     90h             ; Start of TRU (etc) msg buffer
msgbuf_end      equ     0h              ; End of TRU msg buffer main_flag       equ     0b0h            ; use indirect address for test flag
;hook_slic              1
;dial                   2
;dtmf                   3
;ring_test              4
;ans_test               5 main_flag_error equ     0b1h
;hook_slic_error        1               ; hook error
;hook_ring_error        2               ; hook error
;dial_error             3               ; dial tone error
;dtmf_error             4               ; dtmf error
;ring_test_error        5               ; ring error
;ans_test_error         6               ; ring answer error main1_flag      equ     0b2h            ; ditto
;power_radio            1               ; power radio error
;call_test              2               ; call error
;call_tone              3               ; call audio error main1_flag_error equ    0b3h            ; ditto
;power_radio_error      1               ; spare
;call_test_error        2               ; call spare error
;call_tone_error        3               ; call audio spare error
;inuse                  4               ; inuse error
;1000hz                 5               ; 1000hz error error_code      equ     0b4h            ; final indication LED indication
```

```
;hook_slic_error        1           ; hook
;hook_ring_error        2           ; hook
;dial_error             3           ; dial
;dtmf_error             4           ; dtmf
;ring_test_error        5           ; ring
;ans_test_error         6           ; ring answer
;power_radio_error      7           ; radio power
;call_test_error        8           ; call
;call_tone_error        9           ; call audio
;inuse                  10          ; inuse
;1000hz                 11          ; 1000 hz cero        equ     00h
uno         equ     08h
dos         equ     04h
tres        equ     0ch
cuatro      equ     02h
cinco       equ     0ah
seis        equ     06h
siete       equ     0eh
ocho        equ     01h
nueve       equ     09h
estrella    equ     0dh
libra       equ     03h ;****************************************************
;
;       Internal Ram variable definitions
;
;****************************************************

; Registers occupy bytes 00h-07h (reg. bank 0)

;r0     storage pointer (also address pointer for I/O expander)
;r1     pointer to storage of data from TRU
;r2     digit count
;r3     delay loop for bus timer
;r4     delay loop for bus timer
;r5     used in rohtone timer
;r6     used in send_time
;r7     used in rohtone timer ; Variable storage locations time_off1       data    10h         ;Measures off-hook time
time_off2       data    11h         ;Measures off-hook time
time_off3       data    12h         ;Measures off-hook time
time_on1        data    13h         ;Measures on-hook time
time_on2        data    14h         ;Measures on-hook time
pulse_digit     data    15h         ;Value of pulse dialed digit
in_use_off_timer data   16h         ;Checks for 2 sec after in use lamp
                                    ; goes out to do cpd
ring_timer      data    17h         ;Timer checks time between rings
bell_timer      data    18h         ;Timer generates 20hz for ringer
bell_timer2     data    19h         ;Timer for ringer
gndstart_timer1 data    1ah         ;Releases GS line if no connect in 1sec
gndstart_timer2 data    1bh         ;Same as above
;highpoint      data    1ch         ;Stores dph for tone tables
;lowpoint       data    1dh         ;Stores dpl for tone tables
highpoint       data    35h         ;Stores dph for tone tables
lowpoint        data    36h         ;Stores dpl for tone tables
test_min        data    1eh
```

```
;free            data     1fh

;******************************************************************
;
; The Ram area 20h thru 29h is reserved for use by the main
; module either as data BYTEs or individual BITs
;
;****************************************************************** flags     DATA     20h              ;This byte contains the following flag
fhook              bit     00h      ; as individually addressable bits
                                    ;Off hook flag set by coming off hook,
                                    ; cleared when processed
fsend              bit     01h      ;Send flag
fflash             bit     02h      ;Flash flag
fhang              bit     03h      ;Hang up flag
ftime              bit     04h      ;40 second timer flag
fdigit             bit     05h      ;Flag for pulse dig input
fonhook   bit              06h
                              ;On hook flag set 700msec
                              ;After hup, cleared by coming off-hook
fdtmfin   bit      07h        ;Dtmf input flag inds      DATA     21h              ;Indicators - this byte contains the
                                    ; following bits:
roam               bit     08h      ;Roam indicator
noserv             bit     09h      ;No service indicator
lock               bit     0ah      ;Lock indicator
rdis               bit     0bh      ;Reset digit display
horn               bit     0ch      ;Horn indicator
f_init             bit     0dh      ;Set by TRU only! (1 = inits done)
f_start            bit     0eh      ; 1 = onhook ints disabled for 500ms
test_enable        bit     0fh      ; auto test
                                    ; after first offhook to deglitch the
                                    ; contact bounces indasc    DATA     22h              ;Indicators & audio switch control this
                                    ; byte contains the following bits:
inuse              bit     10h      ;In use indicator
ap1                bit     11h      ;Audio path
ap2                bit     12h      ;Audio path
test_end           bit     13h
;not_error         bit     14h      ; no error flag for self test
return_ring        bit     15h
error_flag         bit     16h      ; self test error
ring_second        bit     17h io_status DATA     23h              ; Bits 18h - 1fh strobe             bit     1ch flags2    DATA     24h              ; Bits 20h - 27h
fdig_ready         bit     20h      ;Digit ready flag
fanswer            bit     21h      ;Ring answer flag
fsendtimer         bit     22h      ;Flag to send after 4 seconds
f_inuseofftiming   bit     23h      ;Flag shows timer is running to check
                                    ; 2 sec with in use lamp off
funlocktimer       bit     24h      ;Flag to unlock after 4 seconds
fdtone             bit     25h      ;Flag shows DT is on
fdecoder_busy      bit     26h      ;Flag shows dtmf decoder has not
                                    ; cleared yet
```

38

| | | | |
|---|---|---|---|
| fbellsound | bit | 27h | ;Flags ringer is sounding |
| | | | |
| px1_temp | DATA | 25h | ;Input/output buffer for port px1 -<br>; contains these bits: |
| mitelq1 | bit | 28h | ;From dtmf decoder |
| mitelq2 | bit | 29h | ;From dtmf decoder |
| mitelq3 | bit | 2ah | ;From dtmf decoder |
| mitelq4 | bit | 2bh | ;From dtmf decoder |
| power_hold | bit | 2ch | ;Maintain power after power failure to<br>; turn off TRU |
| spare1 | bit | 2dh | ;Spare I/O pin |
| spare2 | bit | 2eh | ;Spare I/O pin |
| no_ring | bit | 2fh | ;Spare I/O pin |
| | | | |
| px2_temp | DATA | 26h | ;I/O buffer for port px2 (30h - 37h) |
| loopswitch_ | bit | 30h | ;Low closes loop |
| ring_ | bit | 31h | ;Low turns on ring ps |
| mute_ | bit | 32h | ;Mute rx audio |
| roh_boost | bit | 33h | ;Increase gain for roh tone |
| sw_sendtimer | bit | 34h | ;Jumper in gives 4 sec send option |
| sw_dialtone | bit | 35h | ;Jumper in = diff dial tone for roam<br>; out means maintenance module |
| sw_gndstart | bit | 36h | ;IN = loop start, OUT = groundstart |
| sw_data | bit | 37h | ;Jumper in prevents, out allows digit<br>; data to TRU after send (to allow<br>; features from cell. switch) |
| | | | |
| lamps_temp | DATA | 27h | ;Contains these bits: |
| ;free | bit | 38h | ;Not really lamps -- these store the |
| ;free | bit | 39h | ; current status of indicators |
| ;free | bit | 3ah | |
| ;free | bit | 3bh | |
| roamlamp | bit | 3ch | |
| noservlamp | bit | 3dh | |
| locklamp | bit | 3eh | |
| inuselamp | bit | 3fh | |
| | | | |
| flags3 DATA | | 28h | ;More flags- this byte contains the<br>; following individually addressable<br>; bits |
| frohtimeout | bit | 40h | ;Set when rohtone has been on 1 minute |
| fcall | bit | 41h | ;Set when call incoming, clear if not |
| f_one_sec | bit | 42h | ;Set when off hook for one sec so<br>; change in inuse lamp won't cause<br>; remote hangup if phone taken off<br>; hook quickly after local hangup |
| roh_on | bit | 43h | ;Turns rohtone on & off |
| fspec1 | bit | 44h | ;Flag for special use with specific TRU<br>; processed in update_displays every<br>; 71.1 ms, calls spec1 |
| fspec2 | bit | 45h | ;Flag for special use with specific TRU<br>; processed in on- or off-hook timers<br>; every 277.8 usec, calls spec2 |
| fremote_hup | bit | 46h | ;Indicates remote hup for 700 msec<br>; delay |
| flocktimer | bit | 47h | ;Flag to lock after 2 seconds |

```
;****************************************************************
;
;                    Implemented TRU tasks
;
;****************************************************************
f_cmds          DATA    29h             ; Optional TRU specific task numbers
; TRU tasks are for calls from the main into the TRU module.

; Task 1:
;   a.) Power loss check for NEC 3700 (see nae01)
;   b.) Send change in hook switch status to OKI and also send initial CLR
;       for the Motorola (see oee02 and mae04)
;   c.) Call rdbus routine to read indicator status in the Audiovox TRUs
;       (see tae01 and tbe01)
;   d.) Monitor for silent alert mode in Audiovox CTX-3100A and set
;       silent alert mode if necessary (see tbe01)
;
; Task 2:
;   a.) Dual NAM switching for NEC 3700 (see nae01)
;
; Task 3:
;   a.) Power loss check for NEC 3700 (see nae01)
;   b.) Send any change in hook switch status to OKI and Motorola
;       (see mae04 and oee02)
;   c.) Call rdbus routine to read indicator status in the Audiovox
;       TRUs (see tae01 and tbe01)
;   d.) Monitor for silent alert mode in Audiovox CTX-3100A and set
;       silent alert mode if necessary (see tbe01)
;
; Task 4:
;   a.) Call rdbus routine to read indicator status in the Audiovox
;       TRUs (see tae01 and tbe01)
;   b.) Monitor for silent alert mode in Audiovox CTX-3100A and set
;       silent alert mode if necessary (see tbe01)

;****************************************************************
;
; The Ram area 2Ah thru 2dh is reserved for use by the TRU modules
; either as DATA bytes or individual BIT variables.
;
;****************************************************************

;TRU_bits1       data    2ah             ;Bit 50h through 57h
;TRU_bits2       data    2bh             ;Bit 58h through 5fh
;TRU_bits3       data    2ch             ;Bit 60h through 67h
;TRU_bits4       data    2dh             ;Bit 68h through 6fh ;
;       Used for the maintanence board  ! check the tru routine   !
;
io_m_b          data    2eh             ;Bit 70h through 77h
td0             bit     70h
td1             bit     71h
td2             bit     72h
td3             bit     73h
dtmf_out        bit     74h
enable_test     bit     75h
enable_tone     bit     76h
enable_tone_in  bit     77h io_m_c          data    2fh             ;Bit 78h through 7fh
```

```
ext_led          bit     78h
enable_special   bit     79h
enable_busy      bit     7ah
enable_16h       bit     7bh
conn_loop        bit     7ch ;*****************************************************************
;
; More internal (BYTE addressable) ram variables
;
;***************************************************************** looptest_timer   data    30h             ; Delays looptest for 2ms after loops
looptest_timer2  data    31h             ; closes to allow SLIC to respond
display_delay    data    32h             ; Delays display update to every 71.1
dsp_ptr          data    33h             ; Handset LCD display buffer pointer
msg_ptr          data    34h             ; TRU message buffer pointer ;*****************************************************************
;
; The following bytes are reserved for the TRU modules for use
; only as DATA bytes (not BIT addressable)
;
;*****************************************************************

;TRU_byte0       data    38h
;TRU_byte1       data    39h
;TRU_byte2       data    3ah
;TRU_byte3       data    3bh
;TRU_byte4       data    3ch
;TRU_byte5       data    3dh
;TRU_byte6       data    3eh
;TRU_byte7       data    3fh ; Stack occupies bytes 40h-5fh ;*****************************************************************
;
; Digits dialed are stored in bytes from 60h to 7fh permitting
; a total of 32, including the SND code used as a terminator.
;
;*****************************************************************
prefix           data    60h             ; Only [0] or [1] are valid, else FFh
first_digit      data    61h             ; First three locations in the digit
second_digit     data    62h             ; buffer (emergency numbers, area code
third_digit      data    63h             ; start of 7digit number, etc.)

;*****************************************************************
;
; 8051 port1 & port3 bit definitions, (common to all units)
;
;***************************************************************** io_select        bit     p1.2
dt_pwm           bit     p1.4            ; Dial tone pwm
twenty_hz_pwm    bit     p1.5            ; 20hz pwm for ringer
;power_fail_     bit     p1.6            ; Input , 0 = power supply is failing lc_              bit     p3.2            ; Loop current sense, (ExtInt0)
ring_ground_     bit     p3.4            ; Input: shows ground on ring lead
```

```
;strobe         bit     p3.5            ; Input: digit ready from DTMF decoder
a0              bit     p1.6
a1              bit     p3.5
;****************************************************************
;
; Power up entry point, and interrupt routine vectors:
;
;**************************************************************** org     0000h                          ; Reset vector
        jmp     init org     0003h                          ; ExtInt0 service vector
        jmp     offhook_edge                   ; Off hook, flash, & pulse dial
        db      0ffh,0ffh,0ffh,0ffh,0ffh       ; Fill for Eprom and emulator org     000bh                          ; Timer0 (tl0) svc vector
        jmp     onhook_timer                   ; To keep track of how long on hook
        db      0ffh,0ffh,0ffh,0ffh,0ffh org     0013h                          ; ExtInt1 service vector
        jmp     int1_service                   ; Usually to read data from TRU
        db      0ffh,0ffh,0ffh,0ffh,0ffh org     001bh                          ; Timer1 (th0) svc vector
        jmp     offhook_timer                  ; For periodic timer ints
        db      0ffh,0ffh,0ffh,0ffh,0ffh org     0023h                          ; Serial port svc vector
        jmp     ser_port_service               ; Usually to read data from TRU
        db      0ffh,0ffh,0ffh,0ffh,0ffh org     002bh                          ; Timer2/ext2 svc vector
        jmp     timer2_service
        db      0ffh,0ffh,0ffh,0ffh,0ffh org     0033h                          ; PCA service vector
        jmp     pca_service                    ; For pulse width modulators db      ' (c) Copyright Codecom '
        db      '1992. '
$include(main.msg)
$include(tru.msg)

init:
        %set(intmask,0)                        ; Normally two interrupt levels unless
                                               ; intmask set to other than zero in
                                               ; TRU section (TAE01.ASM: Audiovox)
        mov     sp,#3fh                        ; Stack starts at 40h
        clr     rs0                            ; Select register bank 0
        clr     rs1                            ; Ditto
        mov     a,#0                           ; To fill ram with zero
        mov     r0,#0                          ; Point to first ram
fill_ram:
        mov     @r0,a                          ; One location at a time
        inc     r0                             ; Point to next location
        cjne    r0,#0,fill_ram                 ; Fill up end of ram (FFh)
        clr     p1.2 mov     r1,#main_flag
        mov     @r1,#0                         ; read second flag
```

```
            inc     r1
            mov     @r1,#0
            inc     r1
            mov     @r1,#0
            inc     r1
            mov     @r1,#0 call    reset_io_m              ; reset the maintanence board
            mov     io_m_b,#0               ; disable module
            call    write_io_m_b
            mov     io_m_c,#0               ; disable module
            call    write_io_m_c call    reset_io                ; reset i/o expanded to #13
            mov     p2,#0f8h                ; Set p2 to drive port expander
            mov     px1_temp,#11111111b     ; Initialize including power_hold on
            call    write_px1
            mov     px2_temp,#11110011b     ; Initialize: loopsw open, not ringing
            call    write_px2 call    read_px2                ; Read option switches
            mov     tmod,#00000011b         ; Timer0 is two timers, and timer1 can
                                            ; be baud rate gen
            mov     ip,#01001010b           ; Set int priorities
            mov     ie,#11001011b           ; Enable PCA, Timer1, Timer0, Ext0
                                            ; Tmr/Ext2,SerPort,Ext1 by TRU inits
            setb    it0                     ; ExtInt0 is edge trig'd
            setb    it1                     ; ExtInt1 is edge trig'd
            mov     cmod,#80h               ; Counter off during idle, clock/12
            mov     ch,#0                   ; Load high counter
            mov     cl,#0                   ; Load low counter
            mov     ccap0l,#0ffh            ; Low byte for timer comparator
            mov     ccap0h,#0               ; High byte for timer comparator
            mov     ccapm0,#049h            ; PCA0: software timer
            mov     ccapm1,#0               ; PCA1: (Dial Tone) off for now
            mov     ccapm2,#0               ; PCA2 (20 hz pwm) is off now
            clr     tr1                     ; Off-hook int timer not running yet
            clr     tr0                     ; On-hook timer not running ; Initialize byte variables mov     time_on1,#0             ; Initialize onhook interrupt timers
            mov     time_on2,#0
            mov     time_off1,#0            ; Initialize offhook interrupt timers
            mov     time_off2,#0
            mov     time_off3,#0
            mov     flags,#0                ; Clear all the flags
            mov     flags2,#0               ; Clear all the flags
            mov     flags3,#0               ; Clear all the flags
            mov     inds,#0ffh              ; Initial vals
            mov     indasc,#0ffh            ; Initial vals
            mov     pulse_digit,#0          ; 0 = no pulse digit(s) available now
            mov     f_cmds,#0               ; 0 = no TRU task commanded ; Initialize bit variables clr     test_enable
            clr     test_end
            clr     error_flag
            clr     return_ring setb    fonhook                 ; 1 = Assume phone on hook on power up
            clr     f_init                  ; 0 = TRU init not completed yet
            clr     fremote_hup
```

```
        clr     fcall                   ; 0 = No incoming call (ALERT) yet
        call    clr_dsp                 ; Clear handset LCD display buffer
        call    clr_msg                 ; Clear TRU messages buffer
        call    specific_inits          ; Do TRU specific initializations
        mov     ccap4l,#0ffh            ; Low byte for watchdog match word
        mov     ccap4h,#0ffh            ; High byte for watchdog match word
        mov     ccapm4,#48h             ; PCA4: Enable comparator & interrupt
        orl     cmod,#40h               ; Enable watchdog timer
        setb    cr                      ; Start PCA counter
        setb    tr0                     ; Start on hook timer ; Wait 2.55 second for TRU to wake up. Clear the dialed digits location,
; then point R0 to digits buffer start (60h), and clear R2 (dialed digits
; count).

time_wakeup:
        call    watchdog
        mov     a,time_on2              ; Get elapsed time
        cjne    a,#255,time_wakeup      ; Wait here 2.55sec for tru wakeup
        mov     c,sw_gndstart           ; Check GS-LS jumper, 0=LS 1=GS
        mov     loopswitch_,c           ; Save start mode
        clr     no_ring call    write_px2
        jmp     start $include(tru.asm)                       ; TRU module here, so INTMASK can be
                                        ; evaluated at assembly time ;****************************************************************
;
;       Start, and Re-Entry point following hang up
;
;**************************************************************** start:
        mov     r0,#60h                 ; Point to digit buffer start
        mov     a,#0ffh                 ; Fill with non-digits
clr_digbuf:
        mov     @r0,a                   ; One location at a time
        inc     r0                      ; Point to next location
        cjne    r0,#80h,clr_digbuf      ; Through 7fh
        mov     r0,#60h                 ; Point to buffer start
        mov     r2,#0                   ; Initialize digit count
        setb    f_start                 ; 1 = enable hook_switch deglitching
        clr     ie0                     ; Clear offhook int just in case
        setb    ex0                     ; Enable offhook int in case disabled ; Endless loop until we either detect an incoming call or we lift
; the handset to dial out.

hookchk:
        call    watchdog
        jb      test_enable,do_test         ; if auto test activated
        mov     f_cmds,#1               ; Load command ID
;       call    trucmd                  ; Do task1 for TRU, if needed
        jb      fhook,first1            ; Brif off hook
        jnb     fanswer,hookchk         ; Back if no incoming ring detected
        jmp     ring_answer             ; Answer ring, we went off hook during
                                        ; an ALERT (incoming call) state!
first1:
```

```
             jmp       first
do_test:
             mov       r1,#main_flag_error
             mov       @r1,#0                    ; set the tone error busy or 1000hz
             mov       r1,#main1_flag_error
             mov       @r1,#0                    ; set the tone error busy or 1000hz
             clr       test_end
             clr       error_flag
             clr       error_flag mov       r1,#main_flag
             mov       a,@r1                     ; read first flag
             anl       a,#00000001b              ; check if hook was done
             call      start_hook_test           ; hook test
test_hook:
             jb        error_flag,rou_error
             call      dial_test                 ; dial test
test_dial:
             jb        error_flag,rou_error
             call      start_dtmf                ; dtmf test
test_dtmf:
             jb        error_flag,rou_error
             call      start_ring_test           ; ring test
test_ring:
             jb        error_flag,rou_error
             call      start_ring_ans_test       ; ring answer test
test_ring_a:
             jb        error_flag,rou_error
             call      make_call                 ; call test
             jb        error_flag,rou_error
             jmp       until_fin_tim             ; exit without errors
rou_error:
             call      error_acc                 ; load error variable
;            jmp       wait_end
until_fin_tim:
             setb      test_end
             clr       tr0
             mov       time_on2,#0               ;Every 10 msec while on hook
             mov       time_on1,#0               ;Reset for next 36
             mov       test_min,#0               ; 10 msec x 255 = .255 sec
             setb      tr0
wait_end:
             call      watchdog                  ; be here until 1 min expire
             mov       a,test_min
             cjne      a,#23,wait_end            ; .255 x 236 = 60.18
             call      fin_self                  ; return to normal
             jmp       hookchk                   ; return to normal
;*************************************************
;start_hook_test- start hook test
;*************************************************
start_hook_test:
             mov       r1,#main_flag             ; read main flag
             mov       a,@r1
             orl       a,#00000001b
             mov       @r1,a                     ; set the off-hook flag
             setb      enable_test               ;disconnect the telephone
             clr       conn_loop
             call      write_io_m_b              ; and connect module
             call      reset_io_m                ; reset the maintanence board
             call      write_io_m_b
```

45

```
            call      write_io_m_c clr       loopswitch_                    ;Other side has disconnected
            call      write_px2
test_hup:
            setb      fremote_hup
            call      hup mov       lamps_temp,#0
            call      write_io_c                     ; update the LEDS mov       r6,#10
nose:
            push      6
            mov       r6,#0ffh                                           ; delay module
loop_m:
            mov       r7,#0ffh
            djnz      r7,$
            call      watchdog
            djnz      r6,loop_m mov       r6,#0ffh                                           ; delay module
loop_ma:
            mov       r7,#0ffh
            djnz      r7,$
            call      watchdog
            djnz      r6,loop_ma mov       r6,#0ffh                                           ; delay module
loop_mb:
            mov       r7,#0ffh
            djnz      r7,$
            call      watchdog
            djnz      r6,loop_mb mov       r6,#0ffh                                           ; delay module
loop_mc:
            mov       r7,#0ffh
            djnz      r7,$
            call      watchdog
            djnz      r6,loop_mc
            pop       6
            djnz      r6,nose
test_hup2:
            clr       fanswer
            clr       fhook                          ; Clear the flag jnb       fhook,not_hook_det             ; no off-hook det. ok
                                                     ; off-hook detected error
            jmp       hook_error
not_hook_det:
            setb      fonhook                        ; test off-hook
            setb      conn_loop                      ; present off hook to the
            call      write_io_m_c                   ; interface mov       r6,#0ffh                       ; delay off hook
loop_m_off:
            mov       r7,#0ffh
            djnz      r7,$
            call      watchdog
            djnz      r6,loop_m_off
            mov       r6,#0ffh                       ; delay off hook
```

```
loop_m_off2:
        mov     r7,#0ffh
        djnz    r7,$
        call    watchdog
        djnz    r6,loop_m_off2 mov     r6,#0ffh                                ; delay off hook
loop_m_off3:
        mov     r7,#0ffh
        djnz    r7,$
        call    watchdog
        djnz    r6,loop_m_off3 mov     r6,#0ffh                                ; delay off hook
loop_m_off4:
        mov     r7,#0ffh
        djnz    r7,$
        call    watchdog
        djnz    r6,loop_m_off4 mov     r6,#0ffh                                ; delay off hook
loop_m_off5:
        mov     r7,#0ffh
        djnz    r7,$
        call    watchdog
        djnz    r6,loop_m_off5 test_fhook:
        jb      fhook,detected_hook                     ; if hook detected ok
        jmp     hook_error                              ; not off-hook det error
detected_hook:
        clr     ex0                                     ; Disable offhook int til dial tone to
                                                        ; prevent dialing due to bounce
        clr     hookswout                               ; Show off-hook to TRU
        setb    hookswout_                              ; Ditto
        clr     fhook                                   ; Clear the flag
dt_delay1:
        call    watchdog
        jnb     lc_,still_off_hook
        jmp     hook_error                              ; fail off hook
still_off_hook:
        jb      f_start,dt_delay1                       ; Will be set after 500ms deglitching
        clr     ie0                                     ; Clear offhook int flag just in case
        setb    ex0
        setb    fdtone                                  ; 1 = the Dial Tone is on
        call    dtone                                   ; Enable the Dial Tone
        ret                                             ; exit from hook test hook_error:
        mov     r1,#main_flag_error
        mov     @r1,#1
        setb    error_flag                              ; hook slic error
        ret ;****************************************************
;dial_test check  the  dial tone
;****************************************************
dial_test:
        mov     r1,#main_flag
        mov     a,@r1                                   ; read main flag
        orl     a,#00000010b
        mov     @r1,a                                   ; set the dial tone flag
```

```
                mov     r6,#0ffh                        ; delay off hook
delay_dial:
                mov     r7,#0ffh
                djnz    r7,$
                call    watchdog
                djnz    r6,delay_dial mov     r6,#0ffh                        ; delay off hook
delay_dial2:
                mov     r7,#0ffh
                djnz    r7,$
                call    watchdog
                djnz    r6,delay_dial2 clr     tr1                             ; wait 711 msec to detect dial
                mov     time_off1,#0
                mov     time_off2,#0
                setb    tr1
verify_dial:
                call    read_io_m_a                     ; check dial tone
                anl     a,#00000001b
                cjne    a,#00000001b,dial_ok            ; if 0 dial ok
                call    watchdog
                mov     a,time_off2                    ; dial is not detected
                cjne    a,#10,verify_dial              ; wait 711 msecs if busy not detected
                                                       ; dial tone fail
                mov     r1,#main_flag_error
                mov     @r1,#3                         ; dial   error
                setb    error_flag
                ret
dial_ok:
                ret                                    ; no error ;*********************************************
;start_dtmf - start the dtmf
;*********************************************
start_dtmf:
                clr     fdtone
                mov     ccapm1,#0
                anl     io_m_b,#0f0h
                orl     io_m_b,#cero
                call    send_dtmf                      ; send 0
                call    delay_dtmf
                call    disable_dtmf
                call    delay_dtmf
                call    get_test
test_cero:
                cjne    a,#0h,dtmf_error_flag          ; verify 0
                anl     io_m_b,#0f0h
                orl     io_m_b,#uno
                call    send_dtmf                      ; send 1
                call    delay_dtmf
                call    disable_dtmf
                call    delay_dtmf
                call    get_test
test_1:
                cjne    a,#1h,dtmf_error_flag          ; verify 1
                anl     io_m_b,#0f0h
                orl     io_m_b,#dos                    ; send  2
                call    send_dtmf
                call    delay_dtmf
                call    disable_dtmf
                call    delay_dtmf
                call    get_test
```

```
test_2:
        cjne    a,#2h,dtmf_error_flag          ; verify 2
        anl     io_m_b,#0f0h
        orl     io_m_b,#tres                   ; send 3
        call    send_dtmf
        call    delay_dtmf
        call    disable_dtmf
        call    delay_dtmf
        call    get_test
test_3:
        cjne    a,#3h,dtmf_error_flag          ; verify 3
        anl     io_m_b,#0f0h
        orl     io_m_b,#cuatro                 ; send 4
        call    send_dtmf
        call    delay_dtmf
        call    disable_dtmf
        call    delay_dtmf
        call    get_test
test_4:
        cjne    a,#4h,dtmf_error_flag          ; verify 4
        jmp     go_to_5
dtmf_error_flag:
        jmp     error_dtmf
go_to_5:
        anl     io_m_b,#0f0h
        orl     io_m_b,#cinco                  ; send 5
        call    send_dtmf
        call    delay_dtmf
        call    disable_dtmf
        call    delay_dtmf
        call    get_test
test_5:
        cjne    a,#5h,dtmf_error_flag          ; verify 5
        anl     io_m_b,#0f0h
        orl     io_m_b,#seis                   ; send 6
        call    send_dtmf
        call    delay_dtmf
        call    disable_dtmf
        call    delay_dtmf
        call    get_test
test_6:
        cjne    a,#6h,dtmf_error_flag          ; verify 6
        anl     io_m_b,#0f0h
        orl     io_m_b,#siete                  ; send 7
        call    send_dtmf
        call    delay_dtmf
        call    disable_dtmf
        call    delay_dtmf
        call    get_test
test_7:
        cjne    a,#7h,dtmf_error_flag          ; verify 7
        anl     io_m_b,#0f0h
        orl     io_m_b,#ocho                   ; send 8
        call    send_dtmf
        call    delay_dtmf
        call    disable_dtmf
        call    delay_dtmf
        call    get_test
test_8:
        cjne    a,#8h,dtmf_error_flag1         ; verify 8
        anl     io_m_b,#0f0h
        orl     io_m_b,#nueve                  ; send 9
        call    send_dtmf
        call    delay_dtmf
```

```
            call    disable_dtmf
            call    delay_dtmf
            call    get_test
test_9:
            cjne    a,#9h,dtmf_error_flag1      ; verify 9
            anl     io_m_b,#0f0h
            orl     io_m_b,#05h                 ; send a
            call    send_dtmf
            call    delay_dtmf
            call    disable_dtmf
            call    delay_dtmf
            call    get_test
test_a:
            cjne    a,#0ah,dtmf_error_flag1     ; receive a
            anl     io_m_b,#0f0h
            orl     io_m_b,#0dh                 ; es b
            call    send_dtmf
            call    delay_dtmf
            call    disable_dtmf
            call    delay_dtmf
            call    get_test
test_b:
            cjne    a,#0bh,dtmf_error_flag1
            jmp     go_to_c
dtmf_error_flag1:
            jmp     error_dtmf
go_to_c:
            anl     io_m_b,#0f0h
            orl     io_m_b,#03h                 ; es 3
            call    send_dtmf
            call    delay_dtmf
            call    disable_dtmf
            call    delay_dtmf
            call    get_test
test_c:
            cjne    a,#0ch,dtmf_error_flag1
            anl     io_m_b,#0f0h
            orl     io_m_b,#0bh                 ; es d
            call    send_dtmf
            call    delay_dtmf
            call    disable_dtmf
            call    delay_dtmf
            call    get_test
test_d:
            cjne    a,#0dh,dtmf_error_flag1
            anl     io_m_b,#0f0h
            orl     io_m_b,#07h                 ; es 7
            call    send_dtmf
            call    delay_dtmf
            call    disable_dtmf
            call    delay_dtmf
            call    get_test
test_e:
            cjne    a,#0eh,dtmf_error_flag1
            anl     io_m_b,#0f0h
            orl     io_m_b,#0fh                 ; es f
            call    send_dtmf
            call    delay_dtmf
            call    disable_dtmf
            call    delay_dtmf
            call    get_test
test_f:
            cjne    a,#0fh,dtmf_error_flag1
            ret                                 ; exit without errors
```

```
error_dtmf:
        mov     r1,#main_flag_error
        mov     @r1,#4                          ; dtmf error
        setb    error_flag
        ret ;****************************************************
;start_ring_test - start the ring test
;****************************************************
start_ring_test:
                                                ; init the ringing
        mov     r1,#main_flag                   ; read main flag
        mov     a,@r1
        orl     a,#00001000b
        mov     @r1,a                           ; set the ring test flag clr     ring_second
        clr     conn_loop                       ; present an on hook
        call    write_io_m_c
        setb    fremote_hup
        call    hup mov     r6,#6
loop_ring_wait:
        push    6
        mov     r6,#0ffh                        ; delay module
loop_mbb:
        mov     r7,#0ffh
        djnz    r7,$
        call    watchdog
        djnz    r6,loop_mbb mov     r6,#0ffh                        ; delay module
loop_mcc:
        mov     r7,#0ffh
        djnz    r7,$
        call    watchdog
        djnz    r6,loop_mcc pop     6
        djnz    r6,loop_ring_wait
                                                ; incoming call
        clr     ap1                             ; init an incoming cal
        jb      lc_,loop_ring_off
        jmp     ring_flag
loop_ring_off:                                  ; loop here until ring start or
        clr     tr0                             ; 2 sec expire
        mov     time_on2,#0
        mov     time_on1,#0
        setb    tr0
wait_2_sec:
        call    watchdog
        jnb     fanswer,not_answer
        jmp     ring_flag                       ; answer occurred error
not_answer:
        call    read_io_m_a
        anl     a,#00000100b
        cjne    a,#00000100b,ring_starts        ; if 0 ring started
        mov     a,time_on2                      ; check if 2 second expire
        cjne    a,#200,wait_2_sec               ; wait 2 sec to stop  the dtmf
        jmp     ring_flag                       ; 2 sec expire, error ring_starts:
```

```
            mov     r6,#0ffh                        ; delay module
loop_mbbc:
            mov     r7,#0ffh
            djnz    r7,$
            call    watchdog
            djnz    r6,loop_mbbc mov     r6,#0ffh                        ; delay module
loop_mccd:
            mov     r7,#0ffh
            djnz    r7,$
            call    watchdog
            djnz    r6,loop_mccd ring_start:                                         ; check for ring 1.3s continuity
            clr     tr0
            mov     time_on2,#0
            mov     time_on1,#0
            setb    tr0
wait_130msec:                                       ; check ring during 1.3 sec
            call    watchdog
            jnb     fanswer,not_answer1
            jmp     ring_flag                       ; answer occured error
not_answer1:
            call    read_io_m_a
test_130:
            anl     a,#00000100b                    ; should be low during 1.3 sec
            cjne    a,#00000100b,ring_expire
            jmp     ring_flag                       ; ring  fail within 1.3 sec
ring_expire:
            mov     a,time_on2
            cjne    a,#90,wait_130msec              ; wait 130msec wait_250msec:                                       ; the ring should stop after 1.5s
            call    watchdog                        ; but we will wait 2.5s to check if
            call    read_io_m_a                     ; it stop
test_250:
            anl     a,#00000100b                    ; should be low during .2 sec more
            cjne    a,#00000100b,ring_not_expire
test_stop:
            jmp     ring_stop_                      ; ring  stop before 2.5s
ring_not_expire:
            mov     a,time_on2                      ; after 1.5 sec it should be high
            cjne    a,#250,wait_250msec             ; wait 250msec
test_flag:
            jmp     ring_flag                       ; ring did not stop within 2.5s error ring_stop_:                                         ; wait 2.55s
            clr     tr0
            mov     time_on2,#0
            mov     time_on1,#0
            setb    tr0
wait_2_seca:
            call    watchdog
            jnb     fanswer,not_answer2
            jmp     ring_flag                       ; answer occurred error
not_answer2:
            mov     a,time_on2
            cjne    a,#255,wait_2_seca              ; wait 2.55s to stop  the dtmf
                                                    ; second loop
            jb      ring_second,ring_stop1
            setb    ring_second                     ; check ring 2 times
            jmp     loop_ring_off                   ; start again
ring_flag:
```

```
            setb    ap1                     ; clear incoming call
            mov     r1,#main_flag_error
            mov     @r1,#5                  ; ring error
            setb    error_flag
ring_stop1:
test_timbre:
            ret                             ; exit without error ;****************************************************
;start_ring_ans_test - answer the ring
;**************************************************** start_ring_ans_test:
                                            ; init the ringing
            mov     r1,#main_flag           ; read main flag
            mov     a,@r1
            orl     a,#00010000b
            mov     @r1,a                   ; set the ring test flag
loop_ring_off2:                             ; wait here until ring start again
            clr     tr0
            mov     time_on2,#0
            mov     time_on1,#0
            setb    tr0
wait_2_sec2:
            call    watchdog
            jnb     fanswer,not_answera     ; if ring answer exit
            jmp     ans_flag
not_answera:
            call    read_io_m_a
            anl     a,#00000100b
            cjne    a,#00000100b,ring_present ; if cero ring present
            mov     a,time_on2
            cjne    a,#200,wait_2_sec2      ; wait 2 sec to stop
            jmp     ans_flag                ; 2 sec expire
ring_present:
            setb    conn_loop               ; answer the ring
            call    write_io_m_c mov     r7,#0ffh                ; delay to allow time to set fanswer
wait_ans:
            mov     r6,#0ffh
            djnz    r6,$
            call    watchdog
            djnz    r7,wait_ans mov     r7,#0ffh
wait_ansa:
            mov     r6,#0ffh
            djnz    r6,$
            call    watchdog
            djnz    r7,wait_ansa
test_ans:
            jb      fanswer,ok_ring         ; if answer, ring ans ok
            jmp     ans_flag                ; didn't answer error
ans_flag:
            mov     r1,#main_flag_error
            mov     @r1,#6                  ; ring error
            setb    error_flag
            setb    ap1
            clr     fanswer
            ret
ok_ring:
                                            ; exit without error
```

```
timbre:
        clr     fanswer
        setb    ap1                     ; clear incoming call
        ret ;**************************************************
;make_call -   make a call to test the radio
;**************************************************
make_call:
        mov     r1,#main1_flag          ; read main1 flag
        mov     a,@r1
        orl     a,#00000001b
        mov     @r1,a                   ; set the call test flag
test_mute:
        jnb     power_,power_is_ok      ; if radio ok line should be low(0)
        mov     r1,#main1_flag_error
        mov     @r1,#1                  ; set the power line error
        setb    error_flag
        jmp     pre_onhook
power_is_ok:
        mov     a,#func                 ; function to read the phone number
        call    wrbus
        mov     a,#7
        call    wrbus
        call    clr_dsp
        mov     a,#star
        call    wrbus mov     r7,#0ffh                ; delay to allow time to send number
wait_min:                               ; to interface
        mov     r6,#0ffh
        djnz    r6,$
        call    watchdog
        djnz    r7,wait_min mov     r7,#0ffh
wait_mina:
        mov     r6,#0ffh
        djnz    r6,$
        call    watchdog
        djnz    r7,wait_mina mov     a,#9h
        call    wrbus
        mov     a,#0ah
        call    wrbus ; generate a call to its phone number
        mov     a,#dspbuf_start         ; Get current pointer
        add     a,#3
        mov     r1,a
        mov     a,@r1                   ; Read msg in buffer
        anl     a,#0fh
        call    wrbus inc     r1
        mov     a,@r1                   ; Read msg in buffer
        anl     a,#0fh
        call    wrbus inc     r1
        mov     a,@r1                   ; Read msg in buffer
```

```
                anl     a,#0fh
                call    wrbus inc     r1
                mov     a,@r1                   ; Read msg in buffer
                anl     a,#0fh
                call    wrbus inc     r1
                mov     a,@r1                   ; Read msg in buffer
                anl     a,#0fh
                call    wrbus inc     r1
                mov     a,@r1                   ; Read msg in buffer
                anl     a,#0fh
                call    wrbus inc     r1
                mov     a,@r1                   ; Read msg in buffer
                anl     a,#0fh
                call    wrbus setb    fsend                   ;Set send flag
                mov     a,#send                 ; make a call
                call    wrbus
                setb    enable_special          ; enable Q4
                call    write_io_m_c
test_mute1:
                clr     mute                    ; do not mute
                call    write_px2
                clr     tr1                     ; delay to check inuse
                mov     time_off1,#0
                mov     time_off2,#0
                setb    tr1
delay_call:
                mov     a,time_off2
                call    watchdog
                cjne    a,#80,delay_call        ; wait 1 ?seconds test_mute2:                                     ; test busy tone
                clr     tr1
                mov     time_off1,#0
                mov     time_off2,#0
                mov     time_off3,#0
                setb    tr1
cont_waiting:
                jnb     inuse,still_inuse
                mov     r1,#main1_flag_error
                mov     @r1,#4                  ; set the inuse error
                jmp     call_error              ; if iube  disapear set   error
still_inuse:
                call    read_io_m_a             ; check dial tone
                anl     a,#00000001b
                cjne    a,#00000001b,busy_ok    ; if 0 busy ok call    read_io_m_a             ; check dial tone
                anl     a,#00001000b
                cjne    a,#00001000b,t1000hz    ; if 1000khz busy ok mov     a,time_off3             ; busy is not detected
                call    watchdog
                cjne    a,#1h,cont_waiting      ; wait 18.2 secs if busy not detected
                mov     r1,#main1_flag_error
```

55

```
                mov     @r1,#3              ; set the tone error busy or 1000hz
call_error:
                mov     a,#end1             ; make a call
                call    wrbus
                setb    error_flag          ; present and on hook
                jmp     pre_onhook
t1000hz:                                    ; 950 hz - 1100hz tone detected
busy_ok:                                    ; 400 hz -  620hz tone detected
                mov     a,#end1             ; make a call
                call    wrbus
pre_onhook:
                clr     conn_loop           ; present and on-hook
                call    write_io_m_b        ; and connect module
                call    hup
                ret ;**********************************************
;error_acc - set the error code
;**********************************************
error_acc:
                mov     r1,#main_flag_error
                mov     a,@r1
                cjne    a,#1,check_hook_ring
                mov     r1,#error_code      ; hook slic error
                mov     @r1,#1
                jmp     exit_error
check_hook_ring:
                cjne    a,#2,check_dial_flag
                mov     r1,#error_code      ; hook ring error
                mov     @r1,#2
                jmp     exit_error
check_dial_flag:
                cjne    a,#3,check_dtmf_flag
                mov     r1,#error_code      ; dial error
                mov     @r1,#3
                jmp     exit_error
check_dtmf_flag:
                cjne    a,#4,check_ring_flag
                mov     r1,#error_code      ; dtmf error
                mov     @r1,#4
                jmp     exit_error
check_ring_flag:
                cjne    a,#5,check_ring_ans_flag
                mov     r1,#error_code      ; ring detection error
                mov     @r1,#5
                jmp     exit_error
check_ring_ans_flag:
                cjne    a,#6,check_power_flag
                mov     r1,#error_code      ; ring answer error
                mov     @r1,#6
                jmp     exit_error
check_power_flag:                           ; check calls flag
                mov     r1,#main1_flag_error
                mov     a,@r1
                cjne    a,#1,check_call_test
                mov     r1,#error_code      ; power radio error
                mov     @r1,#7
                jmp     exit_error
check_call_test:
                cjne    a,#2,check_busy_test
                mov     r1,#error_code      ; xxx error
                mov     @r1,#8
                jmp     exit_error
check_busy_test:
```

```
                cjne    a,#3,check_inuse_test
                mov     r1,#error_code          ; busy tone error
                mov     @r1,#9
                jmp     exit_error
check_inuse_test:
                cjne    a,#4,check_1000_test
                mov     r1,#error_code          ; inuse error
                mov     @r1,#10
                jmp     exit_error
check_1000_test:
                cjne    a,#5,exit_error
                mov     r1,#error_code          ; 1000hz tone error
                mov     @r1,#11
                jmp     exit_error
exit_error:
                ret ;***********************************************
;fin_self - return to normal
;***********************************************
fin_self:
                clr     conn_loop               ; present on hook to the
                call    write_io_m_c            ; interface
                call    hup clr     enable_test             ; connect the the telephone
                call    write_Io_m_b            ; and disconnect module
                clr     test_enable             ; init maint test
                clr     test_end                ; finish test
                clr     error_flag              ; error  flag
                jnb     error_flag,turn_on_led
                clr     ext_led                 ; turn off external led while testing
                call    write_io_m_c            ; turn  on/off the external led
                call    loop_bad
turn_on_led:
                setb    ext_led                 ; turn off external led while testing
                call    write_io_m_c            ; turn  on/off the external led
                call    loop_bad clr     ext_led                 ; turn off external led while testing
                call    write_io_m_c            ; turn  on/off the external led
                call    loop_bad setb    ext_led                 ; turn off external led while testing
                call    write_io_m_c            ; turn  on/off the external led
                call    loop_bad clr     ext_led                 ; turn off external led while testing
                call    write_io_m_c            ; turn  on/off the external led
                call    loop_bad setb    ext_led                 ; turn off external led while testing
                call    write_io_m_c            ; turn  on/off the external led
                call    loop_bad test_4on:
                clr     ext_led                 ; turn off external led while testing
                call    write_io_m_c            ; turn  on/off the external led
                call    loop_bad ret loop_bad:
                mov     r7,#0ffh                ; delay to allow time to set fanswer
```

```
wait_emb:
        mov     r6,#0ffh
        djnz    r6,$
        call    watchdog
        djnz    r7,wait_emb mov     r7,#0ffh
wait_emba:
        mov     r6,#0ffh
        djnz    r6,$
        call    watchdog
        djnz    r7,wait_emba ret ; Get here when we lifted the handset to dial.
first:
        call    clr_msg                 ; Clear previous TRU messages
        clr     ex0                     ; Disable offhook int til dial tone to
                                        ; prevent dialing due to bounce
        clr     hookswout               ; Show off-hook to TRU
        setb    hookswout_              ; Ditto
        clr     fhook                   ; Clear the flag
dt_delay:
        call    watchdog
        mov     f_cmds,#4               ;NOTE:INT0 & TIMER0 have been suspended
                                        ;  at this point - do not use any tru
                                        ;  specific function which relies on
                                        ;  these interrupts.
        call    trucmd                  ; Perform any TRU specific commands
        jb      f_start,dt_delay        ; Will be set after 500ms deglitching
        clr     ie0                     ; Clear offhook int flag just in case
test_lc:
        jnb     lc_,alert_check         ; Brif still off hook after 500ms test_lc1:
        call    hup                     ; Phone put back on hook < 500 msec
        jmp     start alert_check:
        setb    ex0                     ; Reenable offhook int (DT is on now)
        jb      inuse,make_dt           ; Brif not INUSE, we are ready to dial
        jmp     wait                    ; If already INUSE probably answered
                                        ; an incoming call by coming offhook ; We are off hook for 500ms lets generate a dial tone.
make_dt:
        setb    fdtone                  ; 1 = the Dial Tone is on
        call    dtone                   ; Enable the Dial Tone
        call    get                     ; Get a character or exit if hang up
        jb      inuse,check_prefix
        clr     fdtone
        mov     ccapm1,#0
        jmp     wait check_prefix:
        jb      lock,prefix_0           ; Brif TRU isn't locked
        cjne    a,#pound,nosend         ; Brif locked, only # (unlock) is valid
prefix_0:
```

58

```
              cjne     a,#zero,prefix_1        ; Brif not a [0]
              jmp      store_it                ; Go to store [0] as prefix
    prefix_1:
              cjne     a,#1,no_prefix          ; Brif not a [1] either
              jmp      store_it                ; Go to store [1] as prefix
    no_prefix:
              inc      r0                      ; Leave prefix slot unchanged (FFh)
              inc      r2                      ; But up the digit count ; Store current digit and get another one until time to send them out.

store_it:
              cjne     r0,#7fh,do_store_it     ; Brif digit buffer is not full yet
              jmp      check_number            ; Brif buffer is full, w/o storing
    do_store_it:
              mov      @r0,a                   ; Store the digit
              inc      r0                      ; Advance digit buffer pointer ; Check the entered digits and analyze them for valid sequences.

check_number:
              clr      fsendtimer              ; Assure it is off
              mov      a,first_digit           ; Point to 1st digit slot
              cjne     a,#0ffh,check_one       ; Brif first digit entered
              jmp      check_send              ; Else check if time to send
    check_one:
              cjne     a,#pound,check_send     ; Brif not [#] (lock, unlock, etc.)
              mov      a,second_digit          ; Point to 2nd digit if first is [#]
              cjne     a,#0ffh,check_two       ; Brif second digit entered
              jmp      check_send              ; Else check if time to send
    check_two:
              cjne     a,#pound,check_nam      ; Brif not [#][#] (lock or unlock)
              mov      a,third_digit           ; Two #'s might be lock or unlock
              cjne     a,#pound,check_unlock   ; Three #'s mean locking
              jnb      lock,nosend             ; Do not lock if already locked
              jmp      lock_it                 ; [#][#][#] means locking check_nam:
              cjne     a,#star,check_send      ; Abort if not [#][*] sequence
              mov      a,third_digit           ; Else get the third digit also
              cjne     a,#0ffh,check_nam1      ; Brif third digit entered
              jmp      check_send              ; Else check if time to send
    check_nam1:
              mov      f_cmds,#2               ; Load function number, then go to
              call     trucmd                  ; Switch to alternate NAM ; Abort on invalid number (dial) sequences.

nosend:
              clr      funlocktimer            ; Turn off unlock timer # sign set it
              setb     fonhook                 ; As if on hook
              setb     ie0                     ; Go to ExtInt0 service
              jmp      start                   ; just like off hook again
    check_unlock:
              cjne     a,#0ffh,unlocking_it    ; Brif any digit was dialed after ##
              jmp      check_send              ; Else go to check if time to send
    unlocking_it:
              setb     funlocktimer            ; Will send after 2sec w/o SND code
              jmp      get_next                ; to avoid unlock code being sent like
                                               ; a valid number
```

; Get here if the digit sequence entered did not qualify as any
; of the special function (lock, unlock, dual NAM, etc) options.

```
check_send:
        jb      sw_sendtimer,check_intl ; Brif sw7=1, interntnl calls enabled
        setb    fsendtimer              ; Enable sending after 4 sec if sw7=0
        jmp     get_next                ; And back for next digit check_intl:
        mov     a,prefix                ; Test for prefix in acc
        cjne    a,#zero,check_op        ; Brif not [0]
        mov     a,first_digit           ; Else get the first real digit
        cjne    a,#1,check_op           ; Brif not [1], may be operator call
        setb    fsendtimer              ; International call! Starts with 01-.
        jmp     get_next                ; Back for more, only timer sends now!

check_op:
        mov     a,prefix                ; Get prefix digit again
        cjne    a,#10,check_service     ; Brif prefix is not 0
        cjne    r2,#0,check_service     ; Brif digit(s) also were dialed
        setb    fsendtimer              ; Else it may be a call to operator check_service:
        cjne    r2,#3,check_distance    ; Brif not 3 digits
        mov     a,second_digit          ; Else if emergency, inform. etc.
        cjne    a,#1,check_distance     ; Brif second digit is 1
        mov     a,third_digit           ; Get third digit
        cjne    a,#1,check_distance     ; Brif third digit is not 1
        jmp     send_it                 ; It must be an emerg., send it check_distance:
        cjne    r2,#10,check_local      ; Ten digit was dialed?
        jmp     send_it                 ; Send on 10th unless international check_local:
        cjne    r2,#7,get_next          ; Brif less then seven digit was diale
        setb    fsendtimer              ; Prepare to send in 4 sec
        mov     a,second_digit          ; Get 2nd digit
        subb    a,#1                    ; Is it a #1 ?
        jz      get_next                ; Brif so, could be area code, or loca
        mov     a,second_digit          ; Get 2nd digit again
        subb    a,#10                   ; Is it a 0 ?
        jz      get_next                ; Brif so, maybe area code, maybe loca
        clr     fsendtimer              ; Don't want another, send 5sec later
        jmp     send_it get_next:
        inc     r2
        call    get                     ;Get a new digit
        jmp     store_it                ;Do all the checks with the new digit
```

;****************************************************
;
;       Dialing done, send the number out
;
;****************************************************

; Check if the TRU is locked, and abort if no unlock code was entered.

```
send_it:
        jb      lock,send1              ; Brif TRU is not locked
locked:
        mov     a,third_digit           ; Get third digit
```

```
            cjne    a,#0ffh,send1           ; Brif any digit entered
            jmp     nosend                  ; Don't send if no unlock code entered
; Send dialed digit.

send1:
            setb    mute                    ;Mute rx audio
            call    write_px2
            mov     @r0,#send               ;Put send at end of digits
            mov     a,#clear                ;Clear code
            call    wrbus                   ;Put clear code first to clear any
                                            ; digits from TRU memory in case
                                            ; handset has entered some first
            mov     r0,#60h                 ;Reset pointer to show storage
            mov     a,@r0                   ;Put prefix in acc
            cjne    a,#0ffh,out
            inc     r0                      ;Skip prefix if it is ff
out:        mov     a,@r0
            call    wrbus                   ;Write to the bus
            jnb     fhang,send_ok
test_lc2:
            call    hup                     ;Abort dump if hangup
            jmp     start send_ok:
            inc     r0
            cjne    a,#send,out             ;Keep on til SND code
            setb    fsend                   ;Set send flag
            clr     mute                    ;Unmute rx audio
            call    write_px2

; Dialing done, conditionally echo digit to TRU, then wait for
; further possible digits (extension, etc.), or let the interrupts
; take over the show.

wait:       call    get                     ;Check for any digits from MJ phone
            jnb     sw_data,wait            ;Discard if data after snd is disabled
            call    wrbus                   ;Else send data to TRU
            jmp     wait                    ;Loop til we or other party hangs up ;***************************************************
;
;               Dial Tone Generator
;
;***************************************************

; This routine selects and generates the proper dial tone,
; corresponding to our current (roam, holler, etc) status.

dtone:      push    psw
            jb      lock,serv_check
            mov     dptr,#table_350         ; 350 hz for lock
            jmp     tone_out
serv_check:
            jb      noserv,roam_check
            mov     dptr,#table_620         ;620 hz tone for no-serv
            jmp     tone_out
roam_check:
            jb      sw_dialtone,normal      ;If option sw is closed (=0) make a
                                            ; diff dial tone for roam
            jb      roam,normal
            mov     dptr,#table_roam        ;440-620 hz for roam
```

```
           jmp       tone_out
normal:    mov       dptr,#table_dt              ;350-440 hz (normal DT)
tone_out:
           mov       lowpoint,dpl                ;Remember where the table starts
           mov       highpoint,dph
           mov       ccapm1,#01000010b           ;Enable the tone
           pop       psw
           ret
;****************************************************
;
; Get a digit from the handset keypad
;
;****************************************************

; This routine processes the digit input and/or process flags.
; On return - returns data in acc get:
           push      psw
get1:
           mov       f_cmds,#3                   ;Flag indicates which functions apply
           call      trucmd                      ;Perform any TRU specific commands
           call      watchdog ; Wait for a pulse. If the pulse was not flagged as a pulse dial input
; by EXTINT0 (Off_Hook_Service), we check for a DTMF digit input. If it
; was a pulse dial input then we continue counting pulses, until 250 ms
; has passed after receiving the last pulse. At that point we consider
; assembling the pulse dial digit completed, so we copy it into the acc,
; and set the fdig_ready flag.

get_pulse:
           jnb       fdigit,get_dtmf
           clr       fdtone                      ;Clear dial tone flag
           mov       ccapm1,#0                   ;Turn off dial tone
           mov       a,#2                        ;If there was an input
           clr       c                           ;Clear carry for subtraction
           subb      a,time_off2                 ;See if 213.3 msec (3x71.1 ms) passed
           jnc       get_dtmf                    ;If not yet, then digit not complete
           mov       a,#131
           clr       c                           ;Clear carry for subtraction
           subb      a,time_off1                 ;See if additional 36.7 msec
                                                 ; (132x277.8 usec) has passed (total
                                                 ; time of 250 msec)
           jnc       get_dtmf                    ;If not yet, then digit not complete
           mov       a,pulse_digit               ;Put digit in a
           mov       pulse_digit,#0              ;Clear for next dig
           setb      fdig_ready                  ;To show a digit ready
           clr       fdigit                      ;Clear the flag ; If a DTMF dial digit is ready, copy it into the acc. Check for special
; conditions, flash, hang up etc. Branch on special conditions, or continue
; checking for more pulse(s), and/or completed digits.

get_dtmf:
           jnb       fdtmfin,hang
           clr       fdtone                      ;Clear dial tone flag
           mov       ccapm1,#0                   ;Turn off dial tone
           clr       fdtmfin                     ;Clear dtmf input flag
           mov       a,px1_temp                  ;Put digit in acc
           anl       a,#0fh                      ;Keep only low 4 bits
           setb      fdig_ready                  ;To show a digit ready ; Check for hangup (pulse > 700ms).
```

62

```
hang:   jnb     fhang,gflash            ;If no hang up
        pop     psw
test_lc3:
        call    hup
        dec     sp                      ;Correct stack pointer
        dec     sp                      ;Leaving subrout without ret
        jnb     fremote_hup,no_remote   ; Brif no remote hup occured
        clr     fremote_hup
no_remote:
        jmp     start                   ; Exit, somebody hung up ; Check for flash (200 < pulse < 700ms).

gflash: jnb     fflash,time             ;If no flash
        clr     fflash                  ;Clear flash flag
        mov     ccapm1,#0               ;Turn off dial tone
        jb      fdtone,just_flash       ;If dial tone on just a send for last
                                        ; number redial
        jb      fsend,just_flash        ;If send flag is set don't put digits,
                                        ; just a send
        clr     fdtone                  ;Clear dial tone flag
        pop     psw
        dec     sp                      ;Correct stack pointer
        dec     sp                      ;Leaving subrout without ret
        jmp     send_it                 ;Output all digits + send ; Transmit only a SEND code, but not the digits, if
; either the Dial Tone or the Send flag is high.

just_flash:
        clr     fdtone                  ;Clear dial tone flag
        mov     f_cmds,#5
        call    trucmd
        mov     a,#send                 ;Send code
        call    wrbus
        setb    fsend                   ;Send flag
        pop     psw                     ; Restore flags
        dec     sp                      ;Correct stack pointer
        dec     sp
        jmp     wait                    ; Back for digit(s), hangup etc.

; If we did not dial a complete phone number yet, and 40 second passed
; since the last key punch, then we start a 1 minute holler tone.

time:   jnb     ftime,send_time         ;If no timeout
        pop     psw
        dec     sp                      ;Correct the stack pointr
        dec     sp                      ;Leaving subrout without ret
        jmp     rohtone                 ;Then no rohtone ; Check if it time to send (4 sec expired since last key.)

send_time:
        jnb     fsendtimer,unlock_time
        mov     r6,time_off2            ;71.1 ms timer in r6
        cjne    r6,#56,unlock_time      ;Check for 4 sec (56x71.1ms = 3.98sec)
        clr     fsendtimer
        pop     psw
        dec     sp                      ;Correct stack pointer
        dec     sp                      ;Leaving subrout without ret
        jmp     send_it                 ;Output digits and send
```

; Check if unlock was requested.

```
unlock_time:
        jnb     funlocktimer,lock_time
        mov     r6,time_off2            ;71.4 ms timer in r6
        cjne    r6,#28,look             ;Check for (28 x 71.4 ms =) 2sec
        clr     funlocktimer
        pop     psw
        dec     sp                      ;Correct stack pointer
        dec     sp                      ;Leaving subrout without ret
        jb      lock,no_unlock          ; Do not unlock, if already unlocked
        jmp     unlock_it
no_unlock:
        setb    fonhook                 ;As if on hook
        setb    ie0                     ;Go to ExtInt0 service
        jmp     start                   ;Just like off hook again
```

;Flocktimer added to allow lock to timeout on less than 4 digits. Go_lock
;label must be added to TRU and also setting of flocktimer (if necessary).

```
lock_time:
        jnb     flocktimer,look         ; Brif not
        mov     r6,time_off2            ; 71.4 ms timer in r6
        cjne    r6,#28,look             ; Check for (28*71.4ms = 2 sec)
        clr     flocktimer
        pop     psw
        dec     sp                      ; Correct SP
        dec     sp
        jmp     go_lock
```

; Check if we got a (complete) digit.

```
look:   jb      fdig_ready,got_a_digit
        jmp     get1                    ;Look again if no digit in
```

; We got a digit (pulse or DTMF), return it in the acc.

```
got_a_digit:
        clr     fdig_ready              ;Clear the digit ready flag
got_inuse:
        mov     time_off1,#0            ; Restart timers on every digit input
        mov     time_off2,#0
        mov     time_off3,#0
        pop     psw
        ret
```

;****************************************************
;
; Get a digit from the handset keypad
;
;****************************************************

; This routine processes the digit input and/or process flags.
; On return - returns data in acc

```
get_test:
        push    psw
```
; If a DTMF dial digit is ready, copy it into the acc. Check for special
; conditions, flash, hang up etc. Branch on special conditions, or continue
; checking for more pulse(s), and/or completed digits.

```
get_dtmf_test:
        jnb     fdtmfin,no_dtmf_test
```

64

```
              clr       fdtone                    ;Clear dial tone flag
              mov       ccapm1,#0                 ;Turn off dial tone
              clr       fdtmfin                   ;Clear dtmf input flag
              mov       a,px1_temp                ;Put digit in acc
              anl       a,#0fh                    ;Keep only low 4 bits
              setb      fdig_ready                ;To show a digit ready
no_dtmf_test:
              clr       fdig_ready                ;Clear the digit ready flag
              mov       time_off1,#0              ; Restart timers on every digit input
              mov       time_off2,#0
              mov       time_off3,#0
              pop       psw
              ret ;*****************************************************************
;send_dtmf -   send a dial tone
;*****************************************************************
send_dtmf:
              call      watchdog
              clr       dtmf_out                  ; enable the dtmf tone
              call      write_io_m_b
              setb      dtmf_out                  ; enable the dtmf tone
              call      write_io_m_b
              ret
;*****************************************************************
;clr_dtmf -    send a dial tone
;*****************************************************************
disable_dtmf:
              clr       dtmf_out                  ; enable the dtmf tone
              call      write_io_m_b
              ret delay_dtmf:                                       ; delay the DTMF tone
              clr       tr1
              mov       time_off2,#0
              mov       time_off1,#0
              setb      tr1
wait_until_dtmf:
              mov       a,time_off2
              call      watchdog
              cjne      a,#4,wait_until_dtmf      ; wait 40 msec to stop the dtmf
              ret ;*************************************************
;
;             ROH tone generator
;
;*************************************************

; 40 sec has passed after we lifted the handset w/o dialing any digits,
; or since we have dialed the last digit. We shall generate an ROH tone
; (interrupted at 80 msec intervals) for 1 minute or until we hang_up,
; whichever happens first.

rohtone:
              clr       ftime                     ; Clear the flag
              clr       fdtone                    ; Clear dial tone flag so changes in
                                                  ; indicators won't change roh tone
              mov       dptr,#table_400
              mov       highpoint,dph             ; Remember table location
              mov       lowpoint,dpl
              setb      roh_boost                 ; Boost the audio
              call      write_px2
```

```
rohtone_on:
        mov     ccapm1,#01000010b       ; Turn on the tone
; Loop here for 1 minute, or until hang_up.
check_hangup:
        call    watchdog                ; Refresh watchdog while waiting here
        jnb     fhang,check_timeout     ; Brif still off hook
test_lc4:
        call    hup                     ; Do orderly hang up if back on hook
        jmp     start                   ; Brand new start
check_timeout:
        jb      frohtimeout,roh_timeout ; Brif ROH timed out (after 1 minute)
        jb      roh_on,rohtone_on
        mov     ccapm1,#0               ; Turn off the tone
        jmp     check_hangup            ; This loop toggles roh on and off
roh_timeout:
        mov     ccapm1,#0               ; Turn off the tone
        clr     roh_boost               ; Unboost the audio
        setb    loopswitch_             ; Open the loop
        call    write_px2               ; Out to the port
test_lc5:
        call    hup                     ; Do hang up routine
        jnb     sw_gndstart,looptest    ; Do loop test if loop start
        jmp     looptest_end            ; No loop test if ground start, just
                                        ; leave loop open til ring ground
; Get here if we are in Loopstart mode.
looptest:
        mov     b,#40                   ; Set up 2 sec delay (40 x 50 ms)
loopt1:
        mov     a,time_on2              ; Get current onhook time
        add     a,#5                    ; Add 50ms to present time
loopt2:
        call    watchdog                ; Refresh watchdog
        cjne    a,time_on2,loopt2       ; Minor delay is 50 ms
        djnz    b,loopt1                ; Wait 2 sec total
        clr     loopswitch_             ; Close loop in every 2sec to check
        call    write_px2               ; if phone was put back on hook
        mov     looptest_timer2,#215    ; Load 2.22msec delay (8x277.8 usec)
loopt3:
        mov     looptest_timer,#0ffh    ; To allow enough time for the SLIC
        djnz    looptest_timer,$        ; chip to indicate the hook status
        call    watchdog                ; Refresh watchdog
        djnz    looptest_timer2,loopt3
        jb      lc_,looptest_end        ; Brif no loop current (back on hook)
        setb    loopswitch_             ; Open loop switch again
        call    write_px2
        jmp     looptest                ; Wait here until hung up
looptest_end:
        clr     frohtimeout             ; 0 = has been hung up, or in GS mode
        mov     time_on1,#0             ; Reset on hook timers
        mov     time_on2,#0
        jmp     start                   ; Start new
```

```
;***********************************************
;
;         Subroutine for hang up
;
;***********************************************
hup:
           call      watchdog
           clr       ex0                         ;Disable ExtInt0 (offhook, LC_)
           clr       fdigit                      ;In case hangup while pulse dialing
           mov       pulse_digit,#0              ;In case hup during pulse digit input
           clr       fdig_ready                  ;In case hup during pulse/dtmf input
           clr       fdtmfin                     ;In case hup during dtmf digit input
           clr       flocktimer                  ;In case hup during locking
           clr       funlocktimer                ;In case hup during unlocking
           jnb       sw_gndstart,hup1            ; Brif loopstart
           setb      loopswitch_                 ;Open loopsw for 750ms if groundstart
           call      write_px2                   ; to simulate hup
           mov       a,time_on2                  ;Incs every 10 ms
           add       a,#75                       ;For 750 ms delay
           push      acc                         ;Store for later
           jmp       hup2
hup1:      jb        frohtimeout,hup2
           clr       loopswitch_                 ;If loopstart
           call      write_px2
hup2:
           clr       ftime                       ;Clear timer flag
           clr       fsendtimer                  ;Clear send timer flag
           mov       ccapm1,#0                   ;Make sure dtone is off
           clr       fdtone                      ;Clear the dial tone flag
           clr       roh_boost                   ;Normal audio
           call      write_px2
           jb        fremote_hup,no_end_sent     ;No end code if remote hup, since it
                                                 ; isn't needed and clears the buffer
                                                 ; on the Motorola unnecessarily.
           mov       a,#endcall                  ;Put end code
           call      wrbus                        ;Send it to TRU first, then reset flag
no_end_sent:
           clr       fsend                        ;in case digits sent or ALERT answered
           setb      hookswout                   ;Show on hook to TRU
           clr       hookswout_                  ;Ditto
           jnb       sw_gndstart,hup4            ;Don't do timing if loop start
           pop       acc                         ;Get delay time back
           clr       c                           ;Clear carry flag for next
hup3:
           call      watchdog
           cjne      a,time_on2,$+3              ;Wait 750 ms to allow loop to open
                                                 ; and pbx to see it as disconnect.
                                                 ; jmp to next instruction in any case
           jnc       hup3                        ;No carry til time_on2 greater than acc
                                                 ; (in case bus write took more than
                                                 ; 750 ms)
hup4:
           setb      fonhook                     ;Set on-hook flag
           clr       fhang                       ;Clear hang-up flag
           clr       f_one_sec                   ;So timer can start again when off hook
           clr       f_inuseofftiming            ;Reset flag
           setb      ex0                         ;Enable extint0 (offhook)
           ret
```

```
;**************************************************
;
;         TRU status update
;
;**************************************************

; Routine updates TRU status every 71.4 ms, and turns ringer
; on and off.  Also checks for 3.9 second interval after a ring.

update_displays:
        push    acc
        push    psw
upspec1:
        jnb     fspec1,continue_update   ;Check special flag
        call    spec1                    ;Special routine in TRU section
continue_update:
        jb      test_enable,go_to_self   ; check if test started
        mov     a,lamps_temp             ;Hold values for comparison later
        mov     c,roam
        cpl     c                        ; No real lamps for the Maxjack!
        mov     roamlamp,c               ;Roam indicator (just for storage)
        mov     c,noserv
        cpl     c
        mov     noservlamp,c             ;Noserv indicator (just for storage)
        mov     c,lock
        cpl     c
        mov     locklamp,c               ;Lock indicator (just for storage)
        mov     c,inuse
        cpl     c
        mov     inuselamp,c              ;Inuse indicator (just for storage)
        call    write_io_c               ;       update the LEDS
        jb      sw_dialtone,not_maint    ;If option sw is out (=1)
                                         ; not maintenance module
test_push:
        call    read_io_m_a              ; read push button
        anl     a,#00010000b
        cjne    a,#0h,not_push
        setb    test_enable              ; init maint test
        setb    fremote_hup              ; set remote hup for 700ms
        setb    loopswitch               ;Other side has disconnected
        call    write_px2
not_push:
        jnb     test_enable,not_maint    ; check if test started
go_to_self:
        jnb     test_end,not_error_yet   ; if error was found
        jnb     error_flag,pass_ok
test_led:
        mov     r0,#error_code
        mov     a,@r0
        rl      a
        rl      a
        rl      a
        rl      a
        mov     lamps_temp,a
        call    write_io_c               ; update the LEDS
        setb    ext_led                  ; turn on external led 1 minute
        jmp     write_to_c
pass_ok:
        clr     ext_led                  ; turn on external led 1 minute
        jmp     write_to_c
not_error_yet:
        jb      ext_led,clr_led
        setb    ext_led                  ; turn on external led while testing
```

```
        jmp     write_to_c
clr_led:
        clr     ext_led                 ; turn off external led while testing
write_to_c:
        call    write_io_m_c            ; turn on/off the external led
not_maint:
        mov     a,lamps_temp            ;Hold values for comparison later jb      frohtimeout,compare
        mov     c,ap2                   ; Check we are in ALERT state,
        anl     c,/ap1                  ; (i.e.: incoming call waiting)
        jnc     compare                 ; Brif not ALERT (no incoming call)
        jnb     fonhook,compare         ; Brif off hook, don't ring bell!
        clr     loopswitch_             ; Close loop switch if ALERT state,
        call    write_px2               ; (incoming call is waiting)
        jb      fcall,reset_ring_timer  ; Brif ringing is already in progress
        setb    fcall                   ; 1 = start ringing (ALERT detected)
        mov     bell_timer,#0           ; Reset timers
        mov     bell_timer2,#0
        setb    fbellsound              ;Flag bell sounding
        mov     dptr,#table_20          ;Point to 20 hz table for ring
        mov     lowpoint,dpl            ; Save ringer table starts
        mov     highpoint,dph
        setb    twenty_hz_pwm           ;So pin can be pwm
        mov     ccapm2,#01000010b       ;Enable pwm
test1:
0       clr     ring_                   ;Turn on ring ps
        setb    no_ring
        call    write_px2               ;Out to port
reset_ring_timer:
        mov     ring_timer,#0           ;Reset between-rings timer as long as
compare:                                ; we are in ALERT state
        xrl     a,lamps_temp            ;Bits that differ will be = 1
        jnb     f_one_sec,dtbits        ;Wait 1 sec after off hook before
                                        ; looking at inuse lamp, prevents
                                        ; disconnect if offhook soon after hup
        mov     c,acc.7                 ; Get INUSE status
        anl     c,/inuselamp            ; 1 = not INUSE
        jnc     timing_in_use_off       ;Start timer if INUSE lamp just turned
                                        ; off
        mov     in_use_off_timer,#28    ;Reset timer for 1.99 sec(28 x 71.1 ms)
        setb    f_Inuseofftiming        ;Show in use off timer is working now
timing_in_use_off:
        jnb     inuselamp,cont_in_use_timing
                                        ;If inuse lamp still off
        clr     f_inuseofftiming        ;Otherwise clear flag and stop timing
cont_in_use_timing:
        jnb     f_inuseofftiming,dtbits ;Continue timing if flag is set
        djnz    in_use_off_timer,dtbits ;When timer hits 1.99 sec, disconnect
        clr     f_Inuseofftiming        ;Clear flag
        jb      fonhook,dtbits          ;If local hangup don't do remote hangup ; We get here if the other party hang-up and we did not put the phone
; back on hook within 2 seconds.

disconnect:
        setb    fremote_hup             ; set remote hup for 700ms
        setb    loopswitch_             ;Other side has disconnected
        call    write_px2
dtbits:
        anl     a,#01110000b            ;Just check bits that affect dial tone
        jz      ring_timeout            ;If nothing chgd
        jnb     fdtone,ring_timeout     ;Or if DT not on already
        mov     ccapm1,#0               ;Turn off current DT
```

```
                call    dtone                   ;Change to new dial tone
ring_timeout:
                jnb     fcall,update_done       ;Don't time ring if no incoming call
                inc     ring_timer              ;Every 71.1 msec
                mov     a,#53                   ;54 x 71.1 ms= 3.84 sec
                clr     c                       ;Clear carry for subtraction
                subb    a,ring_timer
                jnc     update_done             ;If not at least 3.84 sec with no ring
                jb      fbellsound,update_done  ;Also wait til not sounding ring
check_stop_ring_ps:
                mov     a,#3                    ;4 x 25 ms = 100 ms
                clr     c                       ;Ready to do subtract
                subb    a,bell_timer2
                jnc     update_done             ;When carry, 100 ms
                jb      ring_,check_stop_null   ;Brif ring PS is already turned off setb    ring_                   ;Else turn off ring PS now
                call    write_px2               ;Out to port
                clr     no_ring
                call    write_px2               ;Out to port
check_stop_null:
                mov     a,#7                    ;8 x 25 ms = 200 ms
                clr     c                       ;Ready to do subtract
                subb    a,bell_timer2
                jnc     update_done             ;When carry, 200 ms
                mov     ccapm2,#0               ;Stop pwm
                clr     twenty_hz_pwm           ;Leave output pin low, pwm has run 100
                                                ; ms longer than ring ps to smooth out
                                                ; waveform
                clr     fcall                   ;0 = not ALERT, assure no ringing
                jnb     sw_gndstart,update_done ;Brif loop start
                setb    loopswitch_             ;GS didnt answer ring
                call    write_px2
update_done:
                jb      fcall,no_reset_io
                jnb     lc_,no_reset_io
                jb      frohtimeout,no_reset_io
no_reset_io:
                pop     psw
                pop     acc
                ret
;***********************************************
;
;       Reload Watch Dog Compare Word
;
;*********************************************** watchdog:
                push    ie
                clr     ea                      ; Disable ints
                mov     ccap41,#0               ; Point to start of current page
                mov     ccap4h,ch               ; Current page
                pop     ie
                ret
```

```
;***********************************************
;
; Timer0 (TL0) on-hook interrupt service routine
;
;*********************************************** onhook_timer:
        push    psw
        push    acc
        clr     tr1                             ;Stop offhook timer
        clr     tf1                             ;Clear pending ints by offhook timer
mute_check:
        jb      mute,on_spec2                   ;If already muted skip this
        setb    mute                            ;Mute rx audio to prevent false
                                                ; decoding of audio ring as dtmf,
                                                ; also prevent audio feedback
        call    write_px2                       ;Out to port on_spec2:
        jnb     fspec2,on_spec2_done            ;Check flag
        call    spec2                           ;Call special routine in TRU section
on_spec2_done:
        djnz    display_delay,gs_init           ;In 71.1 ms
        call    update_displays                 ;Every 71.1 ms
gs_init:
        jb      fcall,cont_service              ;Skip outgoing GS init on incoming call
        jnb     sw_gndstart,cont_service        ; Brif not in GS mode
        jnb     fonhook,cont_service            ;Don't look for ring ground to start
                                                ; GS until really hung up
        jb      ring_ground_,cont_groundstart
        clr     loopswitch_                     ;Groundstart service was requested
        call    write_px2
        mov     gndstart_timer1,#0
        mov     gndstart_timer2,#0              ;Init timer
cont_groundstart:
        inc     gndstart_timer1                 ;Subscriber has released ring ground
        mov     a,gndstart_timer1
        cjne    a,#90,cont_service              ;25 ms (90 x 277.8 us)
        inc     gndstart_timer2                 ;Every 25 msec
        mov     gndstart_timer1,#0              ;Reset for next count of 90
        mov     a,gndstart_timer2
        cjne    a,#40,cont_service              ;1 sec (40 x 25 ms)
        setb    loopswitch_                     ;Open loop in 1 sec if sub didn't
                                                ; complete loop
        call    write_px2
cont_service:
        jb      fcall,ring_control              ; Brif ALERT state to generate ringing
        jmp     onhook_timers                   ; Else just do timers update ; We shall ring the bell if the TRU is in ALERT state, (an incoming
; call is waiting to be picked up).

ring_control:
        jb      fbellsound,timing_ring          ;When bell not sounding during ring
                                                ; cycle, check for ring ground to
                                                ; indicate answer due to ringing
                                                ; pulses
        jb      ring_ground_,timing_ring
                                                ;If no ring ground,time the ring.Now
                                                ; ignore the pulse on ring ground as
                                                ; ringer stops
        mov     a,bell_timer2                   ;Incs every 25 ms
        cjne    a,#0,start_bellsound            ;Observe any ring ground after 25 ms
        mov     a,#28                           ;29 x 277.8 us = 8.1 ms
```

```
                clr     c                       ;Ready to subtract
                subb    a,bell_timer
                jnc     timing_ring             ;No carry til 8.1 ms after ring stops.
                                                ;Only ignore ring ground 8.1 ms
                jmp     start_bellsound         ;If ring ground indicates came off hoo
                                                ; during silent time, start 20 hz
                                                ; again to force ring trip
timing_ring:
                inc     bell_timer              ;Every 277.8 usec
                mov     a,bell_timer
                cjne    a,#90,ringer_on         ;25 msec (90 x 277.8 us)
                mov     bell_timer,#0           ;Reset for next 90
                inc     bell_timer2             ;Every 25 msec
ringer_on:
                jnb     fbellsound,ringer_off   ;Brif bell is not sounding now ; The on time ringer modified from 1.95 secs to 1.975 secs, because the ring
; stops at the positive peak which causes a continous ringing. This problem
; was producing with 5 ringer box applying with maxjack. (ssh)

check_stop_bellsound:
                mov     a,bell_timer2           ;Get elapsed "bell on" time
                cjne    a,#59,onhook_timers     ;Brif less then 79x25ms=1.975 secs
                mov     a,bell_timer            ;45 x 277.8 us = 12.5ms (total 1.987s
                cjne    a,#45,onhook_timers     ;Ring stops after 1.987secs on negativ(
                                                ; peak, chops off last quarter cycle
                                                ; for proper ring trip
stop_bellsound:
                mov     ccapm2,#0               ;Enable pwm
                clr     fbellsound              ;0 = the bell not sounding
                mov     dptr,#table_null        ;Point to table of null tone (nulltone
                                                ; causes ringer to have zero AC out,
                                                ; only battery)

mov     lowpoint,dpl            ;Save the null table start
                mov     highpoint,dph
                mov     ccapm2,#01000010b       ;Enable pwm
                clr     ea
                clr     no_ring
                call    write_px2
                setb    ea
                call    watchdog
                jmp     reset_bell_timers       ;Reset timers
ringer_off:
                mov     a,bell_timer2
                cjne    a,#120,onhook_timers    ;4 sec with no ring (160 x 25)
start_bellsound:
                call    reset_io
                call    write_px1
                call    write_px2
                clr     ea
                setb    no_ring
                call    write_px2
                setb    ea
                mov     ccapm2,#0               ;Enable pwm
                mov     dptr,#table_20          ;Point to table for 20 hz
                mov     lowpoint,dpl            ;Remember where table starts
                mov     highpoint,dph
                mov     ccapm2,#01000010b       ;Enable pwm
test_relay1:
                setb    fbellsound              ;1 = bell is sounding now
reset_bell_timers:
                mov     bell_timer,#0
```

```
            mov     bell_timer2,#0
onhook_timers:
            inc     time_on1                    ;Every 277.8 usec while on hook
            mov     a,time_on1
            cjne    a,#36,onhook_done           ;36 x 277.8 ms = 10 ms
            inc     time_on2                    ;Every 10 msec while on hook
            mov     time_on1,#0                 ;Reset for next 36
            mov     a,time_on2
            cjne    a,#0,not_inc255
            inc     test_min                    ; 10 msec x 255 = .255 sec
not_inc255:
            jb      frohtimeout,onhook_done
                                                ;Skip hang up stuff until loop test
                                                ; checks out ok
test_fhang1:
            jb      fonhook,onhook_done         ;Don't do another hang up, one has been
                                                ; done already
test_fhang2:
            mov     a,time_on2
;                                               ;ON HOOK STATUS
;           cjne    a,#70,onhook_done           ;700 msec indicates hang up
            cjne    a,#30,onhook_done           ;700 msec indicates hang up
test_fhang3:
            setb    fhang                       ;Set the hang up flag
            clr     f_inuseofftiming            ; Stop timer to prevent possible remote
                                                ; hup
onhook_done:
            pop     acc
            pop     psw
            reti ;***********************************************
;
; Timer1 (TH0) off-hook interrupt service routine
;
;*********************************************** offhook_timer:
            push    psw                         ; Save entry status
            push    acc
            jnb     fspec2,check_strobe         ; Brif spec2 is not enabled
            call    spec2                       ; Else do TRU specific task ; Check for a DTMF digit, and read it from the MT8870 if there
; is one available.

check_strobe:
            call    read_px1_strobe
            jb      strobe,decode_dtmf          ; Brif a DTMF digit is waiting
            clr     fdecoder_busy               ; Reset if strobe is gone
            jmp     ttime                       ; and just do offhook timing task
decode_dtmf:
            jb      fdecoder_busy,ttime         ; Brif DTMF digit already was read
            call    read_px1                    ; Else read it now
            setb    fdtmfin                     ; 1 = DTMF digit received!
            setb    fdecoder_busy               ; 1 = DTMF digit being processed ; Check elapsed offhook time, update displays in every 71ms, and
; start-end ROH tone as required.

ttime:
            inc     time_off1                   ; Bump minor offhook timer (@ 277.8us)
            mov     a,time_off1                 ; Get minor offhook time
```

```
;JMP TEST_HOOK
            cjne    a,#0,t_one_sec          ; Brif < 256*277us=71.1ms
            inc     time_off2               ; Bump major timer (every 71.1ms)
            call    update_displays         ; Do update every 71.1ms
            mov     a,time_off2             ; Get major offhook time
            cjne    a,#0,t_one_sec          ; Brif < 256*71.1ms=18.2sec
            inc     time_off3               ; Bump total offhook timer (@ 18.2sec)
t_one_sec:
            mov     a,time_off2             ; Get major offhook time
            cjne    a,#14,trohtimer         ; Brif < 14*71.1ms=995ms passed
            setb    f_one_sec               ; so change in INUSE lamp won't cause
                                            ; hangup if phone taken off hook too
                                            ; soon after hangup
trohtimer:
            jb      fsend,tdone             ; Brif we originated the call (no ROH)
            jnb     inuse,tdone             ; Brif we are INUSE (no ROH either)
            inc     r5                      ; Bump minor ROH start/end timer
            cjne    r5,#36,trohstart        ; Brif < 35*277.8us=10ms passed
            inc     r7                      ; Bump minor ROH on/off timer
            mov     r5,#0                   ; Reset for another pass (10ms)
            cjne    r7,#10,trohstart        ; Brif < 10*10ms=100ms passed
            cpl     roh_on                  ; Toggle ROH on/off every 100ms
            mov     r7,#0                   ; Reset for another on/off phase
trohstart:
            mov     a,time_off3             ; Get total elapsed offhook time
            cjne    a,#2,trohquit           ; Brif < 2x18.2=36.3sec passed
            mov     a,time_off2             ; Get additional major time too
            cjne    a,#51,trohquit          ; Brif < 40sec total offhook
            setb    ftime                   ; 1 = ROH period started
trohquit:
            mov     a,time_off3             ; Get total offhook time again
            cjne    a,#5,tdone              ; Brif < 5*18.2=91sec passed
            mov     a,time_off2             ; Get additional major time too
            cjne    a,#127,tdone            ; Brif < 91+(127*71.1 ms)=100sec
            setb    frohtimeout             ; 1 = ROH period expired
tdone:
            jnb     f_start,tdone0          ; Brif not timing 500ms after "first"
            mov     a,time_off2             ; Get elapsed offhook time
            cjne    a,#4,tdone1             ; Brif < 285ms elapsed
;           cjne    a,#7,tdone1             ; Brif < 500ms elapsed
            clr     f_start                 ; Reenable onhook ints after 500ms ; Get here only after 500ms passed following the first offhook after
; every hang up.

tdone0:
            jnb     lc_,tdone1              ; Brif offhook now
test_tr0:
            clr     tr1                     ; Else stop the off hook timer
            setb    tr0                     ; and start on hook timer
tdone1:
            pop     acc                     ; Restore
            pop     psw
            reti
```

```
;***************************************************
;
; External Interrupt 0 service routine
;
;***************************************************
offhook_edge:
            jb      frohtimeout,offhook_return1
            jnb     fcall,not_inc_call
            jnb     no_ring,ok_wait
            setb    ring                            ;Turn off bell
            call    write_px2
            clr     no_ring
            call    write_px2
            setb    return_ring
            clr     ie0                             ;Discard pending EX0 (LC_) interrupt
            clr     tr0                             ; Turn off onhook_timer and flag
            clr     tf0                             ; in case onhook_timer int pending
ok_wait:
            mov     r7,#0ffh
loop_ring:
            mov     r6,#0ffh
            djnz    r6,$
            call    watchdog
            djnz    r7,loop_ring
            jnb     lc_,no_set
esta_set:
            jnb     return_ring,do_not_return
            call    reset_io
            call    write_px1
            call    write_px2
            setb    no_ring
            clr     ring                            ;Turn off bell
            call    write_px2
            clr     return_ring
            mov     r7,#07fh
loop_ring1:
            mov     r6,#0ffh
            djnz    r6,$
            call    watchdog
            djnz    r7,loop_ring1
do_not_return:
            call    reset_io
            call    write_px1
            call    write_px2
            setb    tr0                             ; Turn off onhook_timer and flag
            mov     tl0,#0
            reti
offhook_return1:
            jmp     offhook_return
no_set:
not_inc_call:
            clr     tr0                             ; Turn off onhook_timer and flag
            clr     tf0                             ; in case onhook_timer int pending
            push    psw
            push    acc
            clr     ie0                             ;Discard pending EX0 (LC_) interrupt
            setb    tr1                             ;Start off-hook timer
            clr     fhang                           ;Clear hangup flag for safety
            mov     th0,#0                          ;Reset offhook timer
            mov     time_off1,#0                    ;Timers incremented by th0 interrupts
            mov     time_off2,#0
            mov     time_off3,#0
            clr     mute                            ;Unmute rx audio
            call    write_px2
```

```
                jnb     fonhook,check_flash     ;Brif wasn't hung up
                                                ; coming back off hook clr     fonhook                 ;Clear the flag, it was hung up, now
ok_offhook:
                jnb     fcall,set_hook_flag     ;Brif not in ALERT state
                setb    fanswer                 ;1 = off hook during incoming call
                clr     fcall                   ;Clear the ALERT flag (answering call)
                setb    ring                    ;Turn off bell
                call    write_px2
                clr     no_ring
                call    write_px2
                mov     ccapm2,#0               ;Stop ringer PWM
                clr     twenty_hz_pwm           ;Leave output pin low
                jmp     offhook_done set_hook_flag:
                setb    fhook                   ; Show off hook if not in ALERT state
                jmp     offhook_done check_flash:
                mov     a,#19                   ;20 x 10 = 200 msec
                clr     c                       ;Clear carry for subtraction
                subb    a,time_on2              ;200 -700 msec is flash
                jnc     check_digit
                jnb     lock,offhook_done       ; No flash if TRU is locked
;;              setb    fflash                  ;Set flash flag
                jmp     offhook_done
check_digit:
                mov     a,#1                    ;2 x 10 = 20 msec
                clr     c                       ;Clear carry for subtraction
                subb    a,time_on2              ;20-200 msec is pulse
                jnc     offhook_done            ;Just a glitch
                inc     pulse_digit             ;Contains the number
                setb    fdigit                  ;Possible digit flag
offhook_done:
                mov     time_on1,#0             ;Reset on-hook timers so they can be
                mov     time_on2,#0             ; restarted on hang up
                mov     t10,#0
                pop     acc
                pop     psw
offhook_return:
                reti ;*************************************************
;
;       PCA Interrupt Routine
;
;*************************************************

; PCA interrupts are generated by using module 0's (software timer)
; compare/match option on every low count = FF match. This way we can
; generate an interrupt at the end of each page, 00FF-0100, 01FF-0200
; etc. which gives us an interrupt at every (256*1.085us) 278us.
; This Maxjack implementation is using conditional assembly to produce
; a modified PCA service routine for TRUs with extremely high data transfer
; rates (Audiovox requires the alternate PCA routine).

$ge
pca_service:
                %if(%intmask ne 0) then (
                push    ie                      ;Going to simulate third interrupt
```

```
        mov     ie,#%intmask            ; priority level
        call    masklabel               ;Defined in TRU section
        push    acc                     ;To execute the reti
        push    psw
        mov     a,ccapm1                ;Look at tone pwm
        orl     a,ccapm2                ;Look at ring pwm
        anl     a,#00000010b            ;Just look at pwm bit
        jz      pca_done                ;Skip next part if no tone or ring
                                        ; output
do_pca:
        mov     a,#0                    ;Initialize pointer
read_table:
        movc    a,@a+dptr               ;Get data from table
        cjne    a,#255,write_tone
        mov     dph,highpoint           ;Reset index this is end of table
        mov     dpl,lowpoint
        mov     a,#0                    ;So index will be right
        jmp     read_table              ;Read first entry
write_tone:
        mov     ccap1h,a                ;Put data in tone pwm
        mov     ccap2h,a                ;Put data into ring pwm -only tone
                                        ; or ring pwm is running at any given
                                        ; time
        inc     dptr                    ;Point to next table entry for next
                                        ; time
pca_done:
        clr     ccf0                    ;Reset the module 0 flag
        clr     ea                      ;Disable ints
        mov     ccap01,#0ffh            ;Reload low match and suspend
                                        ; comparator
        mov     a,ccap0h                ;Get last page
        inc     a                       ;Point to next page
        mov     ccap0h,a                ;Load high match and restart comparator
        setb    ea                      ;Enable ints again
        pop     psw
        pop     acc
        pop     ie                      ;Restore original ints
        ret
masklabel:
        reti
        ) else (
        push    acc
        push    psw
        mov     a,ccapm1                ;Look at tone pwm
        orl     a,ccapm2                ;Look at ring pwm
        anl     a,#00000010b            ;Just look at pwm bit
        jz      pca_done                ;Skip next part if no tone or ring
                                        ; output ; If we are generating Dial Tone now, then get the current
; value from the selected tone table, and send it to the PCA1
; so that proper DTMF frequency is generated on CEX1 (p1.4).

do_pca:
        mov     a,#0                    ;Initialize pointer
read_table:
        movc    a,@a+dptr               ;Get data from table
        cjne    a,#255,write_tone
        mov     dph,highpoint           ;Reset index, this is end of table
        mov     dpl,lowpoint
        mov     a,#0                    ;So index will be right
        jmp     read_table              ;Read first entry
write_tone:
```

77

```
            mov     ccap1h,a                ;Put data in tone pwm
            mov     ccap2h,a                ;Put data into ring pwm only tone or
                                            ; ring pwm is running at any given
                                            ; time
            inc     dptr                    ;Point to next table entry for next
                                            ; time
pca_done:
            clr     ccf0                    ;Reset the module 0 flag
            clr     ea                      ;Disable ints
            mov     ccap01,#0ffh            ;Reload low match and suspend
                                            ; comparator
            mov     a,ccap0h                ;Get last page
            inc     a                       ;Point to next page
            mov     ccap0h,a                ;Load high match and restart comparatoi
            setb    ea                      ;Enable ints again
            pop     psw
            pop     acc
            reti
        ) fi
$noge ;**************************************************
;
;       I/O Support Routines
;
;************************************************** write_px1:                                  ; Data from px1_temp to px1
            push    ie                      ; Save interrupt status
            clr     ea                      ; No interruptions
            clr     io_select
            push    acc
            push    0                       ; Push r0
            setb    a0                      ; B
            clr     a1
            mov     a,px1_temp
            anl     a,#11110000b
            mov     b,a
            mov     a,px2_temp
            anl     a,#00001111b            ; Keep the input bits high
            orl     a,b
            mov     r0,#00h                 ; Low address for I/O chip px1 latch
            movx    @r0,a
            setb    a0
            setb    a1
            pop     0                       ; Restore r0
            pop     acc
            pop     ie                      ; Restore interrupt status
            ret read_px1:
            push    ie                      ; Save interrupt status
            clr     ea                      ; No interrupts
            clr     io_select
            push    acc
            push    0                       ; Push r0
            clr     a0                      ; A
            clr     a1
            mov     r0,#0h                  ; Low address byte for I/O chip px1 pins
            movx    a,@r0
            anl     a,#00001111b            ; Mask the output bits
            anl     px1_temp,#11110000b     ; Mask the input bits in px1_temp
            orl     px1_temp,a              ; Combine inputs anl outputs into one
```

```
                setb    a0
                setb    a1
                pop     0                       ; Pop r0
                pop     acc
                pop     ie                      ; Restore interrupt status
                ret
read_px1_strobe:
                push    ie                      ; Save interrupt status
                clr     ea                      ; No interrupts
                clr     io_select
                push    acc
                push    0                       ; Push r0
                clr     a0                      ; A
                clr     a1
                mov     r0,#0h                  ; Low address byte for I/O chip px1 pins
                movx    a,@r0
                mov     io_status,a
                setb    a0
                setb    a1
                pop     0                       ; Pop r0
                pop     acc
                pop     ie                      ; Restore interrupt status
                ret write_px2:                                      ; Data from px2_temp to px2 push    ie                      ; Save interrupt status
                clr     ea                      ; No interruptions
                clr     io_select
                push    acc
                push    0                       ; Push r0
                setb    a0                      ; B
                clr     a1
                mov     a,px1_temp
                anl     a,#11110000b
                mov     b,a
                mov     a,px2_temp
                anl     a,#00001111b            ; Keep the input bits high
                orl     a,b
                mov     r0,#00h                 ; Low address for I/O chip px1 latch
                movx    @r0,a
                setb    a0
                setb    a1
                pop     0                       ; Restore r0
                pop     acc
                pop     ie                      ; Restore interrupt status
                ret write_io_c:                                     ; Data from px2_temp to px2
                push    ie                      ; Save interrupt status
                clr     ea                      ; No interruptions
                clr     io_select
                push    acc
                push    0                       ; Push r0
                clr     a0                      ; B
                setb    a1
                mov     a,lamps_temp
                anl     a,#11110000b
                rl      a
                rl      a
                rl      a
                rl      a
                mov     r0,#00h                 ; Low address for I/O chip px1 latch
```

```
         movx    @r0,a
         setb    a0
         setb    a1
         pop     0                           ; Restore r0
         pop     acc
         pop     ie                          ; Restore interrupt status
         ret
read_px2:
         push    ie                          ; Save interrupt status
         clr     ea                          ; No interrupts
         clr     io_select
         push    acc
         push    0                           ; Push r0
         clr     a0                          ; C
         setb    a1
         mov     r0,#0h                      ; Low address for I/O chip px2 pins
         movx    a,@r0
         anl     a,#11110000b                ; Mask the output bits
         anl     px2_temp,#00001111b         ; Mask the input bits in px2_temp
         orl     px2_temp,a                  ; Combine inputs/outputs into one byte
         setb    a0
         setb    a1
         pop     0                           ; Pop r0
         pop     acc
         pop     ie                          ; Restore interrupt status
         ret read_io_m_a:                                 ; Data from px2_temp to px2
         push    ie                          ; Save interrupt status
         clr     ea                          ; No interruptions
         setb    io_select
;        push    acc
         push    0                           ; Push r0
         clr     a0                          ; b
         clr     a1
         mov     r0,#00h                     ; Low address for I/O chip px1 latch
         movx    a,@r0
         setb    a0
         setb    a1
         clr     io_select
         pop     0                           ; Restore r0
;        pop     acc
         pop     ie                          ; Restore interrupt status
         ret write_io_m_b:                                ; Data from px1_temp to px1
         push    ie                          ; Save interrupt status
         setb    io_select
         clr     ea                          ; No interruptions
         push    acc
         push    0                           ; Push r0
         setb    a0                          ; B
         clr     a1
         mov     a,io_m_b
         mov     r0,#00h                     ; Low address for I/O chip px1 latch
         movx    @r0,a
         setb    a0
         setb    a1
         clr     io_select
         pop     0                           ; Restore r0
         pop     acc
         pop     ie                          ; Restore interrupt status
         ret
```

```
write_io_m_c:
        push    ie                      ; Data from px2_temp to px2
        setb    io_select               ; Save interrupt status
        clr     ea                      ; No interruptions
        push    acc
        push    0                       ; Push r0
        clr     a0                      ; B
        setb    a1
        mov     a,io_m_c
        mov     r0,#00h                 ; Low address for I/O chip px1 latch
        movx    @r0,a
        setb    a0
        setb    a1
        clr     io_select
        pop     0                       ; Restore r0
        pop     acc
        pop     ie                      ; Restore interrupt status
        ret reset_io_m:
        push    ie                      ; Save interrupt status
        clr     ea                      ; No interrupts
        setb    io_select
        push    acc
        push    0                       ; Push r0
        setb    a0                      ; Control
        setb    a1
        mov     r0,#0h                  ; Low address for I/O chip px2 pins
        mov     a,#10010000b
        movx    @r0,a
        setb    a0
        setb    a1
        clr     io_select
        pop     0                       ; Pop r0
        pop     acc
        pop     ie                      ; Restore interrupt status
        ret reset_io:
        push    ie                      ; Save interrupt status
        clr     ea                      ; No interrupts
        clr     io_select
        push    acc
        push    0                       ; Push r0
        setb    a0                      ; Control
        setb    a1
        mov     r0,#0h                  ; Low address for I/O chip px2 pins
        mov     a,#10011000b
        movx    @r0,a
        setb    a0
        setb    a1
        clr     io_select
        pop     0                       ; Pop r0
        pop     acc
        pop     ie                      ; Restore interrupt status
        ret
```

```
;************************************************
;
;         Support Routines
;
;************************************************
; Generic messages between the TRU and Celjack can be save to aid
; in debugging. This message buffer is from 90h to FFh.
clr_msg:
        push    1                               ; Save R1
        mov     r1,#msgbuf_start                ; Point to message buffer start
        mov     msg_ptr,r1                      ; Save buffer start
clr_msg1:
        mov     @r1,#55h                        ; Fill with 55h mask
        inc     r1                              ; Point to next location
        cjne    r1,#msgbuf_end,clr_msg1         ; Til end of the buffer
        pop     1                               ; Restore R1
        ret savemg:
        push    1                               ; Save R1
        mov     r1,msg_ptr                      ; Get current pointer
        cjne    r1,#msgbuf_end,savem1           ; Brif message buffer is not full yet
        mov     r1,#msgbuf_start                ; Repoint to start when full
savem1: mov     @r1,a                           ; Save msg in buffer
        inc     r1                              ; Advance pointer
        mov     msg_ptr,r1                      ; Save advanced for next time
        pop     1                               ; Restore R1
exit:   ret ; Clear copy of handset's LCD display from ram display buffer .
clr_dsp:
        push    1                               ; Save R1
        mov     r1,#dspbuf_start                ; Point to message buffer start
        mov     dsp_ptr,r1                      ; Save buffer start
clr_dsp1:
        mov     @r1,#0ffh                       ; Fill with FFh mask
        inc     r1                              ; Point to next location
        cjne    r1,#dspbuf_end,clr_dsp1         ; Til end of display buffer
        pop     1                               ; Restore R1
        ret ; Some TRUs must save the handset LCD display info, in a local display
; buffer.
save_dsp:
        push    1                               ; Save R1
        mov     r1,dsp_ptr                      ; Get current pointer
        cjne    r1,#dspbuf_end,save_dsp1        ; Brif message buffer is not full yet
        mov     r1,#dspbuf_start                ; Repoint to start when full
save_dsp1:
        mov     @r1,a                           ; Save msg in buffer
        inc     r1                              ; Advance pointer
        mov     dsp_ptr,r1                      ; Update pointer for next time
        pop     1                               ; Restore R1
save_dsp2:
;include(SPAIN.asm)
        ret
```

```
$nolist $include(SPAIN4.asm)

$list
        nop
        nop
        end;
```

TELEMAINTENANCE REMOTE REPORTING m_make_call - make a call to report

```
m_make_call:
        mov     r0,#counter_1           ; Inicializamos el contador
        mov     @r0,#03h                ; para 3 reintentos mov     R0,#call_back2          ; clear call incomplete bit
        mov     a,@R0
        anl     a,#01111111b
        mov     @R0,a mr_who_invoke:                          ; checking who invoke the test
        mov     R0,#call_back2          ; and check if the test is enable
        mov     a,@R0                   ; for that option
        anl     a,#01100000b
        mov     r0,#options
        cjne    a,#00000000b,mr_test_manual
        jmp     mr_reset_invoked        ;X00X XXXX - reset mr_test_manual:
        cjne    a,#00100000b,mr_test_auto
        jmp     mr_auto_invoked         ; X01X XXXX - auto (timer)

mr_test_auto:
        cjne    a,#01100000b,mr_manual_invoked    ; X10X XXXX - manual
        jmp     mr_tele_invoked                   ; X11X XXXX - telesupervisado mr_reset_invoked:
        jmp     mr_who_invoke_end mr_manual_invoked:
        mov     a,@r0
        anl     a,#00000010b
        jnz     mr_who_invoke_end       ; enabled
        jmp     m_call_test_end mr_auto_invoked:
        jb      error_flag,mr_auto_invoked_cont
        jmp     m_call_test_end mr_auto_invoked_cont:
;       mov     a,@r0
;       anl     a,#00000001b
;       jnz     mr_who_invoke_end       ; enabled
;       jmp     mr_who_invoke_end       ; enabled
;       jmp     m_call_test_end
```

83

```
mr_tele_invoked:
        mov     a,@r0
        anl     a,#00000001b
        jnz     mr_who_invoke_end       ; enabled
        jmp     m_call_test_end
mr_who_invoke_end:
m_check_power:
        jnb     power_,m_check_servc    ; checking radio power jmp     m_call_test_end m_check_servc:
        jb      noserv,m_calling        ; checking service
        mov     R0,#call_back2          ; used in the call back option
        mov     a,@R0
        orl     a,#10010000b
        mov     @R0,a
        jmp     m_call_test_end m_calling:

; Check if test has been aborted by sliding the PCR
        jb      test_enable,$+6
        ljmp    m_call_test_end call    datos_radio mov     a,#2
        call    delay2                  ; 1 sec delay get_TMC_phone_Number:

; Check if test has been aborted by sliding the PCR
        jb      test_enable,$+6
        ljmp    m_call_test_end mov     r2,#0
        mov     r1,#calling_num
        mov     a,@r1
        swap    a
        anl     a,#00001111b
        mov     r1,a call    check_tel_number
        cjne    a,#0ffh,m_calling_con ;added on 10/12/94 to check next available telephone number when a number
;for Telemaintenance Center has been found to be invalid call    ext_watchdog
        mov     a,#1                    ; Wait 2.5 secs delay
        call    delay2

First Reset retry counters
        mov     r0,#call_back2
        mov     a,@r0
        anl     a,#11100000b            ; erase call_back2 counters
        mov     @r0,a
        mov     r0,#attempt
        mov     a,@r0
        swap    a
```

```
            anl     a,#00001111b        ; get new call_back2 counters
            mov     r0,#call_back2
            orl     a,@r0
            mov     @r0,a               ;

mov     r0,#calling_num
            mov     a,@r0
            swap    a
            inc     a
            swap    a
            mov     @r0,a
            anl     a,#0f0h
            cjne    a,#70h,get_TMC_phone_Number
Last phone number reached, no more retries will be done
Put all flags back to normal and exit
            mov     R0,#call_back2
            mov     a,@R0
            anl     a,#01111111b
            mov     @r0,a
            call    reset_clock
            clr     test_pending
            jmp     m_pre_onhook        ; Exit this routine m_calling_con:
            jb      apl,m_sending
            jmp     m_call_test_end m_sending:
            mov     a,#send
            call    wrbus mov     r0,#8
mloopd8s:
; Check if test has been aborted by sliding the PCR
            jb      test_enable,$+6
            ljmp    m_call_end2
            mov     a,#1
            call    delay2
            djnz    r0,mloopd8s m_called:
            mov     r0,#count200        ; init counter for 200ms pulses
            mov     @r0,#09
            mov     r0,#count600        ; init counter for 200ms pulses
            mov     @r0,#03             ; with 600ms rest
            mov     r0,#count_eng       ; init counter for path engage
            mov     @r0,#50h
            mov     r0,#count_tone      ; Reset RingBack tone counter
            mov     @r0,#0 mov     T1_Timer,#0         ; Reset T1 (10 secs) timer clr     mute                ; enable audio signal
            call    write_io_b          ; ****; px2 mov     time_10ms,#0        ; setting timers for 1 minute waiting
            mov     timer_10ms,#0
            mov     time_1s,#59
            mov     time_1m,#1
            mov     time_1hr,#1         ; dummy time to not allow timer go off m_check_inuse:
            jnb     inuse,m_t_425_ver   ; if inuse fails then
            jmp     m_call_end
```

```
m_t_425_ver:                                    ; t_425 tone detected
        mov     r0,#max_active          ; init maximun time to check
        mov     @r0,#250
        mov     r0,#filter              ; init maximun time to check
        mov     @r0,#00100001b
        mov     io_m_a,#00100001b       ; set mask for signal ; Check manual switch test abort
        jb      test_enable,$+6
        ljmp    m_call_end2

; Check T1 timer
        call    Check_T1_Timer
        jnc     cont_ver
        jmp     m_call_end              ; Abort call, T1 timer is completed
cont_ver:

; Check signal high time
            call verify_                ; calling to sub verify to get time on ; Check if test has been aborted by sliding the PCR
        jb      test_enable,$+6
        ljmp    m_call_end2 clr     c
        subb    a,#12                   ; ****; 14 falla -25db -> 150ms
        jc      m_nnt_yet               ; if time on < .150 not valid mov     a,b
        clr     c
        subb    a,#27                   ; ****; 25 falla -8db -> 250ms
        jc      m_check_off_200         ; if .150<time on <.250 check time off mov     a,b
        clr     c
        subb    a,#88    ;****; 90      ; if .250<time on<.9 s time not valid
        jc      m_bad_timing mov     a,b
        clr     c
        subb    a,#138;   ****; 140     ; if.900<time on<1.4s time not valid
        jnc     m_check_ring_b
        jmp     m_bad_timing m_check_ring_b:
        mov     a,b
        clr     c
        subb    a,#162   ;****;170      ; if 1.4s<time on<1.7s
        jc      m_check_off_3s          ;   check for ring back jmp     m_bad_timing m_check_off_200:
        mov     r0,#filter              ; init maximun time to check
        mov     @r0,#11100001b
        mov     io_m_a,#11100001b       ; set mask for signal call    verify_off              ; calling to sub verify to get time off
; Check if test has been aborted by sliding the PCR
        jb      test_enable,$+6
        ljmp    m_call_end2
```

```
        clr     c
        subb    a,#15
        jc      m_bad_timing       ; if time off <.150 mov     a,b                ; not valid
        clr     c
        subb    a,#30      ; ****; 25
        jc      m_t_200_ok         ; if .150 <time off<.250 mov     a,b
        clr     c
        subb    a,#50
        jc      m_bad_timing       ; if .250 <time off <.500 mov     a,b                ; not valid
        clr     c
        subb    a,#75
        jc      m_t_600_ok         ; if .500 <time off <.700
                                   ; not valid
m_bad_timing:
        mov     r0,#count200       ; reset count200 = 6
        mov     @r0,#9
        mov     r0,#count600       ; reset count600 = 3
        mov     @r0,#3 m_nnt_yet:
        call    check_dtmf4
        jnc     m_nnt_yyet
        jmp     m_path_engaged_detected m_nnt_yyet:
        call    read_io_m_a        ; check 400,800 or 1020 tone
        anl     a,#10000000b
        cjne    a,#10000000b,m_tone_ver_  ; if equal m_tone_ver m_nnnt_yet:
        call    ext_watchdog; *;
        jmp     m_not_yet m_tone_ver_:
        jmp     m_tone_ver
m_t_600_ok:
        mov     r0,#count200       ; reset count200 = 6
        mov     a,@r0
        clr     c
        subb    a,#6
        jnc     m_t_600_cad
        jmp     m_bad_timing m_t_600_cad:
        mov     @r0,#9
        mov     r0,#count600       ; if count 200 = 0 is busy tone
        mov     a,@r0
        dec     a
        mov     @r0,a
        jnz     m_nnt_yet
        jmp     m_congest_ok m_t_200_ok:
        mov     r0,#count200       ; if count200 = 0 is busy tone
        mov     a,@r0
```

87

```
                dec     a
                mov     @r0,a
                jnz     m_nnt_yet
                jmp     m_busy_ok m_check_off_3s:
                mov     r0,#filter              ; init maximun time to check
                mov     @r0,#11100001b
                mov     io_m_a,#11100001b       ; set mask for signal mov     r0,#max_active
                mov     @r0,#250                ; loop up to max_active second
                call    verify_off              ; calling to sub verify to get time off clr     c
                subb    a,#250 jc      m_bad_timing            ; if time off <2.4s posible 400 tone call    verify_off              ; calling verify to get time off ; Check if test has been aborted by sliding the PCR
                jb      test_enable,$+6
                ljmp    m_call_end2 mov     a,b
                clr     c
                subb    a,#36
                jc      m_bad_timing            ; if time_off <2.8s posible 400 tone mov     a,b
                clr     c
                subb    a,#60                   ; if 2.8<time off <2.4+.65 = 3.5s ring
                jc      m_RingBackToneOK
                jmp     m_bad_timing
m_not_yet:
                mov     a,time_1m               ; no detection yet
                jz      m_time_out
                jmp     m_check_inuse m_time_out:
                jmp     m_call_end m_tone_ver:                                     ; 400, 800 or 1029 hz - tone detected
                mov     r0,#max_active          ; init maximun time to check
                mov     @r0,#240                ; maximun sampling time 240*10ms=2.4s
                mov     r0,#filter
                mov     @r0,#10000000b
                mov     io_m_a,#10000000b       ; set mask for signal call    verify_                 ; calling to sub verify
                clr     c
; 70ms;
;               subb    a,#06                   ; if tone > 800 msec tone ok
                subb    a,#05                   ; if tone < 50 msec, tone is invalid jc      m_not_yet
                jmp     m_tone_ok ; A valid RingBack tone was detected
m_RingBackToneOK:
                mov     a,time_1m               ; Check T4 timer
                jz      m_time_out
                mov     r0,#count_tone          ; Increment RingBack tone count
```

```
                inc         @r0
                mov         T1_Timer,#0         ; Reset T1 timer
                mov         r0,#filter          ; Set signal mask
                mov         @r0,#11100001b
                mov         r0,#max_active      ; Set maximum signal detect time
                mov         @r0,#250
                jmp         m_check_inuse
m_path_engaged_detected:
m_congest_ok:
                nop
m_busy_ok:
                mov         R0,#call_back2      ; used in the call back option
                mov         a,@R0
                orl         a,#10010000b
                mov         @R0,a
                jmp         m_call_end2 m_tone_ok:

;___ A valid 1020Hz tone has been received from the Telesupervision Center
;___ Start Transmission of message packet now call        ext_watchdog; *;
; change from 300ms to 2s on 8/19/94
                mov         r1,#10
; delay_2s:
                mov         a,#20
                call        delay1
                call        ext_watchdog
                djnz        r1,delay_2s
                call report_alarmas ; Check if test has been aborted by sliding the PCR
                jb          test_enable,$+6
                ljmp        m_call_end2 mov         time_10ms,#0
                mov         timer_10ms, #0
                mov         time_1s,#10
                mov         time_1m,#3 mm_check_inuse:

jnb         inuse,mm_t_ver      ; if in use fails then
                jmp         m_call_end mm_t_ver:
                call        read_io_m_a         ; check 400, 800 or 1020 tone
                anl         a,#10000000b
                cjne        a,#10000000b,mm_tone_ver  ; if equal m_tone_ver
                jmp         mm_not_yet mm_tone_ver:

mov         r0,#max_active      ; init maximun time to check
                mov         @r0,#240            ; maximun sampling time 240*10ms=2.4s
                mov         r0,#filter
                mov         @r0,#10000000b
                mov         io_m_a,#10000000b   ; set mask for signal call        verify_             ; calling to sub verify ; Check if test has been aborted by sliding the PCR
                jb          test_enable,$+6
```

```
            ljmp       m_call_end2 clr        c
70ms;
            subb       a,#05                   ; if tone <50 tone invalid
            jc         mm_not_yet ---Message sucessfully transmitted to the TeleMaintenance Center
---and acknowledge received clr        test_pending            ; indicate that test was complete
            jmp        m_call_end2             ; Exit routine
mm_not_yet:
            call       ext_watchdog
            mov        a,time_1s               ; no detection yet
            jnz        mm_check_inuse          ; ****;m_tone_ok mov        r0,#counter1            ; Cargamos la direccion en r0.
            mov        a,@r0                   ; El contenido de la direccion
                                               ; al acumulador.
            dec        a                       ; Decrementamos el contador
            mov        @r0,a                   ; El contenido decremetado a memoria.
            jz         transmition_error       ; Si el acumulador es cero, saltamos.

jmp        m_tone_ok ;****; mm_check_inuse
transmition_error:
            mov        R0,#main1_flag_error    ; ****;
            mov        a,@R0
            orl        a,#00000010b            ; set inuse error
            mov        @R0,a
            mov        R0,#error_code
            mov        @R0,#code_xmit_error
            mov        a,#2
            call       delay2                  ; delay to show error lamps
_call_end:
            jmp        m_busy_ok
_call_end2:
            mov        a,#clear                ; Clear code
            call       wrbus                   ; clear any code in radio memory clr        conn_loop               ; present and on-hook
            call       write_io_m_b            ; and disconnect module mov        a,#1
            call       delay2                  ; delay _wait_inuse_off:
            clr        fremote_hup; ****       ; not needed
            call       hup
            setb       fremote_hup; ****;
            mov        a,#4
            call       delay2                  ; delay 4*2.5 sec setb       mute
            jmp        m_call_test_end
_pre_onhook:
_call_test_end:
            ret
```

```
;____ Function to check for T1 (10 secs) timer
;____ The T1 timer is activated if at least 1 RingBack tone
;____ is detected.
;____ Funtion returns carry flag on T1 time completion.

Check_T1_Timer:
        mov     r0,#count_tone
        mov     a,@r0
        cjne    a,#0,tonedet
        jmp     ExitCheckT1
tonedet:                                ; At least 1 tone was previously detected
        mov     a,T1_Timer
        clr     c
        subb    a,#10
        jc      ExitCheckT1
        setb    c
        ret
ExitCheckT1:
        clr     c
        ret Timer2/EXT2 Interrupt service routine ;Routine reads data from TRU and puts into
;appropriate storage locations
intl_service:
rdbus:

CLR     EA
        push    psw
        push    acc cont_checking_write:

jb      read,cont_read
        jnb     Sdata_tru,check_write
        setb    read
check_write:
        jb      inte_enable,cont_write
        jnb     write,check_message
check_write2:
        clr     sdata_cu                ; indication for write
        setb    inte_enable             ; flag to indicate write
        sjmp    check_message
cont_read:
        mov     a,sdata_in              ; read bit
        rr      a
        mov     c,Sdata_TRU
        mov     acc.7,c                 ; Put data bit in acc
        mov     sdata_in,a
        djnz    bits_left_in,check_write
        mov     bits_left_in,#8
        clr     read                    ; Prepare for next byte
        setb    data_valid              ; indicate 8 bits message
        sjmp    check_write cont_write:

mov     a,sdata_out
        mov     c,acc.0                 ; Shift out bit
        mov     Sdata_CU,c              ; Ditto
        rr      a                       ; Rotate acc left
```

```
            mov         Sdata_out,a
            djnz        bits_left_out,shift_next; Keep on til all 8 bits out
            setb        Sdata_CU
            clr         write
            mov         bits_left_out,#9
            clr         inte_enable         ; flag to indicate write
shift_next:
            mov         a,sdata_in
check_message:
            jbc         data_valid,dataOK
            jmp         rdbus_done ;----An 8 bit message was received.  Decode message now.

;----Check for a previously expected message by checking flags dataOK:
            jbc         rssi,SaveRSSI       ; is it previous rssi status
            jbc         f_goodid,read_status; is it previous message code 50
            jbc         f_60,msg_60         ; is it previous tari message 60
            jbc         f_61,msg_61         ; is it previous tari message 61
            jbc         f_62,msg_62         ; is it previous tari message 62
            jbc         f_63,msg_63         ; is it previous tari message 63

;----No flags set, must be a new message or data

;----First check if bit 7 is set
;----if set, numbers are greater than 80 hex jnb         acc.7,LessThan80hex
            ajmp        GreaterThan80hex
SaveRSSI:
; Radio signal strenght variable saving
            push        0
            mov         r0,#signal_strength
            mov         @r0,a
            pop         0
            ajmp        rdbus_done read_status:
; Indicators message received (Roam, NoService, InUse)
; Save in, the corresponding bit variables by using a fuzzy but fast method
            mov         c,acc.2
            cpl         c
            mov         inuse,c
            mov         c,acc.3
            cpl         c
            mov         roam,c
            jnb         acc.5,sserv
            clr         noserv
            clr         ring_enable         ; mant; enable ring after no service
            ajmp        rdbus_done
sserv:      setb        noserv
            ajmp        rdbus_done
msg_60:     push        0
            mov         r0,#data_60
            mov         @r0,a
            pop         0
            setb        send_60
            ajmp        rdbus_done
```

```
msg_61:push     0
       mov      r0,#data_61
       mov      @r0,a
       pop      0
       setb     send_61
       ajmp     rdbus_done msg_62:push     0
       mov      r0,#data_62
       mov      @r0,a
       pop      0
       setb     send_62
       ajmp     rdbus_done msg_63:push     0
       mov      r0,#data_63
       mov      @r0,a
       pop      0
       setb     send_63
       ajmp     rdbus_done LessThan80Hex ;----Message Received is less than code 80 Hex cjne     a,#51h,check_low_status
       setb     rssi                        ; set rssi status
       ajmp     rdbus_done
check_low_status:
       cjne     a,#50h,check_60             ; tari; if not 50 check status
       setb     f_goodid                    ; indicate message was 50
       ajmp     rdbus_done
                                            ; tari; vvvvvvvvvvvvvvvvvvvvvvvvvv
check_60:
       jnb      fcall,check60b
       ajmp     rdbus_done                  ; if incoming call do not check tariff
check60b:
       cjne     a,#60h,check_61             ; if not 60 check status
       setb     f_60                        ; indicate message was 60
       ajmp     rdbus_done
check_61:
       cjne     a,#61h,check_62             ; if not 61 check status
       setb     f_61                        ; indicate message was 61
       ajmp     rdbus_done
check_62:
       cjne     a,#62h,check_63             ; if not 62 check status
       setb     f_62                        ; indicate message was 62
       ajmp     rdbus_done
check_63:
       cjne     a,#63h,Chk3                 ; if not 63 check status
       setb     f_63                        ; indicate message was 63
       ajmp     rdbus_done
Chk3:  cjne     a,#03h,Chk2d
       setb     power_on
       ajmp     rdbus_done
Chk2d: cjne     a,#02dh,check_71
       clr      e_incoming
       clr      a_incoming
       setb     ap2
       setb     lock
       ajmp     rdbus_done
Check_71:
; Telesupervisory (Audit) check
       cjne     a,#71h,chk_73
```

```
        ajmp        set_telesup_test
; Voice channel taken check
chk_73: cjne       a,#73h,chk_74
        ajmp       set_vch1
chk_74: cjne       a,#74h,check_othersL
        ajmp       set_vch2
chk_othersL:
        ajmp       rdbus_done GreaterThan80hex:
;----- Value in accumulator is greater than 80 hex
        jb         acc.6,GreaterThanC0Hex    ; Number is (n >= c0h) if bit set
        jb         acc.4,GreaterThan90Hex    ; Number is (n >= 90h) if bit set
;----- Value in accumulator is in the range 80-8F or E0-EF
        cjne       a,#085H,Check80to89Hex
        setb       tru_is_on
Check80to89Hex:
        clr        c
        subb       a,#8ah
        jnc        GreaterThan89
; Number is (80h < n <= 89h), save in buffer for telemaintenance. May be
; an expected memory contents number after a memory read command
        mov        a,sdata_in                ; Get digit again
        call       save_dsp                  ; and save in buffer
        ajmp       rdbus_done
GreaterThan89:
; Number is (8ah <= n = 8fh or E0-EF): Invalid characters, not used. Exit now
GreaterThan90Hex:
        cjne       a,#095h,Chk91
        setb       e_incoming
        jnb        a_incoming,not_incoming_e
;----- Incoming call receive sequence E->A->E (llamada EntrAntE)
        clr        ap1
        mov        ccapm1,#0
        clr        e_incoming
        clr        a_incoming
not_incoming_e:
        ajmp       rdbus_done
Chk91:  cjne       a,#091h,Chk98
        jnb        e_incoming,Chk98
        setb       a_incoming
        ajmp       rdbus_done
Chk98:  cjne       a,#098h,ChkBA
        clr        lock
        ajmp       rdbus_done
ChkBA:  cjne       a,#0bah,ChkBB
;---- Incoming call (Tele maintenance) ----
        jb         ring_enable_ChkBB         ; mant;do not ring on init
        clr        incoming_c                ; mant;
        ajmp       rdbus_done
ChkBB:  cjne       a,#0bBH,ChkOther
;----- Call dropped by radio, can be either a local or remote hangup ----
        setb       ap1
        clr        e_incoming
        clr        a_incoming
        ajmp       rdbus_done
ChkOther:
;----- No other checks will be done, exit now
        ajmp       rdbus_done
GreaterThanC0Hex:
;----- No Special control messages with this code (C0-FF), exit now
        ajmp       rdbus_done ; Audit (Test Activation by Telesupervision Center)
```

```
set_telesup_test:
        setb    audit_code
        jb      test_enable,rdbus_done
        push    0
        mov     R0,#call_back       ;mant; and a new test is then perform
        mov     a,@r0                ;mant;
        anl     a,#00110000b         ;mant; clear counters, call incompleted
        orl     a,#00000000b         ;mant; keep previos led status and
        mov     @R0,a                ;mant; ring enable flag status
        mov     R0,#call_back2       ;mant;
        mov     a,@R0
        anl     a,#00000000b         ;mant; clear counters,report incompleted
        orl     a,#01100000b         ; set invoked by telesupervision
        mov     @R0,a                ;mant;
        setb    test_enable
        setb    init_test
        setb    test_pending
        pop     0
        sjmp    rdbus_done ;----- Voice channel taken, set vch bit ----- set_vch1:
        setb    vch_1
        sjmp    rdbus_done
set_vch2:
        setb    vch_2
        sjmp    rdbus_done rdbus_done:
        clr     data_in
        clr     ie1
        SETB    EA
        pop     acc
        pop     psw
        reti

COPYRIGHT 1995 - TELULAR INTERNATIONAL, INC.
```

What we claim is:

1. In an auto-diagnostic apparatus for testing the proper functioning of a cellular, or cellular-like, transceiver and a cellular, or cellular-like, interface unit operatively coupled to said cellular transceiver, which interface unit couples a land-type telephone device to the cellular transceiver whereby DTMF or pulse-type dialing signals are converted into digital format for sending to said cellular, or cellular-like, transceiver, whereby the dialed number made on the land-type of telephone may be used to call a number over the cellular, or cellular-like, system, and wherein said auto-diagnostic apparatus comprises auto-diagnostic means coupled to said interface unit for generating signals for testing the operation of said cellular, or cellular-like, transceiver and said cellular, or cellular-like, interface unit, the improvement comprising:

remote-testing initiation means for generating a signal for initiating in said auto-diagnostic means the initiation of the testing of the proper functioning of the cellular, or cellular-like, transceiver and the cellular, or cellular-like, interface unit operatively coupled to said cellular transceiver; and signal-responsive means associated with said auto-diagnostic means responsive to said signal from said remote-testing initiation means for starting the testing process of said auto-diagnostic apparatus.

2. The auto-diagnostic apparatus according to claim 1, further comprising remote-reporting means operatively associated with said auto-diagnostic apparatus for reporting data representing the results of the test of said auto-diagnostic apparatus to a remote telemaintenance center by means of said cellular, or cellular-like, transceiver.

3. The auto-diagnostic apparatus according to claim 2, further comprising a remote telemaintenance center which receives said test-results data caused to be sent by said remote-reporting means, said remote telemaintenance center comprising means for receiving and processing said test-results data.

4. The auto-diagnostic apparatus according to claim 3, wherein said remote telemaintenance center comprises signal means for answering said remote-reporting means for indicating that the test-results data should be sent.

5. The auto-diagnostic apparatus according to claim 4, wherein said remote telemaintenance center comprises signal means for answering said remote-reporting means for indicating that the test-results data have been successfully received.

6. The auto-diagnostic apparatus according to claim 5, wherein each said signal means comprises means for generating a 1020 Hz. tone; said remote-reporting comprising signal-receiving means for receiving said 1020 Hz. tone.

7. The auto-diagnostic apparatus according to claim 5, wherein said remote-reporting means comprises means for retrying the transmission of said test-results data; said means for retrying comprises means for limiting the number of attempts of retrying the transmission of said test-results data.

8. The auto-diagnostic apparatus according to claim 2, wherein said remote-reporting means comprises means for establising a call to the telephone number of said remote telemaintenance center via the cellular, or cellular-like, network, and means for retrying to establish said call if a first attempt has failed.

9. The auto-diagnostic apparatus according to claim 2, wherein said remote telemaintenance center comprises test-initiation means for sending a signal via the cellular, or cellular-like, network, to said remote-reporting means for causing said remote-reporting means to actuate said self-diagnostic apparatus in order to perform a self-diagnostic test; said remote-reporting means having signal-receiving means for receiving said test-initation signal.

10. The auto-diagnostic apparatus according to claim 9, wherein said remote-reporting means comprises means for establising a call to the telephone number of said remote telemaintenance center via the cellular, or cellular-like, network, and means for retrying to establish said call if a first attempt has failed.

11. In an auto-diagnostic apparatus for testing the proper functioning of a cellular, or cellular-like, transceiver and a cellular, or cellular-like, interface unit operatively coupled to said cellular transceiver, which interface unit couples a land-type telephone device to the cellular transceiver whereby DTMF or pulse-type dialing signals are converted into digital format for sending to said cellular, or cellular-like, transceiver, whereby the dialed number made on the land-type of telephone may be used to call a number over the cellular, or cellular-like, system, and wherein said auto-diagnostic apparatus comprises auto-diagnostic means coupled to said interface unit for generating signals for testing the operation of said cellular, or cellular-like, transceiver and said cellular, or cellular-like, interface unit, the improvement comprising:

off-site, remote-test initiation means for generating a signal for initiating in said auto-diagnostic means the initiation of the testing of the proper functioning of the cellular, or cellular-like, transceiver and the cellular, or cellular-like, interface unit operatively coupled to said cellular transceiver, said remote-testing initiation means being located off-site from the location where said auto-diagnostic apparatus is located;

signal-responsive means associated with said auto-diagnostic means responsive to said signal from said remote-testing initiation means for starting the testing process of said auto-diagnostic apparatus; and remote-reporting means operatively associated with said auto-diagnostic apparatus for reporting data representing the results of the test of said auto-diagnostic apparatus to a remote location by means of said cellular, or cellular-like, network.

12. The auto-diagnostic apparatus according to claim 11, wherein said auto-diagnostic means comprises means for simulating the functions performed by a standard, land telephone-like instrument for generating in said cellular, or cellular-like, interface unit respective, corresponding responses in said cellular, or cellular-like, interface unit, in order to determine if said cellular, or cellular-like, interface unit is operating correctly.

13. The auto-diagnostic apparatus according to claim 11, wherein said means for simulating the functions performed by said standard, land telephone-like instrument comprises means for generating an off-hook signal to said cellular, or cellular-like, interface unit.

14. The auto-diagnostic apparatus according to claim 13, wherein said auto-diagnostic means comprises means for monitoring and reporting the proper functioning of said interface unit to said off-site location by means of said remote-reporting means.

15. The auto-diagnostic apparatus according to claim 11, wherein said diagnostic means comprises means for detecting the presence of a dial-tone signal generated from said cellular, or cellular-like, interface unit in response to said generation of said off-hook signal.

16. The auto-diagnostic apparatus according to claim 11, wherein said means for simulating the functions performed by said standard land telephone-like instrument comprises means for generating a DTMF signal and sending the signal to said cellular, or cellular-like, interface unit.

17. The auto-diagnostic apparatus according to claim 11, wherein said diagnostic means comprises means for detecting the DTMF signal output by said cellular, or cellular-like, interface unit in response to the DTMF signal generated by said means for generating a DTMF signal.

18. The auto-diagnostic apparatus according to claim 11, wherein said means for simulating the functions performed by said standard, land telephone-like instrument comprises means for generating an on-hook signal to said cellular, or cellular-like, interface unit.

19. The auto-diagnostic apparatus according to claim 11, wherein said diagnostic means comprises means for simulating the presence of an incoming telephone call to said transceiver in order to cause said cellular, or cellular-like, interface unit to actuate its ring generator; said diagnostic means comprising means for detecting the ring-signal produced thereby.

20. The auto-diagnostic apparatus according to claim 11, wherein said diagnostic means further comprises means for generating an off-hook signal to said cellular, or cellular-like, interface unit during the time that said cellular, or cellular-like, interface unit is generating its ring-signal, in order to determine that the cellular, or cellular-like, interface unit properly disconnects the ring-signal upon the answering of an incoming telephone call.

21. The auto-diagnostic apparatus according to claim 11, wherein said diagnostic means comprises means for generating an outgoing telephone call through the cellular, or cellular-like, telephone network, when said cellular, or cellular-like, interface unit is coupled to a transceiver, and back to said cellular, or cellular-like, transceiver, whereby said diagnostic means causes said cellular, or cellular-like, transceiver to make a telephone call to itself; said diagnostic means further comprising means for detecting the generation of a busy-signal by the cellular, or cellular-like, transceiver in response to said telephone call; said means for generating an outgoing telephone call calling the telephone number which has been assigned to the transceiver coupled to said cellular, or cellular-like, interface unit.

22. The auto-diagnostic apparatus according to claim 11, wherein said auto-diagnostic means comprises means for monitoring and reporting the proper functioning of said interface unit to said off-site location by means of said remote-reporting means.

23. A method of remotely testing for the proper operation of a cellular, or cellular-like, interface unit by means of a diagnostic unit, which cellular, or cellular-like, interface unit is capable of being coupled to a land-type telephone or telephone-like instrument, said cellular, or cellular-like, interface unit capable of converting DTMF signals or pulse-type dialing signals from a land-type telephone instrument coupled thereto into digital data format for sending the digital data to a cellular, or cellular-like transceiver, said method comprising:

(a) sending a test-initiation signal from an off-site location to the diagnostic unit;

(b) in response to said step (a), carrying out the testing of the cellular, or cellular-like, interface unit by means of the diagnostic unit;

(c) transforming the test-results into data that is capable of being sent over the cellular, or cellular-like, network;

(d) sending the test-results data to an off-site monitoring center by means of the cellular, or cellular-like, transceiver; and prior to said step (d), generating an acknowledgment signal from the off-site monitoring center to the diagnostic unit indicating establishment of data connection:

said step (b) comprising monitoring the functions performed by said interface unit;

said step of monitoring comprising: simulating the functions performed by a communications device for generating in said interface unit respective, corresponding responses in said interface unit, in order to determine if said interface unit is operating correctly.

* * * * *